US009674684B1

(12) United States Patent
Mendelson

(10) Patent No.: US 9,674,684 B1
(45) Date of Patent: Jun. 6, 2017

(54) BEACON DEPLOYMENT FOR USE WITH LOCATION BASED SERVICES (LBS)

(71) Applicant: Ehud Mendelson, Coral Springs, FL (US)

(72) Inventor: Ehud Mendelson, Coral Springs, FL (US)

( * ) Notice: Subject to any disclaimer, the term of this patent is extended or adjusted under 35 U.S.C. 154(b) by 0 days.

(21) Appl. No.: 15/397,685

(22) Filed: Jan. 3, 2017

Related U.S. Application Data

(62) Division of application No. 15/237,727, filed on Aug. 16, 2016, now Pat. No. 9,538,332, which is a division of application No. 15/086,028, filed on Mar. 30, 2016, now Pat. No. 9,420,423, which is a division of application No. 14/285,406, filed on May 22, 2014, now Pat. No. 9,602,193, which is a division of application No. 14/285,332, filed on May 22, 2014, now Pat. No. 9,491,584, which is a division of application No. 14/285,273, filed on May 22, 2014, now Pat. No. 9,204,257, which is a division of application No. 14/285,209, filed on May 22, 2014, now Pat. No. 9,204,251, which is a division of application No. 12/930,735, filed on Jan. 14, 2011, now Pat. No. 9,020,687, which is a division of application No. 11/396,843, filed on Apr. 3, 2006, now Pat. No. 7,899,583, said application No. 15/237,727 is a division of application No. 15/086,028, which is a division of application No. 14/285,406, which is a division of application No.
(Continued)

(51) Int. Cl.
*H04B 7/00* (2006.01)
*H04W 4/22* (2009.01)
*H04W 40/24* (2009.01)
*H04W 4/00* (2009.01)
*H04W 4/02* (2009.01)

(52) U.S. Cl.
CPC ........... *H04W 4/22* (2013.01); *H04W 40/244* (2013.01); *H04W 4/008* (2013.01); *H04W 4/021* (2013.01); *H04W 4/023* (2013.01)

(58) Field of Classification Search
CPC ....... H04W 4/22; H04W 4/008; H04W 4/021; H04W 4/023; H04W 40/244
USPC ........................................................ 455/41.2
See application file for complete search history.

(56) References Cited

U.S. PATENT DOCUMENTS 3,114,128 A 12/1963 Ljungman
3,130,298 A 4/1964 Schwarz
(Continued)

FOREIGN PATENT DOCUMENTS

JP 9126804 A 5/1997

*Primary Examiner* — April G Gonzales
(74) *Attorney, Agent, or Firm* — Allen D. Hertz, P. A.; Allen D. Hertz

(57) ABSTRACT

An infrastructure of Bluetooth and/or Wi-Fi enabled RF tags or beacons deployed within a structure, an urban environment, a residence, buildings, real estate property, in a parking area, etc. The deployed beacons can be integrated with sensors to initiate or trigger an application. The infrastructure being used to recognize a presence of a user within the area to trigger activities, initiate Location Based Services (LBS), provide navigation, provide mapping, convey of information, initiate a link to a server or software, provide support during an emergency, provide assist to E-911 services, trigger an automation function, provide real estate information, and the like.

53 Claims, 13 Drawing Sheets

Related U.S. Application Data

14/285,332, which is a division of application No. 14/285,273, which is a division of application No. 14/285,209, which is a division of application No. 13/135,421, filed on Jul. 5, 2011, now Pat. No. 9,374,673, which is a division of application No. 12/932,811, filed on Mar. 7, 2011, now Pat. No. 8,941,485, which is a division of application No. 12/069,899, filed on Feb. 13, 2008, now Pat. No. 7,924,149, which is a division of application No. 11/472,706, filed on Jun. 22, 2006, now Pat. No. 8,896,485, which is a division of application No. 11/429,864, filed on May 8, 2006, now Pat. No. 8,836,580, application No. 15/397,685, which is a division of application No. 15/237,727, which is a division of application No. 15/086,028, which is a division of application No. 14/285,406, which is a division of application No. 14/285,332, which is a division of application No. 14/285,273, which is a division of application No. 14/285,209, which is a division of application No. 12/587,042, filed on Oct. 1, 2009, now Pat. No. 8,866,673, which is a division of application No. 11/429,864, filed on May 8, 2006, now Pat. No. 8,836,580.

(60) Provisional application No. 60/670,097, filed on Apr. 12, 2005, provisional application No. 60/678,947, filed on May 9, 2005.

(56) References Cited

U.S. PATENT DOCUMENTS

| | | | |
|---|---|---|---|
| 3,158,836 | A | 11/1964 | McCauley |
| 3,166,732 | A | 1/1965 | Ljungman |
| 3,867,615 | A | 2/1975 | Sioufi |
| 4,491,970 | A | 1/1985 | LaWhite et al. |
| 5,195,126 | A | 3/1993 | Carrier et al. |
| 5,250,955 | A | 10/1993 | Major |
| 5,272,483 | A | 12/1993 | Kato |
| 5,293,163 | A | 3/1994 | Kakihara |
| 5,305,370 | A | 4/1994 | Kearns et al. |
| 5,319,363 | A | 6/1994 | Welch et al. |
| 5,383,127 | A | 1/1995 | Shibata |
| 5,416,712 | A | 5/1995 | Geier |
| 5,432,508 | A | 7/1995 | Jackson |
| 5,442,348 | A | 8/1995 | Mushell |
| 5,454,461 | A | 10/1995 | Jacobs |
| 5,485,520 | A | 1/1996 | Chaum et al. |
| 5,504,482 | A | 4/1996 | Schreder |
| 5,568,535 | A | 10/1996 | Sheffer et al. |
| 5,606,506 | A | 2/1997 | Kyrtsos |
| 5,638,279 | A | 6/1997 | Kishi et al. |
| 5,652,570 | A | 7/1997 | Lepkofker |
| 5,712,619 | A | 1/1998 | Simkin et al. |
| 5,742,233 | A | 4/1998 | Hoffman et al. |
| 5,771,001 | A | 6/1998 | Cobb |
| 5,798,733 | A | 8/1998 | Ethridge |
| 5,838,237 | A | 11/1998 | Revell et al. |
| 5,873,040 | A | 2/1999 | Dunn et al. |
| 5,910,782 | A | 6/1999 | Schmitt et al. |
| 5,929,777 | A | 7/1999 | Reynolds |
| 5,940,481 | A | 8/1999 | Zeitman |
| 5,971,921 | A | 10/1999 | Timbel |
| 5,995,040 | A | 11/1999 | Issler et al. |
| 6,028,537 | A | 2/2000 | Suman et al. |
| 6,072,396 | A | 6/2000 | Gaukel |
| 6,340,928 | B1 | 1/2002 | McCurdy |
| 6,445,937 | B1 | 9/2002 | daSilva |
| 6,535,127 | B1 | 3/2003 | Taylor |
| 6,636,732 | B1 | 10/2003 | Boling et al. |
| 6,738,628 | B1 | 5/2004 | McCall et al. |
| 6,807,564 | B1 | 10/2004 | Zellner et al. |
| 6,970,101 | B1 | 11/2005 | Squire et al. |
| 7,026,954 | B2 | 4/2006 | Slemmer et al. |
| 7,031,875 | B2 | 4/2006 | Ellenby et al. |
| 7,034,678 | B2 | 4/2006 | Burkley et al. |
| 7,072,666 | B1 | 7/2006 | Kullman et al. |
| 7,245,216 | B2 | 7/2007 | Burkley et al. |
| 7,483,917 | B2 | 1/2009 | Sullivan et al. |
| 7,743,337 | B1 | 6/2010 | Maeda et al. |
| 7,907,931 | B2 | 3/2011 | Hartigan et al. |
| 7,933,395 | B1 | 4/2011 | Bailly et al. |
| 8,041,330 | B1 | 10/2011 | Garin |
| 8,126,960 | B2 | 2/2012 | Obradovich et al. |
| 8,705,527 | B1 * | 4/2014 | Addepalli ............ H04W 4/046 370/389 |
| 8,770,477 | B2 * | 7/2014 | Hefetz ................. G06Q 20/32 235/380 |
| 8,896,485 | B2 * | 11/2014 | Mendelson .......... G01C 21/206 342/463 |
| 9,204,251 | B1 * | 12/2015 | Mendelson ............. G08G 1/14 |
| 9,538,332 | B1 * | 1/2017 | Mendelson .......... H04W 4/023 |
| 9,553,626 | B2 * | 1/2017 | Callaway, Jr. .... H04W 52/0261 |
| 2001/0026223 | A1 | 10/2001 | Menard et al. |
| 2002/0075941 | A1 | 6/2002 | Souissi |
| 2002/0129138 | A1 | 9/2002 | Carter |
| 2002/0131386 | A1 | 9/2002 | Gwon |
| 2003/0018708 | A1 | 1/2003 | Hlasny |
| 2003/0034881 | A1 | 2/2003 | Linnett et al. |
| 2003/0045280 | A1 | 3/2003 | Simons |
| 2003/0050039 | A1 | 3/2003 | Baba et al. |
| 2003/0067392 | A1 | 4/2003 | Monroe |
| 2003/0087628 | A1 | 5/2003 | Michibata |
| 2003/0148771 | A1 | 8/2003 | de Verteuil |
| 2004/0066917 | A1 | 4/2004 | Yasukawa et al. |
| 2004/0072583 | A1 | 4/2004 | Weng |
| 2004/0239498 | A1 | 12/2004 | Miller |
| 2005/0021369 | A1 | 1/2005 | Cohen et al. |
| 2005/0070315 | A1 | 3/2005 | Rai et al. |
| 2005/0096070 | A1 | 5/2005 | Kanevsky et al. |
| 2005/0111630 | A1 | 5/2005 | Potorny et al. |
| 2005/0187819 | A1 | 8/2005 | Johnson |
| 2005/0221858 | A1 | 10/2005 | Hoddie |
| 2006/0003775 | A1 * | 1/2006 | Bull ..................... G01S 5/0205 455/456.1 |
| 2006/0033641 | A1 | 2/2006 | Jaupitre et al. |
| 2006/0095331 | A1 | 5/2006 | O'Malley et al. |
| 2006/0122767 | A1 | 6/2006 | Athalye |
| 2006/0163349 | A1 | 7/2006 | Neugebauer |
| 2006/0253226 | A1 | 11/2006 | Mendelson |
| 2007/0032225 | A1 | 2/2007 | Konicek et al. |
| 2008/0227473 | A1 | 9/2008 | Haney |
| 2008/0280624 | A1 | 11/2008 | Wrappe |
| 2009/0006418 | A1 | 1/2009 | O'Malley |
| 2010/0120447 | A1 * | 5/2010 | Anderson ........... H04W 64/003 455/456.1 |
| 2010/0142402 | A1 | 6/2010 | Boldyrev |
| 2012/0023171 | A1 * | 1/2012 | Redmond .......... H04M 1/7253 709/205 |
| 2012/0084364 | A1 * | 4/2012 | Sivavakeesar ...... H04L 12/1818 709/205 |
| 2012/0188101 | A1 * | 7/2012 | Ganot ................. G07B 15/02 340/932.2 |
| 2013/0113936 | A1 * | 5/2013 | Cohen .................. G07B 15/02 348/148 |

* cited by examiner

BEACON DEPLOYMENT FOR USE WITH LOCATION BASED SERVICES (LBS)

CROSS REFERENCE TO RELATED APPLICATIONS

This application is:
A) is a Divisional Application of U.S. patent application Ser. No. 15/237,7274 filed on Aug. 16, 2016 (scheduled to issue as U.S. Pat. No. 9,420,423 on Jan. 3, 2017),
which is a Divisional Application of U.S. patent application Ser. No. 15/086,028 filed on Mar. 30, 2016 (now U.S. Pat. No. 9,420,423 on Aug. 16, 2016),
which is a Divisional Application of U.S. patent application Ser. No. 14/285,406 filed on May 22, 2014 (currently pending),
which is a Divisional Application of U.S. patent application Ser. No. 14/285,332 filed on May 22, 2014 (now U.S. Pat. No. 9,491,584 on Nov. 8, 2016),
which is a Divisional Application of U.S. patent application Ser. No. 14/285,273 filed on May 22, 2014, (now U.S. Pat. No. 9,204,257 on Dec. 1, 2015),
which is a Divisional Application of U.S. patent application Ser. No. 14/285,209 filed on May 22, 2014, (now U.S. Pat. No. 9,204,251 on Dec. 1, 2015),
which is a Divisional Application of U.S. patent application Ser. No. 12/930,735 filed on Jan. 14, 2011 (now U.S. Pat. No. 9,020,687 on Apr. 28, 2015),
which is a Divisional Application of U.S. patent application Ser. No. 11/396,843 filed on Apr. 3, 2006 (now U.S. Pat. No. 7,899,583 on Mar. 1, 2011),
which is a Non-Provisional U.S. Patent Application claiming the benefit of U.S. Provisional Patent Application Ser. No. 60/670,097 filed on Apr. 12, 2005;
B) is a Divisional Application of U.S. patent application Ser. No. 15/237,7274 filed on Aug. 16, 2016 (scheduled to issue as U.S. Pat. No. 9,420,423 on Jan. 3, 2017),
which is a Divisional Application of U.S. patent application Ser. No. 15/086,028 filed on Mar. 30, 2016 (Scheduled to issue as U.S. Pat. No. 9,420,423 on Aug. 16, 2016),
which is a Divisional Application of U.S. patent application Ser. No. 14/285,406 filed on May 22, 2014 (currently pending),
which is a Divisional Application of U.S. patent application Ser. No. 14/285,332 filed on May 22, 2014 (now U.S. Pat. No. 9,491,584 on Nov. 8, 2016),
which is a Divisional Application of U.S. patent application Ser. No. 14/285,273 filed on May 22, 2014, (now U.S. Pat. No. 9,204,257 on Dec. 1, 2015),
which is a Divisional Application of U.S. patent application Ser. No. 14/285,209 filed on May 22, 2014, (now U.S. Pat. No. 9,204,251 on Dec. 1, 2015),
which is a Divisional Application of U.S. patent application Ser. No. 13/135,421 filed on Jul. 5, 2011 (now U.S. Pat. No. 9,374,673 on Jun. 21, 2016),
which is a Divisional Application of U.S. patent application Ser. No. 12/932,811 filed on Mar. 7, 2011 (now U.S. Pat. No. 8,941,485 on Jan. 27, 2015),
which is a Divisional Application of U.S. patent application Ser. No. 12/069,899 filed on Feb. 13, 2008 (issued as U.S. Pat. No. 7,924,149 on Apr. 12, 2011),
which is a Divisional Application of U.S. patent application Ser. No. 11/472,706 filed on Jun. 22, 2006 (now U.S. Pat. No. 8,896,485 on Nov. 25, 2014),
which is a Divisional Application of U.S. patent application Ser. No. 11/429,864 filed on May 8, 2006 (now U.S. Pat. No. 8,836,580 on Sep. 16, 2014),
which is a Non-Provisional U.S. Patent Application claiming the benefit of U.S. Provisional Patent Application Ser. No. 60/678,947 filed on May 9, 2005, and
C) is a Divisional Application of U.S. patent application Ser. No. 15/237,7274 filed on Aug. 16, 2016 (scheduled to issue as U.S. Pat. No. 9,420,423 on Jan. 3, 2017),
which is a Divisional Application of U.S. patent application Ser. No. 15/086,028 filed on Mar. 30, 2016 (Scheduled to issue as U.S. Pat. No. 9,420,423 on Aug. 16, 2016),
which is a Divisional Application of U.S. patent application Ser. No. 14/285,406 filed on May 22, 2014 (currently pending),
which is a Divisional Application of U.S. patent application Ser. No. 14/285,332 filed on May 22, 2014 (now U.S. Pat. No. 9,491,584 on Nov. 8, 2016),
which is a Divisional Application of U.S. patent application Ser. No. 14/285,273 filed on May 22, 2014, (now U.S. Pat. No. 9,204,257 on Dec. 1, 2015),
which is a Divisional Application of U.S. patent application Ser. No. 14/285,209 filed on May 22, 2014, (now U.S. Pat. No. 9,204,251 on Dec. 1, 2015),
a Divisional Application of U.S. patent application Ser. No. 12/587,042 filed on Oct. 1, 2009 (now U.S. Pat. No. 8,866,876 on Oct. 21, 2014),
which is a Divisional Application of U.S. patent application Ser. No. 11/429,864 filed on May 8, 2006 (now U.S. Pat. No. 8,836,580 on Sep. 16, 2014),
which is a Non-Provisional U.S. Patent Application claiming the benefit of U.S. Provisional Patent Application Ser. No. 60/678,947 filed on May 9, 2005.

FIELD OF THE INVENTION

This invention is directed generally to the field of a beacon system for use in a building, such as a commercial or a residential application. More specifically, the application of on or more mobile Bluetooth transceivers enabled to support Location Based Service (LBS) applications.

BACKGROUND OF THE INVENTION

Introduction to Location Based Services (LBS):

Location Based Services (LBS) are rapidly expanding. Outdoor location technologies are mainly based on Global Positioning System (GPS) technologies. The Global Positioning System (GPS) cannot perform properly indoors and is therefore inadequate. As a result, indoor location systems are appearing on the market.

The need for a system arises from various market segments and applications. One example in the market is the Global Positioning System (GPS) based systems that use integrated positioning and navigation systems based on Global Positioning System (GPS) receivers as the primary positioning technology. Subsequent to the events of September 11th the Federal government mandated that Global Positioning System (GPS) capability be built in to all cellular phones. However, the fact that uninterrupted satellite reception is not possible in many locations is a major limitation of Global Positioning System (GPS) based systems. Densely populated areas and radio-frequency-signal shadowed locations, such as urban centers (alternatively referred to as "urban canyons"), generally do not allow proper operation of Global Positioning System (GPS), yet it is in these locations that the need is greatest.

There is a clear need for a cost effective system that maintains performance indoors, in urban canyons and in city centers.

Another important consideration is that the Global Positioning System (GPS) is susceptible to jamming and other man-made interference.

Description of a Global Positioning System (GPS):

The Global Positioning System (GPS) is a satellite based navigation and time identification system developed by the U.S. Department of Defense. The Global Positioning System (GPS) originally served marine, airborne and terrestrial users in the military and has been later adapted to serve civilians as well. Specifically, Global Positioning System (GPS) includes the Standard Positioning Service (SPS) that provides civilian users with 100 meter accuracy as to the location or position of the user. For military users Global Positioning System (GPS) provides the Precise Positioning Service that is accurate to within 20 meters. Both of these services are available worldwide with no requirement for any local equipment.

View of Global Positioning System (GPS) Limitations:

A first limitation of the Global Positioning System (GPS) is that, upon activation, the Global Positioning System (GPS) receiver scans for signals from the constellation of Global Positioning System (GPS) satellites. A unit must locate and receive signals from at least four (4) satellites in order to be able to determine its location. This process of locating the minimum number of satellites, receiving the data and achieving a position fix can take several minutes. This delay is problematic for many Global Positioning System (GPS) applications.

A second limitation of the Global Positioning System (GPS) is that the receiver needs a clear view of the sky to successfully receive signals from the constellation of associated satellites. Again, under unfriendly signal receiving conditions, such as inside buildings, in "urban canyons", in the shadows of high buildings, and the like, the Global Positioning System (GPS) suffers from multi-path effects and therefore shows poor performance, or, worse, none at all.

A third limitation of the Global Positioning System (GPS) is limited accuracy. The civilian version of the Global Positioning System (GPS) signal includes limited accuracy by design. While knowing a position of an individual to within an accuracy of 50 to 200 feet anywhere on the planet is a major technological feat. This accuracy may not be sufficient to provide a location and/or navigation to a user in a store, a mall, to a vacant or available parking space (each space measures about 10 feet), and the like. The use of the Global Positioning System (GPS) is further limited in an indoor environment, such as most indoor stores and/or malls, as the Global Positioning System (GPS) cannot work effectively when the receiver is located in doors or a line of sight to the satellites is blocked by a roof or other object.

Existing navigation systems, such as the new mandatory Global Positioning System (GPS) equipped cellular telephones, are based on the Global Positioning System (GPS) and have the aforementioned limitations.

Another significant factor adding to the limitations of the Global Positioning System (GPS) based systems is the important role of map production. In an optimal scenario, a user would want a map to be as detailed and as up-to-date as possible. The existing maps used by the Global Positioning System (GPS) based applications provide limited detail and are not able to reflect changes on a real time basis. More importantly, mapping for indoor facilities is essentially not readily available to the general public or integrated into Global Positioning System (GPS) based applications. The recent introduction of imagery services, such as GOOGLE EARTH and its competitors are offered as an enhancement to Global Positioning System (GPS). Even with these, they are still present outdated information. The consequences of limited and outdated mapping are unsatisfactory results, wherein users encounter road changes, and area development changes that not shown on the maps and imagery.

The Proposed Solutions:

In general, the subject invention is based on applying machine-learning techniques to the task of inferring aspects of the user's status from a stream of input from small RF tags or beacons, which are installed in a local area, including indoor and/or outdoor locations or in places designated as Point Of Interest (POI). Examples of areas of deployment of the RF tags or beacons can include a mall, a department store, adjacent to a product inside a store, within a street parking or garage parking area, and the like. In a broad sense, the RF tags or beacons can be located indoors, outdoors, in a public location, in a commercial location, and the like. The RF tags or beacons can employ Radio Frequency IDentification (RFID) (long range type) technology, Bluetooth with the option to long range Bluetooth technology, Wi-Fi technology, or any other suitable RF technology. The RF tags or beacons are adapted to broadcast a unique identification (ID) using any suitable wireless broadcasting technology that includes an identification portion in a unidirectional pulsing signal. The identification portion in a unidirectional pulsing signal identifies a location of the RF tag or beacon by including a unique identification (ID), such as the address or location and type of facility, store, product, and the like. The RF tag or beacon broadcasts location identification and any other desired information in the identification portion in a unidirectional pulsing signal to be picked up by a compatible receiver integrated into the mobile telephone. An association application would decode the received identification portion in a unidirectional pulsing signal and act accordingly.

The application is adapted for indoor guide navigation and Location Based Services (LBS), or navigation in crowded urban areas, where Global Positioning System (GPS) based systems, due to lack of access to satellites or the Global Positioning System (GPS) limitations detailed previously, cannot achieve the required results.

The disclosed applications focus on the task of interactively guiding the user to a desired indoor destination.

Examples of indoor applications:

The user may wish to locate a vacant or available parking space in his/her vicinity, wherein the parking spaces can be located outdoors or within a covered parking area, such as a parking garage.

The user may wish to locate a specific store within a shopping mall, a particular aisle in a department store, or even as detailed as a specific item on a shelf.

The user may wish to locate a specific conference room in a convention center, a Point Of Interest (POI) in an amusement park, a Point Of Interest (POI) in a museum, and the like.

The user may be looking for a train location in a train station, train stops associated with a subway, or train stops associated with any other underground train system.

PRIOR ART

At present, however, no prior art device utilizes the capabilities to display a real-time representation of navigating directly from the sensors without a central system; and without using a Global Positioning System (GPS) based system directly to the user. Most systems are designed for an antiquated query type search, where interface to an Internet and/or a database to a central system is needed.

The navigation system automatically detects a beacon signal transmitted directly from the RF beacon. The process does not require any bi-directional communication, such as cellular communication, to determine the location of the mobile device. Contrarily, other systems require bi-directional communication and must have bandwidth available, over which to send a request to a central system, or to a database, and then must wait for a response. This requires an operational, bi-directional communication infrastructure and, additionally, takes time.

Even if the other systems have bandwidth available, the other systems are still based on the existing search concept where the user submits a query, searches and waits for the response. This is impractical. The subject system provides the information automatically, without submitting any query, and the response is according to the user's location, wherein the user's location is determined by proximity to the beacon in the local area.

Again, most of the existing prior arts are based either on a Global Positioning System (GPS) based system or an integrated, in-car navigation system employing the Global Positioning System (GPS). The existing mapping employed by these systems includes the same limitations described previously and is impractical.

The present invention bridges the gap between the Global Positioning System (GPS) based navigation by providing an improved and complete solution.

U.S. Pat. No. 7,031,875, issued to Ellenby et al. describes a pointing system for addressing objects; provide a system and method based on Global Positioning System (GPS) and Internet and/or database communication. Ellenby '875 is not exactly a navigation system, but an information based system that requires the Global Positioning System (GPS) to locate the user location. Therefore, any indoor services are likely out of the question and the requirement for communication with the Global Positioning System (GPS) limits its availability and accuracy.

The system, as provided by the present invention, determines the location using the beacon signal emitted by the RF tag or beacon, the identification portion of the beacon signal emitted by the RF tag or beacon, Proximity Detection (PD), and Received Signal Strength (RSSI), Time of Arrival (TOA), and Angle of Arrival (AOA).

Proximity Detection (PD)

This method relies upon a dense grid of antennas, each having a well-known position. When a mobile device is detected by a single antenna, it is considered to be co-located with the single antenna. When more than one antenna detects the mobile, the closest antenna is the one that receives the strongest signal, and is therefore determined to the antenna that is co-located with the mobile device.

This method is relatively simple to implement. It can be implemented over different types of physical media. In particular, Infra Red (IR) and Radio Frequency IDentification (RFID) are based on this method.

Triangulation

In case more than one RF tag or beacon signal is detected, the process can use triangulation, taking Proximity Detection (PD) a step further. The location of the mobile device is determined by measuring the signal level measurements from each antenna, then applying a triangulation algorithm to optimize the location.

Like the Proximity Detection (PD) method, triangulation is relatively simple to implement.

Time of Arrival (TOA)

Time of arrival (TOA) is based on triggering the mobile devices to respond, and measuring the time it takes for the response to complete a transmission back to the antenna. The elapsed time represents the distance between the two. By using distances from a few antennas, a position of the mobile device can be triangulated. Time of arrival (TOA) is considered to be the most accurate method, because multipath effects can be filtered out. Yet, Time of arrival (TOA) is considerably more complex to implement, as it requires a modification to the hardware on the mobile device side, as well as special modifications on the antenna or beacon side.

Angle of Arrival (AOA)

Angle of Arrival (AOA) is based on finding the direction of maximal signal intensity for each antenna (beacon)-mobile device pairing. By finding an intersection of several direction vectors, a position of the mobile device can be estimated using the Angle of Arrival (AOA). The use of the Angle of Arrival (AOA) technique is considerably less accurate than using Time of arrival (TOA) technique, due to limited angular resolution and the fact that in an indoor environment, much of the signal can be reflected. Also, Angle of Arrival (AOA) antennas are more complex, as they require multi-section, highly directional antennas, and multiple RF circuitries.

Bluetooth is a newer wireless local networking standard that operates in the 2.4 GHz ISM band, and the range is normally shorter (typically 10-15 m, although there are tags with a range of over 300 feet). On the other hand, Bluetooth is a "lighter" standard, highly ubiquitous (integrated into most cellular telephones, PDAs, Personal Computer (PC) peripherals, etc.) and supports, in addition to Internet Protocol (IP), several other networking services. Notably, Bluetooth supports serial port emulation, voice, and various types of object exchanges. Bluetooth RF tag or beacons are small, pocketsize transceivers.

Every Bluetooth enabled RF tag or beacon has a unique identification (ID). This identification (ID) can be used for locating the RF tag or beacon and providing location information of the mobile device in the proximity.

The relevant location scenario of the present invention is that of searching for a certain RF tag or beacon. It is the most accurate and the faster response time and it is this method in indoor navigation and locating when and where each RF tag or beacon identification (ID) is a known address position-waypoint.

Why use Bluetooth in indoor environments?

Bluetooth has some advantages in the context of indoor location. These include:

Bluetooth uses a Radio Frequency (RF) in a 2.4 GHz ISM band. In this frequency range, radio waves penetrate obstacles, such as walls and human bodies, albeit with a substantial loss.

This has two implications:

The availability of a "hi-there" application, as the Bluetooth receiving device would receive some signal from the RF tags or beacons.

RF tags or beacons can be placed relatively far apart (typical range is 10-15 meters). This enables a deployment where RF tags or beacons are not necessarily required to include one RF tag or beacon at each way point).

Bluetooth is ubiquitous: Bluetooth chipsets are being integrated everywhere nowadays (cellular telephones, portable electronic accessories, computing devices, and the like). The RF tags or beacons can be implemented anywhere: inside buildings, along roadways, inside cars or other transportation entities, inside buildings for triggering automation, or in any kind of business triggering application and/or automatically creating a link to an existing system.

The fact that a Bluetooth location system can locate any Bluetooth enabled device makes it more cost-effective solution. This means that an increasing fraction of humans and mobile assets around would become locatable in a Bluetooth covered site, with no additional hardware cost (no RF tags or beacons attached). The only requirement is to pre-register these devices.

Bluetooth devices are considered to operate using a low power technology, where battery powered Bluetooth enabled tags or beacons need to be recharged, approximately once a week (or longer, depending upon the usage scenario). Non tags (for example, Bluetooth enabled cellular telephones) are naturally recharged on a regular basis, so they do not need any special recharging. If the Bluetooth enable portable devices (non-tags) are being used to determine a location of the device, the fraction of power consumption added to their usual (non Bluetooth operation) power consumption is relatively small.

Bluetooth devices are considered to be a low cost technology, having expected high production volumes (hundreds of millions annually) lead to sub five dollar ($5) cost per chip. It is noted that several Integrated Circuit (IC) manufacturers have already met this goal at the time of this disclosure. This would eventually result in a low price for the Bluetooth tags or beacons, if and when Bluetooth location systems would become sufficiently ubiquitous. Bluetooth protocol is a multi-functional communication standard, where location determination is only one of many services that can be supported by a Bluetooth enabled RF tag or beacon infrastructure. The same RF tag or beacon infrastructure can be used to provide additional network services, particularly remote monitoring and control or just trigger a link to an existing system. In addition, Bluetooth provides voice and Internet Protocol (IP) services (although for the later, WLAN is typically more suitable).

In open spaces, relatively free of obstructions and walls (for example, a large warehouse, a public hotspot, and the like), Bluetooth technology would suffice to provide a 2 meter error range.

Conclusions:

The proposed RF tag or beacon technology offers unique advantages: one is the ability to locate ubiquitous "any tags". Any Bluetooth enabled device (including newer mobile telephones) can be associated with and use the advantage of the Bluetooth beacons. The other advantage is the multiservice nature of the Bluetooth enabled RF tags or beacons infrastructure that enables using the Bluetooth enabled RF tags or beacons for other purposes, such as: determining a location of the Bluetooth enabled device, navigation, remote monitoring and control, triggering an existence, triggering a link to existing systems, triggering or initiating software and for a variety of Location Based Services (LBS), and local push messaging services.

SUMMARY OF THE INVENTION

In accordance with the present invention, these are the characteristics associated with locating and navigation.

The proposed system provides a method for locating and providing navigation based on the following unique characteristics:

In an indoor or outdoor navigation situation the RF tags or beacons would replace the function of the satellites in a Global Positioning System (GPS) based system, wherein the RF tags or beacons in conjunction with the respective software provide the user with the information and directions needed to reach a desired destination.

The proposed system has three major parts:

The detection and navigator, the software adapted to provide a method used to display the data and the information from the area triggered as result of being in a close proximity to at least one RF tag or beacon in the area.

The disclosed method is not a location and tracking system as offered by other systems.

Small RF tags or beacons are installed in each place designated as a Point Of Interest (POI). The Point Of Interest (POI) can be at a mall, in department store, near a product inside a store, along a street, within a garage parking, in an indoor environment, in an outdoor environment, in a public area, in a commercial area, and the like. The RF tags or beacons can be of configured to employ any suitable protocol, including Radio Frequency IDentification (RFID) (long range type), Bluetooth technology with the option to use long range Bluetooth, Wi-Fi technology, or any other suitable RF transmission protocols. The RF tags or beacons broadcast a unique identification (ID) using the wireless transmissions. The unique identification (ID) identifies the location of the RF tag or beacon, such as the address of the RF tag or beacon, the type of facility, the store, the product, and the like. The RF tag or beacon broadcasts the information, which is adapted to be picked up by the mobile telephone and utilized by the navigator application, via the cellular or mobile telephone or other Bluetooth enabled device operating in accordance with the application, the beacon identification (ID) trigger application and push information to the Bluetooth device or the Bluetooth enabled cellular or mobile telephone.

The system can serve as an add on to the mall's and/or store's current guide or mapping processes to provide extra assistance to user.

The Navigator:

The navigator is a cellular telephone application Bluetooth application.

The user's mobile device would scan the local area for the identification (ID) broadcasted by the RF tags or beacons in the vicinity by way of the Bluetooth system integrated into the cellular telephone. It is important to note that the disclosed solution does not require cellular communication, an Internet access, or a database access to determine the location of the mobile device and that any Bluetooth enabled device can operate the navigation application as a stand-alone device. The beacon system can interface with existing in car system and/or car navigation system.

The display method:

The display method is a unique way to bridge existing devices like cellular telephones, in-car systems, in-car navigation, and other Bluetooth devices. The system provides an overlay display method, which places an overlay over an existing navigation system mapping, a floor map, floor images, and the like as a real-time floating display, or as a waypoint to overcome the limitations of Global Positioning System (GPS) based systems and the existing mapping systems. The indicator would be placed as an overlay onto the floor plan image. The display may further include providing a visual indication a circle overlaid onto the floor plan image of the path, wherein the visual indication, the circle, indicates an area of the indoor map where the location information identifies a particular location and the circle provides the accuracy radius circle.

Mapping: A system and method for mapping an indoor environment is provided. A user's mobile device may receive an indication of a starting point on a floor plan.

The application on the user's mobile device may prompt the user to travel in a particular direction, or the direction of travel may be determined by the application on the user's mobile device in response to the user indicating a second location after the user has traveled to the second location.

As the user travels from the starting point in the designated direction, the application on the user's mobile device may gather information about the indoor environment. For example, the user's mobile device may gather wireless signal strength data, from RF beacons Wi-Fi or Bluetooth in the proximity of the mobile device while the user travels in the designated direction.

The application on the user's mobile device may associate the gathered information with the path the user traveled from the starting point to the ending point. The operation can be done at the user's mobile device (the cellular handheld device). The association may also be performed by a remote server using data provided by the application on the user's mobile device. As the user travels from point to point, the client device may indicate the area for which valid location information is available based on the path the user traveled and the information the user collected.

Mapping can be offered as an additional service for the indoor environment based upon an area, a building floor plan, or image mapping.

The navigation system will enable remote planning based on downloaded local floor plans, the floor mapping, or floor images. The indoor view images of the local building facility, or local navigation, when the location's floor plan can be triggered to downloaded at the destination. An example of this would be at the entrance of a shopping mall, a department store, an amusement park, a museum, a parking garage, a downtown area of a city, and the like.

The navigation system is based on a network of RF tags or beacons that can be deployed anywhere. The system is accurate to within 10 feet, significantly better than existing navigation systems and Global Positioning System (GPS). The system can work inside a building whereas Global Positioning System (GPS) cannot.

Local detection is obtained via any suitable Bluetooth interface.

The system provides information about each facility and/or store, including information about the type of facility, the type of store, a product, and the like.

By providing the ability to locate the user in an area using any suitable Bluetooth enabled device, such as a Bluetooth enabled cellular telephone with the navigation application and the RF tag and/or beacon method, the system overcomes the anxiety of "Where am I". The system can also be adapted to facility finding a parked car later via the RTP (Return to Parking) feature.

The system has the capability to perform all the functions of a search function and can become the "Next generation search out of the box".

The navigation system can be attractive for places that already deploy Wi-Fi and can be used for the existing Wi-Fi devices as a RF tags or beacons.

In case of an emergency or security situation, the system can provide authorities with information.

The system eases and facilitates navigation within indoor locations, without requirement of a navigation map or Global Positioning System (GPS). Indoor mapping can be provided as part of the navigation system. The system provides "local" navigation as well as "remote" detection.

The system allows easy interface or trigger application with existing networks or existing systems.

The system saves gas, time, money and eases global warming by reducing the time spent searching for destination.

The navigation method is unique. The navigation system is based upon RF tags or beacons with interface to Bluetooth enabled devices. This feature allows detection and navigation in locations where Global Positioning System (GPS) cannot work, as well as outside, with the ability to guide the user to within 10 feet of the destination, significantly better than any other navigation and Global Positioning System (GPS) based systems on the market.

The Bluetooth RF tags or beacons are based on a long-range version of the popular short distance communication. This unique feature affords the user the ability to plan ahead from a remote location, by obtaining identification (ID) about the destination directly from the RF tags or beacons and by accessing the indoor floor plan to be navigated at the destination.

A major problem with In-Car navigation and Global Positioning System (GPS) mapping is that they cannot guide the user closer than 50 to 200 feet, and only in open places. The navigation system can provide accurate directions to within 10 feet.

The navigation system will be a challenge to navigation providers and Global Positioning System (GPS) providers as they cannot provide mapping or navigation inside a mall, department store, a parking garage or lot, and anywhere the Global Positioning System (GPS)/Navigation map cannot accurately help navigate.

Utilizing this innovation, the facilities in the vicinity around the user car are displayed on a floating overlay using either a cellular telephone application, or a stand-alone device, or an existing installed navigation system with or without any mapping.

The recent introduction of imagery services, such as Google Earth and its competitors, that are offered as an enhancement to Global Positioning System (GPS) at a fee, still provide out of date information, with the unsatisfactory result that users encounter road changes and area development not shown on the maps and imagery.

Navigation using the mapping or floor plan of a location can be offered as a part of the system. The option of downloading a floor plan can be exercised either remotely or locally.

Each RF tag or beacon broadcasts a beacon signal continuously and any of the navigation devices will detect the beacon signal and display the identification (ID) and/or data on the user's mobile device in an easy to understand format.

Using the applications described herein, the user enjoys having the information that they want, when they want it, where they want it, and at an affordable price.

Once the user is in the vicinity of their destination and the user switches on their navigation device, by being in proximity to installed RF tags or beacons in the area the user's mobile device will automatically receive facility information along a waking route and in all directions around the user.

No further action is required, more specifically, there is no need to send a request or to access the Internet or the web, or to log on and search a database or central system. Any access to the Internet is to provide a Location Based Service (LBS) like push information, messages, offers, deals, advertising, and the like to the mobile user.

Other systems are still based on the existing search concept where the user submits a query, the provided server searches and the user waits for a response. The process is impractical, particularly in a condition where the user needs the information immediately. The navigation system provides the information automatically, without submitting any query, and the response takes into account the user's location determined by the proximity to the RF tags or beacons.

The unique approach to detection of the mobile device within the building does not require any Internet bandwidth or cellular communication to complete a desired procedure. Communication links using the Internet or the cellular network can provide Location Based Services (LBS) and any additional information that can be pushed to the user's device.

As a result, the proposed processes don't require any delays or waiting for bi-directional communication and access time. The information is provided to the user instantaneous, triggered directly between the RF tags or beacons identification (ID) and the user's mobile device.

Additionally, each facility type can be coded to include an identifier (ID) to identify the type of facility, such as a store, such as a restaurant, a men's wear store, a women's wear store, and the like.

Each facility identification (ID) code can trigger or initiate access to information about the respective facility, such as providing automatic waypoint information.

The disclosed applications, such as the navigator, can operate on a cellular or mobile telephone, without any need for a cellular connection to determine the current location. The disclosed applications also do not need any information from the Global Positioning System (GPS).

Moreover, the navigation system can solve a Return to Parking (RTP) problem, where the Return to Parking application can aid a user in a scenario where the user forget where he/she parked his/her car. The Return to Parking feature has an option to save the location on a "cellular telephone parking detector" application that will make it easy to locate the user's parked car.

The navigation solution is designed for global use and is not limited to malls, stores, amusement parks, museums, sports stadiums, and the like. It can be implemented in parking garages, metered parking spaces, or open, non-metered parking spaces. The RF tags or beacons can be installed anywhere, including in locations adapted to trigger or initiate an existing and location based application, adapted to link the mobile device to an existing system and existing software.

It is envisioned that, in the future, all new construction will have the RF tags or beacons included in the design, even place addresses, a building addresses can be replaced or used as an add-on with the implementation of a RF tags or beacons in the area to be recognized or scanned by any suitable and enabled mobile device.

The system integrates the navigation as part of an application referred to as NAV4 where the system will provide complete solutions for local navigation in an area where the Global Positioning System (GPS) might not work.

The navigation system consists of the following parts:

An infrastructure of RF tags or beacons, wherein each RF tag or beacon is installed in a known location within a localized area.

The navigation system or application is based on mapping and navigation to and within the location. The aim of the navigation system is to replace or supplement the guide or map of the mall and/or store guide/map. This is accomplished by installing the RF tags or beacons in each store or adjacent to each Point Of Interest (POI).

The mapping: As the Global Positioning System (GPS) and the associated Global Positioning System (GPS) mapping are not available for indoor applications. The navigation system is based upon a floor plan mapping or floor images that can be made available from each facility or other suitable source. For planning ahead, the floor plan or the floor images can be downloaded by the navigation application operating on the user's cellular telephone from a remote source by way of the Internet prior to arriving at the desired destination. Alternatively, the information can be automatically provided or triggered when the mobile device arrives at the desired destination.

The navigation application is adapted to be operable on the most commonly used device in the world today, any cellular telephone having a Bluetooth interface.

As a difference from other systems and other local based systems, this solution offers a unique approach that can be described as the "search out of the box" as the application does not require a query or a database search; the application only needs to know the identification (ID) of the RF tag or beacon that is located proximate the Bluetooth enabled cellular telephone. The Bluetooth enabled cellular telephone automatically scans and recognizes any local area Bluetooth based RF tags or beacons and determines the user's location using the received and decoded beacon signal, and provides instant information to the user and to the business or businesses in the area.

A typical application is to guide and/or navigate a pedestrian within an environment, such as a mall, a department store, a specialty store, a conference, a trade show, an amusement park, a university, a hospital, a school, a municipal building, a museum, a subway, a train station, an airport, a down town center, a finance facility, a cruise ship, any type of parking facility, or any other place where Global Positioning System (GPS) is insufficient, provides less than required accuracy, or is inoperable in the environment of the user. For example, the system will be used for navigation by first responders in an emergency or a disaster scenario.

The navigation system can be part of a broad suite of applications that includes a complete solution for employment by the user from the time that he/she begins looking for a space to park his/her car, the time he/she parks, the time that he/she begins walking to the store, mall, or any other indoor facility, to the time that he/she wants to return to his/her parked car by providing directions to the location of the parking space where his/her car is parked.

The suite may include:

Parking detector and navigation to any vacant or available parking space.

Automatic notification of the presence of the user within the place, store, facility, and the like.

Nav4 mall and/or Nav4store, which is a navigation solution for use within an interior of a mall, a store, and the like.

Return to Parking (RTP), which is a navigation solution to guide the user to the location of the parking space where his/her car is parked.

For example, a typical application could be:

A pedestrian asks for directions to a specific store within a mall.

A pedestrian asks for directions to a specific aisle or product located inside the store.

A shopper asks for directions to a specific department located within a department store.

A pedestrian asks for directions to a specific Point Of Interest (POI).

In an emergency condition, the first response team can utilize the system to obtain navigation about an interior of a smoke filled building.

A store owner can use the notification and the knowledge of existence of a user (by way of an identifier associated with the user that is provided by the user's mobile device) for loyalty and rewards programs.

The RF tag or beacon identification (ID) can trigger a link to exiting software and aware the local system of the user existence, such as:

A traveler checking into a hotel or resort, the hotel or resort can provide automatic check-in and interface to the hotel or resort front desk system.

A traveler checking into a flight at an airport, wherein the airline provides the traveler with automatic check-in capability to automatically check in with the flight service personnel when the traveler reach a close proximity to a local, associated RF tag or beacon.

A customer checking into a restaurant or other food service provider, wherein the business will recognize the identity of the customer when he/she is within a close proximity to the local, associated RF tag or beacon.

A pedestrian approaching an advertising area or billboard wherein the advertising area or billboard is adapted to recognize the user when the mobile device associated with the user is determined to be in a close proximity to the advertising area and the system provides the user with customized and/or personalize advertising or other offers.

A customer entering a store, a bank, a facility, and the like would be identified and/or recognized enabling the system additional information or services and/or the ability to inform the merchant of the presence of the customer (the application user).

The RF tags or beacons can serve to track employee time, including check-in and checkout times from any designate area.

The RF tags or beacons can serve as part of a payment process where the user's mobile device and the local proximity of the RF tags or beacons can provide increased security for a mobile payment system.

The local RF tags or beacons associated with the user's mobile device can be part of a local dating system.

The local RF tags or beacons associated with the user's mobile device can create a virtual secure zone for a child, an elderly person, or any other care monitoring condition.

The location of the user as associated with one or more RF tags or beacons located proximate thereto can be interfaced with social networking.

The RF tags or beacons can be employed as part of a solution for parking problems where each parking location can employ an RF tag or beacon with at least one additional sensor to determine if the parking space is vacant and provide parking information. This would be provided in an application that is referred to as nav4parking.

The RF tag or beacon can be installed into or integrated within a vehicle to provide car applications, such as payments, security, car broadcasting, car tracking, car communications, automatically count cars to provide a transportation management with statistically information, and the like.

A system and method to provide a user information which is related to any Points Of Interest (POI). The navigation system provides detection and navigation referencing, position determination and information related to the object or Point Of Interest (POI). This can be accomplished directly and automatically to the user's application enabled cellular telephone or mobile device upon approaching or within a close proximity to the RF tags or beacons installed in the area.

Special operation mode (Shopping): Shopping provides navigation to a special, a sale item, and the like within a department store.

Special operating mode (Museums): Museums provides navigation about the museum's exhibits and interactive information from each of the museum's exhibition to the user's cellular telephone or mobile device by way of a Bluetooth interface.

Special operating mode (Parking): Parking features are described within two (2) Patents (U.S. Pat. No. 7,899,583 and U.S. Pat. No. 8,941,485, both issued to the Inventor and claimed to be parent applications hereto). Parking provides detection and notification of vacant or available parking spaces within a parking area and navigation to the vacant or available parking spaces as well as navigation or guidance to return to a parked car.

Special operating mode: Nav store provides navigation inside a store or department store. The navigation feature can guide the user to a specific department, a specific aisle, or a specific product. The navigation feature can optionally include advertising methods and notifications of special promotions. The navigation feature can also provide the business owner with ability to know, in a way of automatic notification when the user's cellular telephone or mobile device is within a proximity to the local area. When the user's cellular telephone or mobile device is within a proximity to the local area, the system can be adapted to automatically deliver information related to the store or business. The delivered information can be, but is not limited to, deals, coupons, specials and even statistically information about the user's habits.

Every Bluetooth device's RF tag or beacon has a unique identification (ID). This identification (ID) is adapted to be used for locating the RF tag or beacon and providing location information of any mobile device in the proximity thereof.

A relevant location scenario is that of searching for a certain RF tag or beacon. The relevant location scenario is the most accurate and the faster response time and is one solution for indoor navigation and locating when and where each RF tag or beacon identification (ID) is a known address position, such as a waypoint.

Why use Bluetooth technology for indoor locations?

Bluetooth technology has some advantages in the context of indoor locations. These include:

Bluetooth technology uses a Radio Frequency (RF) that is in a 2.4 GHz ISM band. In this frequency range, radio waves penetrate obstacles, such as walls and human bodies, albeit with a substantial loss.

This has two implications:

Availability of a "hi-there" application based upon receipt of a signal from the RF tags or beacons.

The RF tags or beacons can be placed relatively far apart from one another. The typical range of the RF tag or beacon is 10-15 meters. Therefore, it is not necessary to deploy one RF tag or beacon within or proximate to each way point.

Bluetooth technology is ubiquitous. Bluetooth chipsets are being integrated everywhere nowadays (mobile telephones, accessories, computing devices, and the like). The RF tags or beacons can be implemented anywhere, such as within buildings, along roadways, inside cars, in use with transportation entities, inside a home for home automation triggering, in any kind of business, and the like. The system can be used to trigger an application and/or link the device to an existing system.

The fact that a Bluetooth location system can locate any Bluetooth enabled device makes it more cost-effective solution. This means that an increasing fraction of humans and mobile assets around would become locatable in a Bluetooth covered site, with no additional hardware cost (no RF tags or beacons attached). The only need is to pre-register these devices. Bluetooth is a low power technology which can be deployed as tags, which need recharging of approximately once a week (or longer, depending upon the usage). Non-tags (e.g. BT enabled telephones) are being recharged anyway on a regular basis, so they do not need any special recharging. If the mobile devices are being used for location and/or navigation, the fraction added to their usual (non Bluetooth enabled operating mode) power consumption is relatively small.

Bluetooth is a low cost technology anticipating high production volumes (hundreds of millions annually) leading to sub $5 per chip. Several Integrated Circuit (IC) manufacturers have already met this goal. This would eventually result in a low price for the Bluetooth tags or beacons, if and when Bluetooth location systems would become sufficiently ubiquitous. Bluetooth is a multi-functional communication standard, whereby a location application is only one of many Location Based Services (LBS) that can be supported by a Bluetooth infrastructure. The same infrastructure can be used to provide additional network services, particularly remote monitoring and control or just trigger a link to an existing system. In addition, Bluetooth technology provides voice and IP services (although for the later, WLAN is typically more suitable).

In open spaces, relatively free of obstructions and walls (e.g. a large warehouse or a public hotspot), Bluetooth alone would suffice to provide a two (2) meter error range.

Waypoint Navigation

A waypoint is a fixed location with a known address location, preferably using longitude and latitude coordinates. The navigation system is capable of storing a database of waypoints for the following purpose:

Waypoints mark a destination, a point along the way to a destination, or a point of reference. Normally, in navigating, a "route" consists of one or more waypoints. To traverse a route, the user navigates to the nearest waypoint, then to the next one in turn until the destination is reached. The system has the ability to compute a great-circle route towards a waypoint, enabling them to find the shortest route even over long distances. The system enables users to locate a destination on a map, an indoor floor plan, or an indoor image and define the center of the circle as the waypoint. The system is intended for navigation. The system can generate a suggested route between two waypoints, based on the cartographic database. The system indicates the user's current location and gives advance notice of an upcoming point.

Because the system knows the waypoint positions, and the distance between them, it is easy to determine the user's exact location (assumed to be the same location as the location of the mobile device).

Map Matching

The navigation solution is further enhanced, although it is not essential, when the system knows that the person or object being located is traveling along known routes on a map. For example, the system can assume that people might only follow certain routes in a mall. This is priority information that can be used to "force" the estimated position to be on the nearest point on the possible routes. It is noted that this is easier to predict in an indoor environment compared to an outdoor environment.

The constraints of indoor construction similarly can be used to refine estimates of the position of a person or object moving within a building, as people and objects do not pass through walls; they travel along corridors and through doorways. It is a best solution for a system in case of an emergency, for a system for homeland security, or a system to locate and inform in a subway environment. One good example is a hotel exit floor map.

Configuration and Use

In the indoor application, instead of using the Global Positioning System (GPS), the system uses beacon signals from RF tags and beacons having known waypoint positions that are detected and identified as a demonstration of the concept of using another sensing method. The beacon signal(s) received from one or more RF tags or beacons are used to detect and identify the location of the receiving device and determine the waypoints located proximate thereto. Theoretically, it would be possible to convert the waypoint positions into Global Positioning System (GPS) coordinates and emulate an external Global Positioning System (GPS) data source.

This system can be useful for providing navigation to first responder personnel, where indoors waypoints have been installed in a particular building in the form of RF tags or beacons, wherein the identifiers of each RF tag or beacon is associated with the known location of the RF tag or beacon. By using the identifier, it may be possible to associate magnetic anomaly information with individual tags as well.

One of the important features of the indoor navigation techniques is that the technique will enhance the ability of a tactical team's first response team to navigate within the building in which the navigation system has been deployed. Bluetooth enabled RF tag or bacon tracking devices are commonly attached to persons or to moveable objects, so that the objects can be tracked using fixed readers (special purpose radios) deployed at different locations. This is the most common indoor navigation that exists today.

The navigation method is the "flip side" of this practice and is based on the concept that the detection of a Bluetooth enabled RF device, or RF tags or beacons, in a known, fixed location, by a moving reader, such as a Bluetooth enabled cellular telephone or other Bluetooth enabled device, provides a precise location of a person or a moving object, by the carrier of the cellular telephone or mobile device, who can supply indoor navigation without Global Positioning System (GPS).

The navigation method provides a low-cost, reliable system for firefighters and other first responders, enabling navigation within an interior of buildings, where a Global Positioning System (GPS) is not reliable. Under certain conditions, the Global Positioning System (GPS) satellite signals may have been temporarily disabled to prevent exploitation by terrorists. In a more likely condition, the satellite signal can't be received inside the building or other structure.

The disclosed navigation system foresees this limitation of Global Positioning System (GPS) based systems, and is intended for an environment that is potentially much less friendly to Radio Frequency (RF) signals. More specifically, the environment inside a building that first responders encounter may contain smoke, dust, or flames, and is intended to leverage advances in Bluetooth or other RF enabled tag or beacon technology. The navigation system will exploit the capability of storing critical building information, such as floor maps and emergency escape plans, available for retrieval and navigational assistance using any Bluetooth enabled cellular telephone or other mobile device, when and where it is needed.

Moreover the navigation system can serve as a navigator for the emergency exit route when and where needed. Each user can load the emergency exit floor plan and escape with the knowledge of the user's exact location along that route.

Aspects of the scenarios to be included:

The system identifies and tracks the user (a first response team member), and can further include an option to use the cellular telephone as a beacon.

The system provides the user with navigation information and directions for safely exiting the building.

The system provides location information of all team members, by way of an ad hoc network of radio terminals that combine RF and Bluetooth and allow communication chat and messaging between the team members without a need for any Internet or cellular communication. Such an option is not limited to the first response team but can be adapted for any user in an emergency and a non-emergency condition.

From the outset, the navigation system was designed with the capability to utilize existing technology so the system can be deployed as a standalone system or in tandem by a link with one or more existing systems. The navigation system focuses on employing technology that is already in place that simply needs to be expanded.

With the implementation of the navigation system, a first response team will be empowered to navigate and find its way in an emergency or a disaster condition. This capability can be a critical life saving power in modern congested urban living conditions; a capability that was not available prior to this invention.

It is believed that the implementation of the navigation system will assist counter-terrorism activities and, more importantly, will help the first response teams to save lives of people trapped inside buildings.

Conclusion

The applications of Bluetooth technology described herein offers a number of unique advantages: The application provides an ability to scan and determine a location using a small RF tag or beacon installed in an local area which emits a signal including the RF tags or beacons identification (ID). The Bluetooth technology provides a low cost and low battery consuming device. The applications of Bluetooth technology can be activated on any Bluetooth enabled device.

The other advantage is the multiservice nature of the Bluetooth infrastructure that adaptation of the RF tags or beacons for other purposes, such as for navigating, remote monitoring and control, a triggering mechanism to activate applications and/or systems, automatically establish a link to one or more existing systems, provide a variety of messaging capabilities, provide a push for conveyance of information, enable Location Based Services (LBS), and the like.

Location Based Services (LBS) are rapidly expanding. Outdoor location technologies are mainly based on Global Positioning System (GPS) technologies. Global Positioning System (GPS) are limited or inoperable indoors, and is therefore provide an inadequate solution. As a result, alternative indoor location systems are appearing on the market.

The need for a system arises from various market segments and applications. One example in the market is the Global Positioning System (GPS) based systems that use integrated positioning and navigation systems based on Global Positioning System (GPS) receivers as the primary positioning technology. Subsequent to the events of September 11$^{th}$, the Federal government mandated that Global Positioning System (GPS) capability be integrated into all cellular telephones.

However, the fact that uninterrupted satellite reception is not possible in many locations is a major limitation of Global Positioning System (GPS) based systems. Densely populated areas and other radio frequency signal shadowed locations, such as urban centers (alternatively referred to as "urban canyons"), generally do not allow proper operation of Global Positioning System (GPS), yet it is in these locations where the need is greatest.

There is a clear need for a cost effective system that maintains performance indoors, in urban canyons, and in city centers.

The disclosed application includes finding a solution to this task by providing a system and method to automatically generate waypoints along the user's route either in an indoor environment or an outdoor environment.

The disclosed application addresses the task of interactively guiding the user to a desired indoor destination and/or a desired outdoor destination.

The method for mapping an indoor environment is provided. A user's mobile device may receive an indication of a starting point on a floor plan. The application operating on the user's mobile device may prompt the user to travel in a particular direction, or the direction of travel may be determined by the user's mobile device in response to the user indicating a second location after the user has traveled to the second location.

As the user travels from the starting point in the designated direction, the user's mobile device may gather information about the indoor environment. For example, the user's mobile device may gather wireless signal strength data, from Wi-Fi or Bluetooth enabled RF beacons located in the proximity of the user's mobile device, while the user travels in the designated direction.

The user's mobile device may associate the gathered information with the path the user traveled from the starting point to the ending point. The operation can be done at the user's mobile device, such as a cellular handheld device. The association may also be performed by a remote server using data provided by the user's mobile device.

As the user travels from point to point, the user's device may indicate the area for which valid location information is available based on the path the user traveled and the information the user collected.

The method may include displaying a floor plan image, a floor mapping, or a floor indoor view. The floor images correspond to an indoor location, receiving a first input to indicate a first location on the floor plan image, gathering initial location information at the first location, and generating an indoor map, using a processor, using the initial location information wherein the indoor map includes an association of the initial location information with the first location.

The method may further include repeating the location information gathering process at a new location to associate new location information with the new location in the indoor map.

The method may include gathering additional location information as the user travels from the first location to a second location, receiving a second input to indicate the second location on the floor plan image, determining a path from the first location to the second location, and associating the additional location information with at least one location within the map corresponding to the path.

The method may include prompting the user to walk in a straight line when traveling from the first location to the second location.

The method may include providing instructions to the user to travel in a particular direction. The location information may be included in wireless signal data associated with one or more wireless RF tags or beacons installed in the local area. The first input may include performing a selection operation with an indicator placed on the floor plan image.

The method may also include providing a visual indication on the floor plan image of the path. The visual indication may indicate an area of the indoor map where the location information identifies a particular location. The building floor plan may be received from a remote server by way of the Internet or a cellular communication as part of the mapping and navigation application.

The method may also include a step of determining an approximate location determine by proximity to the RF beacons, providing the approximate location to the remote server, receiving a list of floor plans associated with indoor environments proximate to the approximate location, and selecting the building floor plan from the list. The method may include identifying the user's direction of travel by at least one of: (a) determining a relative orientation using the first location and the second location, or (b) using at least one of a user's mobile device built-in sensors, accelerometer, a gyroscope, or a compass.

The method may include a step of determining a degree of precision of the location for the data gathering operation, and using the degree of precision of the location to determine a location resolution for the indoor map. The degree of precision of the location may be determined using a number of available RF tags for beacons for which signal strength data and the beacons identification (ID) are available. The degree of precision of the location may determine at least one of the sizes of an indicator for indicating the current location, the size of the accuracy radius circle, or the width of a stripe for indicating an area of the indoor map for which the location information has been gathered. The application will display an appropriate overly on the floor map, the image map, the building map or any other applicable display map image. The method may include determining a coverage level of the indoor map compared to the floor plan images.

The navigation system and method automatically updates waypoints, when each Point Of Interest (POI) will have an RF tag or beacon that will broadcast an RF identification (ID) signal that will provide an instant detection. The navigation system will execute the specified file or program that will automatically trigger execution of a waypoint generation program.

For some years, local governments, in cooperation with various FM radio stations and recently a navigation system, have been putting together an automated way to get real time traffic data into cars so drivers can avoid traffic related issues. Real time traffic information includes news such as: congestion, construction, traffic accidents, recommended alternative routes, and the like. Currently available navigation systems depend on fix sensors or cameras and some navigation on manual information provided by the users or drivers.

An RF tag or beacon will be installed at each desired, known location or at each Point Of Interest (POI). Each RF tag or beacon will broadcast an RF signal containing an identification (ID) to be received and recognized by the mobile device and such information (including the RF beacon ID) will automatically transfer by way of the user's mobile device to the provided location detection of the user as well as statistical information about any possible traffic in the area. Such a method can be extremely helpful to manage and control a transportation system.

The user will no longer need to enter his/her way points manually and then wait for the provider of maps or Global Positioning System (GPS) to update their maps with the information. The process of updating the maps can take about a year in some cases. This way the user will receive the information that the user needs when the user needs it and where the user needs it upon entering an area with RF tags or beacons, providing an automatic check-in for the user and the facility business.

Again, no communication is needed to be established between the RF tags or beacon and the user's mobile device to enable detection of the RF tags/beacons. In the event that more information is desired or required it may be necessary to connect to a website or other server by way of the Internet.

It is believed that sooner or later it will be a standard procedure to install an RF tag or sensor on every location of interest (waypoint) or any place along any road, in an indoor environment, in an outdoor environment, or within any business. The RF tag or sensor will provide waypoint information to each user. Most waypoints, such as stores or other Points of Interest (POI) will be willing to pay for a RF tag or beacon or pay a subscription fee to be included on the map on the local area. This can include payment for an annual listing (similar to the telephone directory).

The system can interface with existing Global Positioning System (GPS) outdoor mapping as well as indoor mapping. The system can automatically switch between an outdoor application which is adapted to employ an outdoor map and receive information based on Global Positioning System (GPS) and an indoor application which is adapted to receive an indoor map and indoor navigation employing the RF tags or beacons.

Presently Global Positioning System (GPS) providers, map providers and search engines provide: City navigators and metro guide maps that contain many thousands of attractions.

These include: Food and Lodging, Attractions, Entertainment, Shopping, Services, Transportation, Emergency, and Government offices. In most areas, the maps provided are not updated and sometimes provide misleading information. Some of the waypoints listed appear to be very old and the information associated with them is not update. Listed Attractions include theme parks, museums, libraries, schools, parks and such. This feature is very useful when a user is located within an unfamiliar area.

Waypoints will be located automatically in the local area and plotted on the map displayed upon the screen of the mobile device. The waypoints can be stored on the local map at the handheld telephone or mobile device for future access.

The navigation system will revolutionize Global Positioning System (GPS) based systems and the mapping industry, from Global Positioning System (GPS), mapping companies' communication providers, car manufacturers to telephone directories and local guides. For the first time, the user of a Global Positioning System (GPS) navigation system will have an easy, reliable way to reach a destination inside buildings facilities, which can be referred to as the indoor world.

The most common problem with today's Global Positioning System (GPS) based systems is that navigation and mapping is not existent in an indoor environment. The disclosed navigation system provides the solution for this problem. Using the navigation system, the user will know where the user is, be able to accurately identify landmarks around the user, and receive automatic updates directly from the Points Of Interest (POI) in the vicinity that get automatic notifications about the user's presence in the respective area.

The navigation system is based on RF tags or beacons, each RF tag or beacon is associated with a waypoint and has its own identification (ID) (identifying the waypoint by type, address, etc.). The RF tag or beacon will broadcast, using Radio Frequency (RF), the identification (ID) to be scanned and picked up by the Bluetooth enabled mobile device. The identification (ID) provides a detection method and triggers a location identifier presented as a floating information image on the indoor map, wherein the location identifier references the user's location. The floating image or display will provide automatic waypoint updates around the local area and will allow the user to search local providers, such as waypoints, stores and the like; without any connections, communication, access to the Internet, or cellular communication. The signals received from the RF tags or beacons are the only information required to determine the location of the mobile device, as well as an accuracy radius circle. Access to the Internet or any other web communication provides more information such as push notification and messaging and Location Based Services (LBS) such as deals, direct advertising, and the like, all of which can be automatically conveyed to the user's mobile device.

Once the user is in the vicinity of their destination, a notification is automatically sent to the Internet, a website, or a business. The user will automatically receive the facility information along an associated waking route and in all directions around you.

No further action is required. There is no need to send a request or to access and search a database or a central system.

Conversely, other systems must send a request to a central system, or to a database, and then the user must wait for a response. This takes time and a communication link.

The disclosed unique approach provides results without any delay or waiting for communication or authentication and access time as there is no real communication between the RF tags or beacons and the user's mobile device. The result are instantaneous based upon the association, directly between the RF tags or beacons and the user's mobile device or other navigation device The RF tags or beacons broadcast their identification (ID) to be scanned and pickup by the user's mobile device to identify the location of the user using a proximity to the RF tags or beacons.

Additionally, the identification (ID) identifies the type of facility, the store, and the like. For example, the Identification (ID) can state whether the facility is a restaurant, a men's wear store, a women's wear store, and the like. The Identification (ID) can include the location of the user respective to the store, such as in the front of the store, in the back of the store, and the like.

Each facility can provide information about the store. For example, the automatic waypoint information of the user's presence can trigger or initiate an automatically notification to the business or other waypoint in the local area.

Due to the limitations of the mapping system currently used by the Global Positioning System (GPS) navigation system, the associated display method provides a unique solution to bridge existing devices like cellular telephones, in-car navigation and other Bluetooth devices. The disclosed navigation system provides an associated overlay navigation display method as a real-time floating display, or as a waypoint to overcome the limitations of current Global Positioning System (GPS) based systems and the existing mapping systems; especially indoors where each waypoint will be displayed over indoor maps or floor map images.

The display method is one unique way to bridge existing devices like cellular telephones, as a real-time floating overlay on a directional circular display to overcome the limitations of Global Positioning System (GPS) based systems and the existing mapping systems.

The overlay add-up device/display works like a VOR and provides add-up display which automatically shows the user their location in the immediate area in a circle, which includes a radius representing an accuracy and proximity distance from the locally detected RF tag or beacon.

The overlay displays over an existing navigation system, portable device or cellular telephone without Global Positioning System (GPS) support providing a circle that shown the location accuracy of the user on the local map.

The fact is, no digital maps are entirely accurate. A user needs to know which map makers are used by the product that they are interested in and check the maps for the area that they are concerned about. In addition, some map databases are created from vector data while others are just scanned copies of paper maps. In addition to mapping data, these same map makers can often provide Points Of Interest (POI) data. However, a software company might use the maps from one company and the Points Of Interest (POI) data from another company. Points Of Interest (POI) data normally takes three forms. One is public buildings, parks, airports, and possibly geographic objects. A second is government locations that include specialized points lists like marker buoys, and airplane markers. Finally, there are commercial establishments that usually include some information about their products and contact information. The location of commercial places is often derived from the street address and is not based on the actual latitude and longitude location information. Moreover there is the sky high cost of digitizing and updating the Points Of Interest (POI) and the waypoints.

The task is to provide a solution when the user will receive real time Point Of Interest (POI) or waypoints in the area where the user is automatically associated with a located proximity to RF tags or beacons in the area. The waypoint information can be information that is provided in real time, or essentially updates in real time and can be changed according to the waypoints and all according to a proximity detection of the RF tags or beacons identification (ID) in the area. The information can be used in these example applications:

The user may wish to locate an empty available parking space in the vicinity of the user. Just think of the empty parking spaces as waypoints. The system will determine if each parking space is vacant or occupied using the RF tag or beacon and associated sensor. The RF beacon will broadcast identification (ID) only when the parking space is available. The user's Bluetooth enabled mobile device will scan the area for the broadcasted signals from the beacons to find the available parking, such method describe in more details with U.S. Pat. No. 7,899,583 (issued to the Applicant, claimed as a copending parent application, and incorporated herein by reference).

The user may wish to see and locate real estate property available in the area proximate the user's location. An RF tag or beacon can be installed in each real estate property to trigger a request for more information. The additional information would be forwarded to the user or possible client when the user reaches a proximity to the property.

The user may wish to locate a specific store in a shopping mall. Waypoints can be as broad as a store in a mall, a particular aisle in a department store, or as narrow as a specific item on a shelf.

The user may wish to locate a specific conference room in a convention center, a Point Of Interest (POI) in an amusement park, or a Point Of Interest (POI) in a museum.

The user may wish to find the emergency exit route during an emergency or the first response team may need navigation within a facility in an emergency situation.

The user may be looking for a train location at a station, or a stop along a route of a subway or other underground train system. All of this information would be updated, including the waypoints, in real-time.

It is believed that the automatic updates of waypoints revolutionizes the Global Positioning System (GPS) and Navigation Industry.

For the first time the user will know the information the user wants and receive the information when the user wants or needs the information; all according to the location of the user.

The local business owner can automatically introduce associated content in real time to the users in the area of the business when the user accesses or enters the respective store. The content can include deals, coupons, and specials and provide more information to user about the business. The business, in turn, can benefit from statistical information about the clients, such as habits, a client profile, loyalty and rewards.

The Global Positioning System (GPS) and navigation industry can tap to the huge local advertising market, which is estimated to be $134 Billion in the US alone.

Automatic notification of user existence in the place, the store, the facility, and the like.

Mall or store navigation solution inside the mall or the store.

Return To Parking (RTP) can assist the user in returning to the location where the user parked their car.

For example, a typical application could be:

A pedestrian asks for directions to a specific store within a mall.

A pedestrian asks for directions to a specific aisle or product inside the store.

A shopper asks for a specific department within a department store.

A pedestrian asks for directions to a Point Of Interest (POI).

In an emergency, the first response team requires navigation inside a smoke filled building.

A store owner can use the notification and the knowledge of existence of the user for loyalty and rewards.

The identification (ID) of the RF tag or beacon can trigger a link to existing software and notify the local system of the presence of the user such as:

A traveler is checking in into a hotel or resort. The hotel or resort can provide with automatic check in and interface to the hotel or resort guest receiving system.

A traveler is checking in to a flight in the airport. The airline provides the traveler with an automatic check in for the flight when the traveler reaches a close proximity to a localized RF tag or beacon.

A customer is checking in to a restaurant or food service. The business will recognize the customer when the customer is in the proximity of the local RF tag or beacon.

The pedestrian reaches an advertising area or billboard that can be recognized by the user located a close proximity to the advertising area and provides the user with customized and/or personalize advertising or offers.

A customer is entering a store, a bank, or any other a facility, wherein the user is recognized accordingly and the facility provides additional information or services.

The RF tags or beacons can serve to track an employee's work times, including a check in and checkout times from a designate area.

The RF tags or beacons can serve as part of a payment process, where the user's cellular telephone and the local proximity RF tags or beacons can provide additional security for a payment process.

The infrastructure provided by local RF beacons can be integrated into a local dating system.

The local RF tags or beacons associated with the user mobile can create a virtual security zone for a child, an elderly person, or any care monitoring.

The location of the user can be associated with the local beacons, which can be interfaced with social networking.

The RF beacons can be integrated into a solution for parking related issues where each parking location can be identified by an RF beacon. The solution would include additional sensor to determine the occupancy status of the parking space (referred to by the Inventor as nav4parking). This process can determine whether a parking space is occupied or vacant and provide this and other parking information to the end user. The RF beacon will broadcast a parking space identification only when the parking space is available. The user's Bluetooth device will scan the area for the signal from the broadcasting beacons to aid in locating the available or unoccupied parking space(s). This method is described in more details in U.S. Pat. No. 7,899,583 issued to the Inventor and claimed as priority herein.

The RF tag or beacon can be installed into or integrated within a vehicle to provide vehicle related applications, such as payments, security, car broadcasting, car tracking, car communication, and automatic car counting. The proposed system can automatically provide transportation management with statistically information.

A system and method to provide a user with information which is related to the Point Of Interest (POI), the navigation system provides detection and navigation references, position determination and information related to the object or Point Of Interest (POI) directly and automatically to the user interface, such as the mobile device, upon arriving to a close proximity to the RF tags or beacons installed in the area.

Moreover the application provides more than simply an icon.

At present, no prior art utilizes the capabilities to display a real time representation of navigating and get an update directly from the waypoints. Also most systems are designed for the old query type search where interface to Internet and or database central system is needed.

The navigation system automatically detects a signal directly transmitted from the RF tags or beacons installed at the waypoints. No communication is required to be established between the mobile device and the RF tag or beacon, including cellular communication, and no pairing is required. Other systems must have bandwidth available, wherein the bandwidth is used to send a request to a central system or to another remote database and then the system must wait for a response. Alternatively, other systems require Internet connections. This takes time.

Even if other currently available systems have bandwidth, those systems are still based on the existing search concept where the user submits a query, searches and waits for the response. This can be impractical. The navigation system provides the information automatically, without submitting any query, and the response is according to the user's location based on RF tags or beacons installed in the local area.

Again, most of the existing prior art is based either upon a Global Positioning System (GPS) based system or an existing car navigation system, which coincidentally also depends on a Global Positioning System (GPS).

The existing mapping used by these systems has the same limitations as described previously, and is impractical.

The disclosed navigation system bridges the gap between the Global Positioning System (GPS) based navigation systems and provides a complete solution.

U.S. Pat. No. 7,031,875 to Ellenby et al. describes a pointing system for addressing objects, and provides a system and method based on Global Positioning System (GPS) and Internet or database communication. The system taught by Ellenby, et al. is not exactly navigation but an information based system that requires the Global Positioning System (GPS) to locate the user's location. Because of the reliance upon the Global Positioning System (GPS), indoor services is likely out of the questions and the need for bi-directional communication as well with Global Positioning System (GPS) limits its availability and accuracy. The system taught by Ellenby, et al. does not provide real time updates of the waypoints and needs access to the Internet and or a central database.

One common problem with today's Global Positioning System (GPS) based systems is that the mapping and the waypoints are not updated on a timely basis. In most areas, the maps provided are not updated and sometimes provide misleading information. Some of the waypoints listed appear to be about two (2) years old. The new service like GOOGLE EARTH provides satellite images that are almost two (2) years old and for sure can't provide an on-line and real time accurate picture of the existing area and the associated waypoints.

The disclosed technology offers a solution to this task by providing a system and method to automatically generate waypoints along the user's route either in an indoor environment or an outdoor environment. The updates are based on the determined location of the mobile device in proximity to installed RF tags or beacons and the updated information can be triggered by the determined location. Such a method does not exist in today's navigation or mapping, especially in an indoor environment.

The disclosed technology offers a solution that interactively guides the user to a desired destination, independent of the location being indoors or outdoors.

The disclosed navigation system and method automatically updates waypoints, by using an interface to an existing Global Positioning System (GPS) based system, when each Point Of Interest (POI) will have an RF tag or sensor that will broadcast an RF signal that can be converted to a Global Positioning System (GPS) waypoint, In response to the RF signal (from the RF tags or sensors), the navigation system will execute the specified file or program that will automatically trigger a waypoint generation program.

For some years, local governments, in cooperation with various FM radio stations, have been putting together an automated method to provide real-time traffic data to vehicles so drivers can avoid traffic. Real time traffic information includes traffic conditions, such as: congestion, construction, traffic accidents, and recommended alternative routes.

A Bluetooth and/or Wi-Fi enabled RF tag or beacon will be installed at each Point Of Interest (POI). Each Point Of Interest (POI) will have an RF tag or beacon that will broadcast a wireless RF signal with identification (ID) that will provide an instant detection. The navigation software or other application for Location Based Services system will execute the specified file or program that will automatically trigger waypoint generation program, and, at the same time, provide the business owner a notification of existence of the user in the vicinity of the business to allow the business to provide the user with relevant messages or offers, more information or push message to the user cellular telephone just by being in proximity to the RF tag or beacon.

The user will no longer need to enter his waypoints manually and then wait for the providers of maps or Global Positioning System (GPS) to update their maps with the information (this can take about a year in some cases). This way the user will receive the information that the user needs when the user needs it and where the user needs it.

It provides a process that automatically triggers delivery of information according to the RF tag or beacon located in the proximity of the user. The information would be provided directly from the local area business waypoints and to the user's display device. The detection of the user can be accomplished without any bi-directional communication. In the event that more information is required and/or the business needs to provide more information, it may be necessary to connect to the Internet. The connection to the Internet allows an interaction or engagement based upon a proximity to the Bluetooth enabled RF tag or beacon. This can trigger specific application functionality and provide automatic notification of "I am here" to the business owner.

It is believed that sooner or later it will be commonplace to install a RF tag or beacon on every location of interest (waypoint) or within any business will provide waypoint information as a method to provide each user with the information. Most stores, Point Of Interest (POI) or other waypoints will be willing to pay for a RF tag or beacon or pay a subscription fee to be on the Global Positioning System (GPS) system providers that are able to show their location and information on a map. Alternatively, the merchants would pay for an annual listing (similar to the telephone directory).

The disclosed system can interface with the existing Global Positioning System (GPS).

Present Global Positioning System (GPS) providers, map providers, and search engine providers, such as City Navigator and Metro Guide Maps, contain thousands of attractions.

Other waypoints that can be included: food and drink locations, lodging, attractions, entertainment, shopping, service providers, transportation, emergency facilities and government offices.

In most areas, the maps provided are not updated and sometimes provide misleading information. Some of the waypoints listed appear to be about two (2) years old. Listed attractions can include theme parks, museums, libraries, schools, parks and the like. This feature is very useful when a user is located in an unfamiliar area. Waypoints will be automatically included in the local area and plotted on the map screen. The waypoints can be stored in the Global Positioning System (GPS) database for future access or stored on the user's mobile device.

The navigation system will revolutionize Global Positioning System (GPS) based systems and the mapping industry, from Global Positioning System (GPS), communication providers for the mapping companies, car manufacturers to telephone directories and local guides; for the first time the user of a Global Positioning System (GPS) navigation system will have an easy, reliable way to reach a destination.

One common problem with today's Global Positioning System (GPS) based systems is that the mapping and the waypoints are not updated on a timely basis. The disclosed navigation system provides a solution for this problem. Using the disclosed navigation system, the user will know where the user is, be able to identify landmarks around the user accurately, and receive automatic updates directly from the Points Of Interest (POI) located in the vicinity of the user.

The navigation system is based on RF tags or beacons installed in the local area. Each tag or waypoint has its own identification (ID) (identifying the waypoint by type, address, etc.). The RF tag or beacon identification (ID) and proximity to the RF tags or beacons will allow localized detection and interface with existing or indoor application and navigation, Global Positioning System (GPS) based systems, as a floating information display on the Global Positioning System (GPS) map referenced to the user's location. The floating display will provide automatic updates of waypoints and will allow the user to search local providers (waypoints and/or stores and more information about the store or business. The localized detection allows the local businesses to have an automatic notification when the user approaches or is within the proximity to the business and allow him to provide the user with more information about the store, the business, any deals, and the like.

The task is to provide a solution where the user will receive real time Point Of Interest (POI) or waypoints in the area automatically to the user's existing navigation system or to the user's cellular telephone. The waypoint information can be a real time information update in real time and can be changed according to the waypoints.

A cellular telephone application, which the user will scan the area for exiting Bluetooth or Wi-Fi enabled RF tags or beacons will receive data and more information utilizing the cellular telephone's Bluetooth capability.

The system can trigger an application as well as a link to any existing system and software. A notification can be sent to a web, email a web-based application or even interact with a social network. The navigation system will interface with existing in-car media system and in-car navigation systems.

It is understood that the waypoint or Point of Interest (POI) will be represented by the following suggested identification (ID) examples as part of the beacon identification (ID) to be recognized by the user Bluetooth mobile device (cellular telephone), according to the type of the Point Of Interest (POI):

| ID Code | POI Type | Cat. Type |
|---|---|---|
| | Waypoint | |
| 32 | Food/Restaurants | Food |
| 33 | Gas Station | Information |
| 34 | ATM/Banks | Finance |
| 35 | Department Store | |
| 36 | Apparel Store | |
| 37 | Sports Store/ | Information |
| 38 | Books video | Store |
| 39 | Jewelry | Store |
| 40 | Toys/Photo/Elect. | Store |
| 41 | Music | Store |
| 42 | Gifts | Store |
| 43 | Furnishing | Store |
| 44 | Service | Service |

-continued

| ID Code | POI Type | Cat. Type |
|---|---|---|
| | Waypoint | |
| 45 | Computers | Store/Service |
| 46 | Hairstyle/Cosmetics | Store/Service |
| 47 | Office | Office |
| 48 | Security/Police | Service/Emergency |
| 49 | Children's program | Service |
| 50 | Social Affairs | Religious / Service |
| 51 | Religion | Religious |
| 52 | Phone | Service |
| 53 | Travel | Transportation/Service |
| 54 | Parking Transportation | Service |
| 55 | Guest service | Service |
| 56 | Library | Service |
| 57 | Transportation Management | Service |
| 58 | Municipal | |
| 59 | Post Office | Service |
| 60 | Government | |
| 61 | Market | Store/Service |
| 62 | Alarm | Emergency |
| 63 | Emergency | |
| 64 | Hotel resort and cruise ship | |
| 65 | Education facility, school, university | |
| 66 | Sport facility, sports arena, stadium | |
| 67 | Conference and show | |
| 68 | Amusement park | |
| 69 | Implements as mail and address | |
| 70 | Implements in a road as road sign or transportation entity | |

The identification (ID) described above is only are suggested examples. The fact is that part of the beacon identification (ID) will be to recognize the facility, the store type, or the location to provide instant detection and determine the user's location by just being in a close proximity to the RF tag or beacon in the localized area.

The navigation system enables remote and local update of the local floor plans and the information about the local area and waypoints business in the area, when the location's indoor application can be triggered to download at the destination. One example of this would be at the entrance of a shopping mall, a department store, an amusement park, a museum, a parking garage, or a downtown area of a city, where a sign or a shopping mall information sign would provide direct information which would trigger a download of the local application.

The system can work inside a building whereas the Global Positioning System (GPS) cannot. Local detection is obtained by way of the Bluetooth interface.

The disclosed system provides information about each facility or store, including information about the type of the facility. For example, the type of store, a product, and the like. The identification (ID) of the RF tag or beacon triggers delivery of information based upon the proximity of the user's mobile device to the RF tag or beacon.

The navigation system can be an attractive addition to existing deployments of Wi-Fi and Wi-Fi hotspots and a feature for business and cities that deploy Wi-Fi.

In case of an emergency or security situation, the system can provide authorities with information.

Utilizing the navigation system, the facilities (waypoints) in the vicinity around the user car are displayed on a floating overlay using either a cellular telephone application, a standalone device, or an existing installed navigation system (with or without any mapping). The information can be pushed to the user's mobile device when the user is in the proximity of the area.

The recent introduction of imagery services, such as GOOGLE EARTH or other similar services, that are offered as an enhancement to Global Positioning System (GPS) at a fee, still provide out of date information, with the unsatisfactory result. For example, users can encounter road changes and area development not shown on the maps and imagery.

The option of downloading a floor plan can be exercised either remotely or locally as part of mapping or navigation application.

With the navigation system, the user will have the information that the user wants, when the user wants it, where the user is located, and at an affordable price. Once the user is in the vicinity of their destination and the user switches on their navigation device, the user will automatically receive facility information along the walking route and in all directions around them.

Additionally, each facility type can be identification (ID) coded (apart of the beacon identification (ID)) to identify the type of the store, and the like For example, the type of waypoint can be a restaurant, a men's wear store, a women's wear store, real estate property, a garage sale location, a special sale. The information is provided as being up to date, real time information; information which can't be displayed and located using today's navigation system. The disclosed system can tap into the local business industry, providing localized advertising.

Each identification (ID) code can be included as part of the beacon identification (ID), which can trigger a process to access and obtain complete information about the store.

The system can be operate on a cellular telephone or any other navigation system and would not be limited to a Global Positioning System (GPS) navigation system.

Moreover, the navigation system can solve the Return to Parking (RTP) problem, where many users might forget where they parked their car. The system has an option to save the location on the cellular telephone, which would employ a parking detector application. The parking detector application provides directions to the user to the location of their parked car, which will make it easy to locate their parked car.

The navigation system is designed for global use and is not limited to malls, stores, amusement parks, museums, sports stadiums etc. It can be implemented in parking garages, metered or non-metered parking spaces; almost anywhere and in any place; even in any infrastructure.

It is envisioned that in the future all new construction or infrastructure will have the RF tags or beacons included in the design or built in the structure.

One feature of the proposed invention integrates the navigation as part of the NAV4 concepts where the system will provide complete solutions for local navigation in an area where the Global Positioning System (GPS) and Global Positioning System (GPS) mapping just can't provide accurate and updated information that is so essential to the user.

A typical application is navigating a pedestrian in an environment like a mall, a department store, a specialty store, a conference, a trade show, an amusement park, a university, a hospital, a school, a municipal building, a museum, a subway, a train station, an airport, a down town center, any type of parking facility, or any place when and where the Global Positioning System (GPS) cannot be provided or is not accurate or precise enough. The system can be used for navigation by first responders during an emergency or a disaster.

The navigation system is part of a broad suite of applications that include a complete solution to the user including when the user begins looking for a space to park the user's car, when the user parks their car, when the user walks towards a store or a mall, and/or when the user wants to return to his parked car, looking for the place that the user's car is parked in.

The suite may include:

A parking detector and navigation to the empty, vacant or available parking space.

Nav4 mall or store navigation solution, which provides navigation within an interior of a mall or a store.

Return to Parking (RTP), which locates the parking space that the user parked their car.

A system and method to provide user information which is related to the Point Of Interest (POI)

The navigation system provides detection and navigation reference, a method for determining a position or location of the user, and a method for providing information related to the object- or Point Of Interest (POI) directly and automatically to the user through the user's cellular telephone or other mobile device without any bi-directional communication through the Internet or other method of accessing the web, such as a cellular connection.

Special operation mode (Shopping) (referred to as NAV4SALE) provides navigation to one or more special sale items within a department store. This is a unique new tool for the business owner as well the customers, wherein the process enables navigation to help the user locate an item within a store or a mall. In one example, the item can be an item that is on a special sale. The application will provide the user with a way to navigate to the waypoint representative of the special sale, a coupon, a special event, a promotion, and the like. The navigation can be provided in an indoor environment or an outdoor environment. This would be an enhancement to local advertising.

The local advertising market is estimated to be $134 Billion in the US alone. The mapping capability is at the forefront of a local strategy. Due to the lack of availability of the Global Positioning System (GPS) within an indoor environment, as well with the limitation of its accuracy in an outdoor environment and the delays in updating the associated maps that is provided by the current mapping and Global Positioning System (GPS) industry, there is no real method for tapping into this huge market.

The navigation system can vitalize the navigation and mapping industry by providing a unique innovation that combines the Global Positioning System (GPS) and the existing navigation as well as the cellular telephone users with an indoor navigation process based upon the local map that will provide the user navigation to a desired location within a mall or a store, to the right store or product within the store, or even an isle inside the store. This technology provides a new marketing tool to the store, mall, or business owner to acquire the customer by using this new service. A new unique way to bring the customers to the product in sale, direct the customer directly to the isle, and more specifically, to the product that you want to move. The store will also have an option to deliver more content (advertising, sale, coupons, promotions, and the like) to the user when the user approaches or enters the store using push technology to the user's Bluetooth enabled cellular telephone.

Special operating mode (Museums) (referred to as NAY4Museums, NAV SHOW, and NAV CONFERENCE), which provides navigation and interactive information from the museum's show, conference exhibition, and the like to the user's cellular telephone device by way of the integrated Bluetooth interface.

The application enables the user to explore the museum or the conference show exhibits in a new unique and easy way. The application provides the user with an ability to navigate about a floor map of the museum or the conference center, indoor navigation, navigate to exhibits, restaurants, cafes, lavatories, and the like, by using the software on the user's navigation or cellular telephone.

Any museum, conference, or show provides the attended a map to the exhibits, some also provide additional audio device (headset) to get more information on the exhibits.

The navigation system will provide a unique indoor tool that will navigate the attendee about the museum, the conference center, or the show in an easy manner. The navigation system operates to the user's Bluetooth enabled cellular telephone. When the user reaches a desired exhibit the user will be allowed to download information about the exhibits directly to the user's cellular telephone, a mobile device, or a Bluetooth enabled headset. The system provides indoor navigation to the exhibits as well navigation to restaurants, cafes, lavatories, and the like. The process can be accomplished on the user's navigation device or cellular telephone and would be based upon the facility map.

Special operating Mode (Mass Transportation) (Referred to as Navtrain) For all the users of a mass transportation system, the navigation system can allow, locate and point the user to the exact station or location along a route, an easy way to navigate in the train, subway, underground system, a new way of subway or bus mapping in either an indoor or an outdoor environment and directly to the user's navigation device or cellular telephone. Every day, millions of people are using the mass transportation system, including trains, subways, buses, and the like. Each passenger depends upon the transportation map for route information, schedules, and additional services provided by the transportation system. Most of the passengers today carry with them a cellular telephone.

The navigation system will provide the passenger with navigation inside the transportation system, preferably by way of the passenger's Bluetooth enabled telephone. The passenger will know the exact location or station along the route as well any additional optional information such as schedules, and the like. This adaptation of the navigation system provides a new add on service to the transportation providers as well to the passengers, utilizes the indoor navigation method and the ability of the transportation entity to use the RF tag or beacon installed in transportation facilities to have add on to transportation management control system.

Special operating mode (Parking) (referred to as NAV4PARKING) is previously described in two (2) parent patent applications. This feature provides a process for determining an empty or vacant parking space and navigation directing the driver to the vacant parking space. This is one example of a solution using the RF tags or beacons to become part of a solution to parking problems where each parking location can be associated with an RF tag or beacon and a respective sensor to determine if the parking space is vacant or empty and provide parking information to the user. The RF beacon will broadcast identification (ID) only when the parking space is available. The user's Bluetooth enabled mobile device will scan the area for the broadcasting RF tags or beacons to identify one or more available parking spaces. Details pertaining to this method are described in more detail in U.S. Pat. No. 7,899,583 issued to the Inventor and claimed as priority herewith.

A new generation of urban parking innovation that answers the most demanding need of any driver, more specifically, knowing where to park. More precisely, finding and navigating to the vacant or empty parking spaces located near the driver. The process will also provide the answer to "where did I park my car?", when the user is returning to the parked car. In our society where time, convenience and comfort are precious, commodities parking is a major headache.

Parking detection system is the next generation of urban parking and the answer to the most demanding need of any driver, Where to park?

The navigation system provides a method of self organizing a parking system that will enable municipalities and other parking authorities to easily identify, exploit and manage revenue opportunities, while at the same time, provide better service at a lower operating cost. With the implementation of the navigation system, detecting vacant or available parking spaces and navigating the driver to the available parking spaces will become part of an information revolution.

With the parking space identification and navigation system, drivers will save time and reduce the frustration of hunting for available parking spaces, and will also save the user money on fuel consumption and car maintenance costs.

By using and modifying existing technology, the disclosed system will integrate easily with other transportation and communication systems. The RF tag or beacon can be attached to existing parking meters, and in the future will interface with them and can eventually replace them.

Municipalities will have better control and centralized monitoring of their parking space inventory, resulting from the new generation of urban parking.

Special operating mode (Real Estate) (Referred to as NAVRealty): A new unique tool to accommodate the real estate industry by providing a seller, a real estate agent, and/or a real estate buyer a process to locate and navigate to available real estate property in the user's area, according to the user's location and directly to his navigation device and/or cellular telephone. The user may wish to see and locate the real estate property available in his area according to his location. An RF tag or beacon can be installed in each listed real estate property. When approaching or within the real estate property, the association with the RF tag or beacon can trigger a request for and receipt of more information about the available property to the user or client.

According to the Newspaper Association of America, the real estate advertising market is estimated at $11.5 Billion. Recently MYNEWPLACE.COM joined apartments.com and rent.com in the $3 Billion on-line apartment listing. ZILLOW, a new startup company just raised $32M in founding with the basic idea to put your house on GOOGLE EARTH (a satellite mapping service). GOOGLE, YAHOO, AOL, ASK and MICROSOFT are looking to develop real estate services.

The navigation system brings the listings to the user's hand, by combining the navigation system and/or the cellular telephone or other mobile device; the user will be allowed to obtain information associated with the real estate property in the area proximate to the user, wherein the information is updated according to the user's location in real time.

The user will have the option to search out of the box for property in his area. The navigation system will serve as a new tool for the real estate industry as well providing a search engine for the benefit of the seller, the real estate agent, and/or the real estate client.

Special operating mode (merchant navigation) (referred to as NAV4STORE and NAVMALL) The merchant navigation provides navigation inside a store or a department store to a specific department, aisle, or specific product, and can include an option for presenting advertising and special promotions. The merchant navigation provides a method to explore an indoor mall, inside a department store, and the like, providing navigation to the store, the department, or to any other right place that the user needs.

The system provides navigation on the mall map or the store map enabling the user to find their way around using their cellular telephone, navigation system, or other mobile device without use of the Global Positioning System (GPS). The disclosed navigation system will provide a new kind of service and a new marketing strategy for the malls, the stores, and the business owners. The disclosed navigation system can enhance local advertising.

Special operating mode (Amusement parks or theme parks)—(referred to as NAV4Amusement Park, NAV4ThemePark, and NAV4Amusement Parks) The NAV4Amusement Parks provides the user with navigation to desired attractions as well as a new way to register in a virtual queuing system, all in an easy way using the user's cellular telephone without a need for the Global Positioning System (GPS). Provides a new media add-on service.

Ever wonder what it will be like to navigate inside the amusements park to the desired attraction, to know the schedules of shows or events at the attractions, utilize a virtual queuing system from a remote device instead of standing in line? With the navigation system, all this can become a reality and go directly to the user's cellular telephone without any need for Global Positioning System (GPS). It is understood that the present invention can provide a new tool and service which would benefit of the amusement parks and the user alike.

Special operating mode (roadway support) (referred to as NAVSIGN): The roadway support function can provide the user with automatically generated waypoints associated with road signs, wherein the waypoints would be displayed on the user's navigation device, the user's cellular telephone, and/or the car navigation system as a way for secure driving. The information can communicate with the car computer to provide automated support. For example, the system can automatically slow down the car when the car enters a school zone.

Special operating mode (emergency)—(referred to as NAV EMERGENCY): One of the important features of the disclosed indoor navigation applications is to provide enhanced navigation to the first response team within the buildings in which the team has been deployed.

The navigation system provides a low-cost, reliable solution for firefighters and other first responders to navigate inside buildings where the Global Positioning System (GPS) is not reliable, as the Global Positioning System (GPS) signal can't be received within the interior of the building or the Global Positioning System (GPS) satellite network may have been disabled temporarily to prevent exploitation by terrorists.

The disclosed navigation system anticipated these limitations of the Global Positioning System (GPS) based systems, and is intended for an environment that is potentially much less friendly, such as the environment first responders encounter inside a building may contain smoke, dust, and/or flames, and is intended to leverage advances in ubiquitous Bluetooth or other RF tag or beacon technology.

The navigation system will exploit the capability of storing critical building information, such as the floor maps and emergency escape plans, for retrieval and navigational assistance by way of a Bluetooth enabled cellular telephone, when and where the information is needed. Moreover, the navigation system can serve as a navigator describing the emergency exit route when and where it is needed. Each user can download the emergency exit floor plan and escape from the building with the knowledge of the user's exact location along the emergency exit route.

Aspects of the scenarios to be included:

Identifies and tracks each user (a first response team member).

Provides the user with navigation information and directions for safely exiting the building.

Provides location information of all team members using an ad hoc network of radio terminals that combine RF and Bluetooth technology and allows communication chat and messaging between team members without any need for Internet access or cellular communications. This application is not limit to the first response team and can be employed by any user in an emergency and a non-emergency condition.

From the outset, the navigation system was been designed with the capability to utilize existing technology so the navigation system can be deployed as a stand-alone system or in tandem with existing systems.

With the implementation of the navigation system, a first response team can be empowered to navigate and find its way in a case of emergency or a disaster. This capability can be a critical life saving power in modern congested urban living conditions that was not available before now.

It is believed that implementation of the navigation system will assist counter terrorism activities, and more importantly, can help first response teams to save lives of people trapped inside buildings.

In all, the unique disclosed method can be summarized as follows:

Provides direct communication between the area (waypoints) and the user (the beacon navigation application and/or the Global Positioning System (GPS))

Automatic waypoint generation in real time according to the location of the user.

Use in an indoor environment and/or an outdoor environment, excluding a requirement for use of the Global Positioning System (GPS)

A business model where the business, store, or store owner can subscribe to a service for including a listing in the navigation/Global Positioning System (GPS) mapping application.

Providing an overlay floating model, which can work with or without mapping.

Exclusive of any requirement for Internet access or cellular communication in order to detect and determine a user's location for use in conjunction with additional Location Based Services (LBS) information.

Capability to interface with the existing system and create and support a link to an existing software and hardware system.

The option of searching is completed locally on the user's mobile device, without a requirement of a central database or an Internet search.

Any Bluetooth enabled cellular telephone is capable of running the Navigation or other Location Based Services (LBS) application.

Provides indoor navigation using an indoor facility map and/or floor images for guidance and navigation.

All Global Positioning System (GPS) navigation systems lack of real time displays of the waypoints around the driver's or user's route. Therefore, it is inherently probable that the information provided by the Global Positioning System (GPS) maps are old or outdated and are therefore inaccurate.

The navigation system provides a system and method for automatically generating and updating navigation waypoints along a route in real time. The process can be based upon a proximity of the user based upon the detection of localized RF tags or beacons installed in the area. The recognition of the user within an area can automatically trigger delivery of real time waypoint information along the user's route. The information would be transmitted directly to the user's navigation device and/or cellular telephone.

The navigation system can present a circular omni-directional display on the map or floor images as a floating overlay shown on an existing navigation map, floor map, or indoor floor images.

The waypoint data trigger is generated directly from the waypoint beacon's identification (ID). Again, the process can be accomplished without the need for Internet access or cellular communication to determine the location of the user's navigation device.

The navigation system will bridge the existing navigation system and Global Positioning System (GPS) mapping to new real time information according to the user's location.

The navigation system will allow for the first time, the navigation and Global Positioning System (GPS) industry to tap into the local advertising market estimated to be $134 Billion in the US alone. The proposed mapping processes are at the forefront of local strategy. Due to the lack of availability of the Global Positioning System (GPS) in an indoor environment, the limitation of the accuracy of the Global Positioning System (GPS) in an outdoor environment, and the non-updated mapping that is currently provided by the mapping and Global Positioning System (GPS) industry, there is no real tapping to this huge market.

It is believed that the navigation system can bring a new life to the navigation and mapping industry as well to the cellular providers by providing a unique innovation that combine the Global Positioning System (GPS) and the existing navigation to the real time information directly from the waypoints, which can be referred to as a COOLSPOT.

The disclosed invention is directed generally to the field of navigation and, more particularly, to a method for providing navigation to a user, wherein the navigation is adapted for use in an indoor environment or an outdoor environment. Examples of locations include within a mall, a store, a building, a department store. Additionally, the disclosed invention provides Location Based Services directly to the user's navigation device or cellular telephone.

The proposed applications have identified and resolved a great deficiency in the technology available for local businesses. Location Based Services (LBS) represent a huge advertising and mapping market, estimated at over $150 billion a year. Location Based Services (LBS) represent a big opportunity in the navigation market that has not been explored yet.

Existing System and Industry Trends:

Local mapping today is mostly paper. Mall maps, store maps, mapping of department stores, commercial buildings, hospitals, schools, campuses, municipalities, shopping centers, downtown districts, indoor facilities, building maps, parking areas, parking garages, amusements parks, subway systems, transit maps, museum maps, area attractions maps, hotel and resort maps and even more importantly the emergency maps and procedures posted in buildings.

Factors in Local Mapping

Local maps can be of either indoor locations or outdoor locations.

Local maps are available on paper, on the web, and in some cases on a kiosk in the facility.

A high degree of accuracy is needed in order to provide usable maps for navigation indoors. The desired accuracy would be less than 10 meters. This accuracy is to adequately support navigation to a store, a parking space, and the like.

The Global Positioning System (GPS) cannot provide acceptable accurate mapping as it is only accurate to within 100 to 200 feet. This is the reason why the Global Positioning System (GPS) industry does not provide this type of mapping. The same is true for cellular network providers, as the accuracy is also within 100 to 300 feet, and that is only when the cellular network is available or accessible. Cellular network signal availability is often a problem in an indoor environment and also problematic when it is most needed: during an emergency condition. In most emergency conditions, the cellular networks fail due to power outages, communication issues, and high bandwidth demands. Again, this is the reason that there is no local mapping available for cellular users. (Local mapping equates to accuracy in finding a store, a room, or a parking level within 5 m.)

At this time there is no indoor navigation solution. The most recent technology provides access to a user's location through a combination of group social networking and a buddy list.

Most technology available today attempts to locate a moving user within an area. The present invention reverses that idea and lets the user navigate the local area on local maps, using indoor navigation compared to outdoor navigation. Pedestrian navigation is more than locating and navigating. Most likely the user is at or near their destination already. There are two possibilities: either the user is unfamiliar with the surroundings and their task will be to explore the surroundings or the user is looking for a specific product. The user's defined goal can be as simple as buying a new pair of shoes, getting a book, or just going to shop around, exploring a new location, new deals, specials sales, or simply sightseeing.

The theory is based on the belief that "you are what you do", meaning, services, specials, sales, coupons, discounts, and the like are one key element.

One main task of indoor navigation is to show the user where specials, sales, and coupons are and directly navigate the user to them. At the same time, the indoor navigation program provides the business owner or operator with a marketing tool that currently is non-existent. The integration of multimodal journey planning and guidance to dynamic waypoints, sales, specials, and complex public interchange facilities, and the like are not adequately addressed by existing systems.

In some aspects, indoor navigation looks simpler than outdoor navigation. For instance, the geographical area covered is much smaller and the expected speed of travel is much lower, as the user would be walking. However, other aspects make indoor navigation much more challenging. Initially, among these is the unsuitability of Global Positioning System (GPS) and related technologies within an indoor environment. Additionally, in a complex indoor environment, the requirements are more stringent. For example, vertical positioning of the topology and the need for accuracy less than 10 meters to the store, the product, to the aisle containing a desired product, or the parking space cannot be achieved with today's existing systems.

Navigation within the indoor market represents much greater potential than the outdoor market, as on average, people spend more than 90% of the time indoors.

The Objectives and Goals behind This Concept: The technology behind the navigation system is quite simple. The technology employs a direct communication between the user's mobile device, cellular telephone, or a Bluetooth enabled device in conjunction with Bluetooth enabled tags, sensors, or beacons installed in a known locations within an area, a building, a store, or a facility without relying on the Global Positioning System (GPS), centralized servers, Internet access or bandwidth, or cellular communication. It is noted, that although these functions are not required, they can be supportive when available.

The main concept is to use existing off-the-shelf technology, such as Bluetooth technology or Wi-Fi technology, with small modifications and devices with a minimal cost of deployment and to provide a simple indoor technology which can deliver accuracy with an integrated suite of applications. The concept is especially designed for the user or shopper in an indoor environment. The system is based upon RF tags or beacons, such as Bluetooth or Wi-Fi enabled RF tags or beacons installed in the local area. The RF tags or beacons would be scan by the user's mobile device or cellular telephone and use the proximity of the scanned beacon identification (ID) and signal strength to provide an instant detection of a user within the area and would automatically notify the business owner of the presence of the user. The system can also trigger delivery of updated location based information to the user; all without exchanging any paired communication with the RF tags or beacons in the vicinity of the user.

The System Includes:

Local mapping or local floor images: The indoor view of the facility is a feature of the application. The facility can offer a download from participating merchants. The download would provide a local map from a proximity information sign, a store information center, a mall information center, a building information center, or a respective server. The downloading can be triggered by the application according to the user's location as determined by the proximity to the RF tag or beacon or preloaded as part of navigation feature or mapping application before the user reaches the area.

An ability to include special navigation software either as an add-on to existing navigation on the user's cellular telephone or the existing navigation system (car, mobile device) using the Bluetooth enabled RF tags or beacons to determine the exact location and trigger applications.

An ability to deploy Bluetooth enabled RF tags or beacons in the local area, where each RF tag or beacon will broadcast the identification (ID), wherein the identification (ID) includes the known location waypoint and triggers additional information and/or Location Based Applications (LBS). The Bluetooth enabled RF tags or beacons provide the infrastructure needed to guide or navigate each user in the area. This solution provides a very low cost and fast deployment RF tag or beacon system.

The ability to use a log of the user's Bluetooth identification (ID) or the Bluetooth identification (ID) as a key (not the cellular telephone number associated with the user) for future marketing purposes or for emergency use. This aggregation of data in conjunction with an association to a proximity of a Bluetooth enabled RF tag or beacon identification (ID) will be invaluable to retailers, businesses, and the like. Bluetooth enabled cellular telephones can be also be used as Bluetooth enabled RF tags or beacons.

The RF tags or beacons portion of the navigation system are Bluetooth enabled RF tags or beacons installed in known locations within the area or facility. The Bluetooth enabled RF tags or beacons represent waypoints, where the beacon identification (ID) can identify a facility type, a store, a special sale, a place, a location in the facility location, and the like.

The scanner detection part of the application employs a Bluetooth enabled cellular telephone or mobile device. When the Bluetooth feature and the application are active, the application will periodically scan the area for any Bluetooth enabled RF tag or beacon that is located in the proximity. The scanner obtains the beacon signal and determines the identification (ID) of the RF tags or beacons as well with signal strength. The application will use the identification (ID) of the RF tags or beacons as well with signal strength to determine the location of the user. The location of the user would be displayed on the area map or facility map and will automatically trigger a notification, an automatic check-in to the business owner or operator, and/or establish a link to an existing system to provide the user and the business owner additional information. All of this would automatically be accomplished when the user is located in the proximity of the Bluetooth enabled RF tag or beacon.

The navigation can be plotted between waypoints, stores, or other places on the map.

In regards to the sale sense or other marketing tools, the system works by passively observing the initial part of the scanning of movement. The proposed system does not monitor or listen to conversations or text messages. Nor do the proposed applications transmit or intercept any information or interfere with the mobile network operators in any way. The navigation system is a scanning detector (not a receiver or transmitter) which can observe the unique Bluetooth identification (ID) or key set of the mobile device. This is not a telephone number or name of the device. The unique Bluetooth identification (ID) or key set of the mobile device in association to the identification (ID) of the Bluetooth enabled RF tag or beacon in a proximity of can provide aggregate resultant data to a server to collect and maintain information for habits and/or preferences for triggering content delivery.

Sales sense represents a method to use dynamic user input profiling with proximity beacon identification (ID) installed in the known location in an indoor environment and/or an outdoor environment for empowered presence and triggering content delivery for a real life interaction. All of the functions would be under the user's complete control, without compromising the user's privacy. The paradigm of proximity-based discovery and communication enabled by Bluetooth technology can be very relevant in ambient intelligence as an enabler for a situated interaction.

The navigation system explores the use of predefined user input (user profile or preferences) as a key driver for situated interaction and triggering of content delivery according to the user profile or preferences. The approach is to use of Bluetooth enabled RF tags or beacons installed in known locations within a local area to trigger action which associate the identification (ID) and or profile/preferences provided by the user's cellular telephone or mobile device beyond self-exposure and introduces a method that can trigger actions.

The approach to the use of Bluetooth identification (ID) of the Bluetooth enabled RF tags or beacons beyond self-exposure introduces a technique in which the system can recognize the Bluetooth identification (ID) as explicit instructions to trigger actions and/or processes.

Initially, because the disclosed system has an extremely low entry barrier, as Bluetooth devices are based upon a widely available technology. More importantly, all newer cellular telephones or other mobile devices include Bluetooth technology, and setting Bluetooth identification (ID)

of a Bluetooth enabled device is normally a relatively simple task that can be accomplished with the base functionality of any mobile telephone. The easy availability is of huge importance in enabling social practices around the technology and represents a major difference to other sensing and interaction approaches that, albeit more sophisticated, may require specific hardware or software in personal devices. Secondly, the use of Bluetooth presence for situated interaction combines very well implicit and explicit forms of interaction, in fact, blurring the distinction between them. Simply by scanning for Bluetooth devices within the proximity of the mobile device, people are already part of the situation and implicitly engaging with the system.

This continuous, flow of presence information can be fundamental in the aggregation of situated content and may act as an important catalyst for more explicit forms of interaction. This is what differentiates interactions based on Bluetooth presence from other interactions.

The chosen methodology combines a user defined profile encoded into the Bluetooth enabled device by setting up a user, such as a Vehicle Identification Number (VIN). With a focus or priority on user privacy, the profile is encoded into the user's Bluetooth enabled mobile device with an algorithm sequence protecting the user's privacy.

The disclosed system provides an important and practical implementation of the technique and on its usability within the complex set of social phenomena that characterizes situated interactions in public places without compromising the user's privacy. The effectiveness and simplicity of the disclosed system makes it easily adoptable for applications like localized social networking interactions, near field communication like secure transactions, payment methods, secure recognized methods and triggers secure processes and delivery of direct content according to the user profile or preferences. All of these functions are accomplished without compromising the user's privacy and provides the user with complete control all the time. The method can be integrated and provide privacy and secure transaction to empower applications that may otherwise exploit the user's identification (ID), the user's profile and the user's privacy, such as a method to provide secure payments transactions.

Every day, millions of people access the Internet and enter their profile, personal information, or answer questions about their preferences in order to access a service and/or a site, to obtain incentives, coupons, specials, and the like. The sites use the information for marketing and in some cases share or sell the acquired information. Recent research has found that most people are willing to give information for incentives.

Using the profile and records, collection of Internet surfing habits of the user is one way that search engine companies make money on the Internet. At the same time, search engine companies try to direct content to the user according to their profile and/or habits.

But what about real life? People spend more and more time indoors. According to recent research, people spend more than 90% of their time indoors.

A scenario of searching for stores, items, special sales, and coupons according to our desire is repeated again and again. The question is how can the system transfer the success of the Internet marketing tool and the easy search for real life?

That is the main idea behind the navigation system. What if a system can take a profile, user statistics, and/or user input with them anywhere and provide one or more intelligence marketing tools. Moreover, the user is in complete control over their privacy, as the user can simply turn off or shut down the application.

In the disclosed navigation system, the user establishes their profile and/or sales preferences, which are encoded into the user's cellular telephone to be associated with the proximity beacon identification (ID) installed in the local area. There are 3 key configurations: A. A set key segment, where segment keys are not unique and help to setup a user segment only. In this case the key is not unique. B. A unique key, wherein a unique key would be a unique identifier, which can be analogous to an Internet Protocol (IP) address. C. A dynamic key and multiple profiles according to a location and/or user preferences.

The profile can include gender, age, and sales preferences (interest), and does not include any personal profile. It may be the same as seeing the user and recognizing their gender, age, and other preferences just by looking at the user. The user is not revealing any kind of information that most sites ask for in a registration process. More specifically, the profile excludes any personal information like name, address, or telephone number.

As part of the suite of Location Based Services (LBS) applications, the user's cellular telephone or mobile device will scan the area for the RF tags or beacons. For example, by being proximity close to the directory stand in a mall, the system will receive and a decode the user's key in order to utilize the user preference segments to trigger delivery of ads, specials, and incentives to the user in accordance with the user's profile. The disclosed system also provides the business owner or operator with the best marketing tool, knowing their customers, the customers' profiles and habits. This is accomplished using a very low cost Bluetooth enabled RF tags or beacons installed in the area and an association between the Bluetooth enabled RF tags or beacons with the user's Bluetooth enabled device, such as the user's cellular telephone or mobile device.

The disclosed system provides a solution to: "Your customer is telling you what they want, are you listening?"

The main idea behind the disclosed system is to provide the user with pinpoint content according to their desired preferences at the location determined by the identification (ID) of the RF tag or beacon in the proximity of the user and provide directions or navigation to the desired location to the user for such items as the store, sales, specials, coupons, or any other information that the user may be looking for. The disclosed system enables providers to receive meaningful data around shopper habits and store layouts statistics, as well as to help them partner up to offer better loyalty incentives to their customers through programs that extend beyond single storefronts. The disclosed system provides sensing of second-by-second updates of a shoppers interest about specific product, place and can provide the business owner or operator with a complete set of marketing tools which were previously unavailable, and at the same time, provides the user with offers directly from the business according to the user's habits and/or preferences profile.

The sales sense is a user preference module, which can be an add-on to the sales sense marketing where the sales sense joins the user behaviors module to create a very unique Location Based Services (LBS) business and marketing model. Imagine a potential customer standing in a crowded store aisle, feeling overwhelmed by all the choices. What if a business associate could just reach out and give the user something to help with the decision, such as a coupon, product information, discounts, and the like in real time?

Content marketers will soon have the ability to do this and a whole lot more just by implementing the disclosed system.

Sales sense or shopping behavior: How consumers decide what to buy and when is going to drastically change. Winning marketing needs to provide and will require getting exactly the right content, in the right place, at the right time, with even more precision. Shoppers will have the ability to collect real time information, comparison pricing, discounts, and other helpful, highly tailored data as the shoppers walk through a store or browse near particular items. It will be imperative to produce well-timed, compelling content that is useful in those crucial moments before a choice is made. Sales sense can become a next generation marketing tools, from coupons and giveaways in stores, to tours of museums, to airports that provide real time flight information. The possibilities are endless.

Consumers will start engaging with content in a whole host of new ways. Rather than just providing information suitable for a web browser or even a mobile user, marketers will need to think about ways to provide content that will be of value to users as they live their lives. From businesses to city parks, the disclosed system provides a user with tools to access helpful, real time data like never before. As recently published research showed that on average people spend 90% of our time indoors. The proposed invention allows an effective integration of on-line and off-line shopping.

Moreover, according to research, indoor navigation may be more important than outdoor navigation and may represent a huge new market.

The disclosed technology allows shopping centers, malls, department stores, buildings, airports, train stations, exhibition centers, museums, and amusement parks to understand the way that customers or passengers flow through the premises. At the same time, the disclosed technology provides the user or shopper with a unique indoor navigation capability without compromising user privacy.

The disclosed technology will allow, for the first time, the navigation and the Global Positioning System (GPS) industry to tap into the local advertising market, estimated to be $134 Billion in the US alone.

The disclosed technology provides a reliable method for identifying the path habits and the behavior that people take through an area. There are a number of advantages to The disclosed technology including:

Extremely large sample size as mobile penetration is above 90%,
Shoppers remain anonymous,
Accurate to within 2 meters, and
Based on a Bluetooth technology.

For retail areas, malls in particular, the advantages of understanding shopper behavior are significant. Such information can assist the mall to:

Evaluate and improve their retail tenancy mix by identifying which stores shoppers consider complementary to one another,
Identify under-utilized areas in the mall,
Understand the impact of anchor stores on the mall,
Measure the implications of particular promotions or center events,
Assist with planning day-to-day mall operations,
Provide add-on features for shoppers,
Provide shoppers with a web-like shopping experience,
Provide shoppers with incentives and/or advertising,
Increase security,
And in an emergency, provides the shoppers with alarm and notification, and
Allows shopper engagement with the store. The RF tags or beacons can become the small neighborhood store by recognizing the shopper. This is missing from online shopping.

The disclosed technology would be the only system on the market that can continuously and accurately gather information on a shopper paths based on locally installed RF tags or beacons without any need to establish any communication relationship between the user's cellular telephone or other mobile device and the RF tag or beacon. This is accomplished without any paring or any other bi-directional communication to determine the location, and all without compromising the shopper's identification (ID) or their privacy.

The various methods disclosed can also provide a way of surveying the behavior and preferences of the user's shopper habits simply by observing the signals (encoding a Bluetooth naming key) transmitted by the user's mobile telephone and associate the Bluetooth naming key with the identification (ID) of an RF tag or beacon located proximate the user and, at the same time, provides the shopper with a unique special application for indoor navigation which can trigger Location Based Services (LBS) applications.

The present invention provides a next generation approach to the Location Based Services (LBS) market, especially respective to indoor applications and to areas where a Global Positioning System (GPS) cannot provide accurate navigation.

The data collected using the disclosed technology can be used to provide trend reports showing which shops are most visited and at what times, whether there are sufficient public facilities to serve the visiting shoppers or whether more security staff are needed to name only a few of the potential benefits. Ultimately, the collected data can provide assistance to shopping centers to become more in-tune with their customers so that the shopping centers can create better, more pleasant places to visit.

The proposed analytics can turn shopping centers, department stores, or other stores into finely tuned sites, enabling operators of the mall or store to direct the flow of traffic efficiently around the information coming from the user to the benefit of the user and the business owner or operator to provide services such as VIP personalize services, and the like.

In contrast to alternative techniques, there is no device that tracks the user's cellular telephone or other mobile device. In the disclosed methods, the user's mobile device or cellular telephone is the one that scans and tracks RF tags or beacons along the route. Each scan includes the beacon's identification (ID) and the user's mobile device or cellular telephone identification (ID), and while these keys help track the movement of the signal and the user, the disclosed technology doesn't reveal the identity of the user. This is a more precise method than what GOOGLE MAPS uses to detect a general location on a mobile device or cellular telephone by cell towers which are accurate between 300-1000 meters compared to the disclosed technology, wherein accuracy which is below 10 meters. The disclosed technology allows the business owner or operator to be notified about the existence of a user in the vicinity of the store and allows sending the user offers, deals, or more information, and, at the same time, collects information that could be very important to the business owner, such as habits, profile, or preference of the user. This enables an ability to provide precise content directly to the user's cellular telephone or other mobile device.

Example of Scenarios:

A user in a mall can use a local guide which could suggest that the user download the navigation application at the mall, the building, or the facility. Alternatively, the navigation application can already include a mapping application.

As part of the application the Bluetooth feature on the user's mobile device will scan for signals from known locations or Bluetooth enabled tags or beacons and will determine the user's location on the local mall map (the same way as a Global Positioning System (GPS)) with accuracy of less than 5 meters. More beacons with less signal range equals more accuracy.

For example, the Bluetooth enabled tag or beacon can broadcast an RF or beacon signal that includes the position coordinates (for example latitude and longitude coordinates) of the RF tag or beacon, which can be detected by a mobile device. The position coordinates can provide a third location accuracy for the current location of the mobile device by virtue of the mobile device adopting the position coordinates of the beacon as its own position coordinates.

The known locations of a number of RF tags or beacons in a geographic region (referred to as a beacon infrastructure) can define a geofence that encompasses the geographic region.

In some implementations, the beacon can also advertise Location Based Services (LBS) provided by the beacon infrastructure. Upon determining that the mobile device crossed the geofence defined by the beacon infrastructure. The application can monitor for RF tag or beacon signals and continuously update the location of the mobile device to be the location of the RF tag or beacon currently in proximity with the mobile device.

When the mobile device looses contact with the RF tag or beacon for a defined period of time (for example, 5 to 10 minutes) or when the mobile device exits the geofence boundary defined by the beacon infrastructure, the application can transfer the monitoring back to the application subsystem, so that the location of the mobile device can be determined using Wi-Fi and/or Cellular identification (ID).

In some implementations, the disclosed application can distinguish between RF tags or beacons within the beacon infrastructure and mobile tags or beacons that may be detected during a scanning step, such as other Bluetooth enabled mobile telephones operating within the beacon infrastructure.

For example, each beacon in the beacon infrastructure can provide data in its broadcast signal that indicates that the beacon is part of a beacon infrastructure.

Alternatively, or in addition, when a mobile device makes first contact with an RF tag or beacon within the beacon infrastructure, that RF tag or beacon can transmit to the mobile device a list of unique identifiers, such as an identification (ID) of the RF tag or beacon of other identifiers (ID) of other RF tags or beacons within the beacon infrastructure and other information about the beacon infrastructure, such as a name, geofence data, and/or one or more websites associated with the beacon infrastructure.

The beacon infrastructure can be located in any geographic region, including within businesses, such as shopping malls, retail stores, restaurants; landmarks such as museums, airports, parks, entertainment venues; and any other environment where Location Based Services (LBS) are desired.

The available local advertising marketing is huge, with over $150 billion in revenue in the US alone.

Indoor Location Based Services (LBS) Applications

The disclosed concept offers a complete suite of applications including, finding available parking spaces, providing navigation of indoor malls or stores, and a capacity to navigate to emergency exits, all using a low cost solution and with a business model that can be used to attract customers.

The applications represent a big opportunity in the navigation market and will open up new avenues for companies from telephone operators to malls, stores, department stores, merchants, owners to navigation and mapping companies.

The disclosed technology presents a low cost and easily deployed infrastructure for location based navigation in both an indoor environment and an outdoor environment, without the need for use of the Global Positioning System (GPS) or access to a cellular network. Moreover, the concept is especially suitable for local area services (both indoors and outdoors) when and where the Global Positioning System (GPS) and the cellular network can't provide a suitable solution or the degree of accuracy needed to provide such navigation (10 meters or less).

The disclosed technology provides a system based upon existing Bluetooth protocols, wherein the Bluetooth technology is proven to be stable, simple, inexpensive and mature in the market. Moreover, it is a common communication tool and is available on more than 85% of all new mobile telephones at the time of the original disclosure.

System Architecture:

The infrastructure consists of Bluetooth enabled RF tags or beacons installed in known locations in a local area. The Bluetooth enabled RF tags or beacons will respond to Bluetooth device scanning inquiries made by a user's Bluetooth enabled cellular telephone or other Bluetooth enabled device using the special, associated application.

Each of the RF tags or beacons encodes information into the naming portion of the beacon signal, wherein the encoded information includes the identification (ID) representing the Location as well as the facility or product type. A mobile device as well as any other Bluetooth enabled device, such as a desktop computer, a laptop computer, a portable computing tablet, cars, and the like, can also become an RF tag or beacon providing a new echo system, where an infrastructure can include static and dynamic deployments of RF tags or beacons which interact with one another.

The local area map, such as a mall map, a store map, a building map, an area map, and the like, will be available to be downloaded as part of a mapping system that can automatically trigger a request to download the associate map when a user approaches or passes an entrance of the building, the mall, any other designated area, or the associated directory to provide the mapping for the navigation application or as part of a mapping and navigation application.

A user's Bluetooth enabled cellular telephone will scan the local area for the location of RF tags or beacons located proximate thereto. When a user is within 5 to 10 meters, the location beacons respond, providing room level navigation accuracy. The beacon identification (ID) in conjunction with an associated signal strength will provide instant determination of the location of the receiving mobile device. With multiple RF tags or beacons installed and possibly receiving more than one beacon signal, a simple triangulation calculation and options for signal strength will determine the exact location of the user on the downloaded map of the local area. It is noted that the process can be completed without establishing any communication or pairing between the beacons and the mobile device. The process does not require any connectivity to the Internet. It is recognized that access to the Internet enables access to additional information when additional information is desired.

When including a list of associated RF tags or beacons, other signals not on the list will be ignored. There is a mixed use of RF tags or beacons and delivery option depending on the application. For example, in a mall application, the stores can have a Wireless Application Protocol (WAP) or use the Internet to automatically deliver more content by way of a push to a user's mobile device where the RF tags or beacons serve as navigation "antennae" as well as triggering mechanism to provide application exploit, waypoints, and content to help the user navigate in the respective area. The applications can include a Sales Sense providing next generation marketing tools, a Behavioral Module, Nav4Parking, Nav4Realty, Nav4Mall, Nav4Sale, Nav4Museum, Nav4Show, Nav4Train, Nav4Sign, Nav4Emergency, Return2Parking, Nav4Store, Nav4Conference, Nav4Disney, Nav4Events, and the like.

Moreover, according to research, indoor navigation may be more important than outdoor navigation and may represent a huge new market.

The disclosed technology disclosed herein enables shopping centers, malls, department stores, buildings, airports, train stations, exhibition centers, museums, and amusement parks to understand the flow of their customers or passengers through their premises. At the same time, the disclosed technology provides the user or shopper with a unique indoor navigation capability without compromising user privacy.

The technology disclosed herein provides a reliable method for identifying the travel paths, habits, and the behavior that people take through an area.

There are a number of advantages to the technology disclosed herein, including:

Extremely large sample size as mobile device penetration is above 90%,

Shoppers remain anonymous accurate to within 5 meters, and

The solutions are based upon Bluetooth technology.

For retail areas, malls in particular, the advantages of understanding behavior of shoppers is significant. Such information can assist the mall in a number of areas.

The disclosed applications enable evaluation and improvement of the retail tenancy mix by identifying which stores shoppers consider to be complementary. The mobile device or cellular telephone scans and tracks RF tags or beacons along the route. Each scan includes the cellular telephone's unique Bluetooth identification (ID). While these identifications (ID's) help track the movement of the signal and its owner, they don't reveal the identity of the user. This is a more precise method than what GOOGLE MAPS uses to detect a general location on a mobile telephone using cellular infrastructure towers, which is accurate between 300-1000 meters compared to accuracy of the disclosed technology, which is below 10 meters.

Some reports about shoppers show how valuable behavioral information actually is and the profit opportunities that come along with this:

Where they go? Where they go next? Where they do what? When they do what? Who does what?

Understand behavioral patterns across demographics. Similarities, differences and much more.

Sales Sense User Preference Module:

Recent research has found that most people:

Measure the implications of particular promotions or center events.

Assist with planning day-to-day mall operations.

Provide add-on features for shoppers.

Provide shoppers with a web-like shopping experience.

Provide shoppers with incentives or other advertising.

Provides an automatic check-in method.

Provide shoppers with an automatic check in capability.

Increase security.

In an emergency, provide shoppers with alarm and other associated notifications.

The disclosed technology is the only system known today that can continuously and accurately gather information on travel paths of shopper using Bluetooth and/or Wi-Fi enabled RF tag or beacon technology and all without compromising the shopper's identity (ID) or his/her privacy.

The disclosed unique and innovative system and method can also provide a way of surveying the behavior and preferences of the shopper simply by observing the emitted Bluetooth signals, such as the Bluetooth beacon identification (ID) associated with the user's mobile device, and at the same time, provide the shopper with a unique special application for indoor navigation as well as Location Based Services (LBS) for the benefit of both the shopper and the business owner or operator.

The data collected using the disclosed technology can be used to provide trend reports showing which stores are most visited, what times the locations are visited, whether there are sufficient public facilities to serve the visiting shoppers, or whether more security staff is needed, to name only a few of the potential benefits. Ultimately, the data made available by the disclosed invention helps shopping centers become more in tune with their customers so the shopping centers can create a better, more pleasant place to visit by providing a loyalty and reward program.

Analytics provided by the disclosed applications can turn shopping centers, department stores, or other stores into finely tuned locations, enabling the mall, the store, or the store owners or operators to direct the flow of traffic efficiently.

In contrast to alternative techniques, there is no device that tracks the user's cellular telephone. In the disclosed method, the user is willing to give information for incentives.

Using the profile and records, the surfing habits of the user, such as by tracing activities of the associated Internet Protocol (IP) address is the way that the search engine companies make money on the Internet. At the same time they try to direct content to the user according to the user's profile or habits. But what about real life? People spend more and more time indoors (according to recent research, people spend more than 90% of their time indoors).

As part of the suite of Location Based Services (LBS) applications, the user's cellular telephone or mobile device will scan the area for RF tags or beacons in the proximity thereof. For example, by being in a close proximity to the directory stand in a mall, a decoding of the user's key will be processed in order to acquire the user's identity (ID) and/or preference profile. The server will then provide the user with ads, specials, and incentives according to the user's profile, essentially responding to the question: "Your customer is telling you what they want, are you listening?"

The main idea behind this is to provide the user with pinpoint content according to the user's desired preferences at the location and also direct or navigate the user to the desired location where the user can find the store, sales, special, coupons, or other information that they are looking for. At the same time there is also a benefit to the mall or store owner or operator by getting the next generation's sales tools, getting costumers' habits and their sale's profile, resulting in an ability to better serve better and meet the customer's needs.

The sales sense, user preference module is an add on to the sales sense marketing where the sales sense joins the user behaviors module to create a very unique Location Based Services (LBS) business and marketing model. The analysis of this spatiotemporal data can supply high level human behavior information valuable to urban planners, local businesses, and the Location Based Services (LBS) marketing.

Malls, department stores, and store indoor applications are part of NAV4MALL or NAV4STORE.

The indoor applications and navigation takes a further step to give the user or the shopper next generation shopping tools by providing them with the following indoor applications that could be included in the NAV4MALL or NAV4STORE.

Map and indoor navigation brings the local mall mapping or store mapping to the digital age. This function allows the user to navigate from waypoint to waypoint on the map directory. The function brings the store directory or mall directory to the cellular telephone.

Search and Find provides a capability to locate a store a place an item, or a product that would be on the directory represented by waypoints, represented by RF tags or beacons on the loading maps.

Sales or specials provides a process for informing the user of discounts, sales, and coupons. This feature can be an add-on or a replacement for the mall or store printed flyers that provide the information to the shoppers at points in the mall or store. The feature can even direct the user or the shopper to the aisle containing the products, to coupons, and to other items that the shopper is looking for.

Parking and Return2Parking provides a process which assists the user in finding parking spaces and the location of their parked car. It is noted that this function does not directly use the same beacons, as the parking the infrastructure employs long range beacons, where in a store or a mall, the beacons can be a shorter range version.

Info or information is a function where the system provides information about events, restrooms, ATM locations, a seating area, a kid's playground, a fountain, public telephones, and the like.

Emergency is a very important component of the disclosed innovation. The emergency function provides a unique alarm and notification to the user without depending on other communication links, such as cellular telephones that are prone to failure in an emergency condition. The present invention provides the user with an associated emergency procedure within the building, the mall, the store, or any other place during an emergency condition, where the information will help navigate the user to safety.

Panic portion of NAV4emergency allows the user to transmit a signal requesting to be located in an emergency. The signal would include information pertaining to the user's location.

Regarding privacy, the system does not collect personal information, such as user's name or telephone number. It does, however, record the cellular telephone's Bluetooth identification number or other identifier to build a profile of the user or the use of the cellular telephone in the area. It is analogous to surfing the web where a user's Internet Protocol (IP) address is recorded for future marketing statistics and surfing habits (with permission from the user). Also as part of the encoding key into the Bluetooth device, such as the user's profile, as described above can be included to enhance privacy and security to the level where viewing the key broadcasted by the Bluetooth device doesn't reveal any user identification unless the user requests to be registered to receive incentives, specials, sales, and the like. Even then, the users name or other personal information is secure and only the Bluetooth device key or identification (ID) is recorded.

By directly targeting the consumer standing adjacent to or within a business, an event, or approaching a kiosk or restaurant, merchants can maximize their marketing budget while incorporating this new, inexpensive and effective form of advertising.

The user is in complete control. The user can disable their Bluetooth application at any time or just reject content. The system avoids spam and the user is attracted by incentives rather than generic promotions. In a mall-like environment an incentive to a user to use the disclosed technology can be further enhanced with the use of the associated key advantages and packages.

Isn't this all a bit like big brother? Not at all, and it isn't even little brother! The system simply logs the movement of a cellular telephone around an area and aggregates this to provide trend data for businesses. The process is much less intrusive or invasive than existing methods that are already in widespread use. For instance, Closed-circuit television (CCTV) cameras and number plate monitoring collect personal information such as your image or car number plate. The disclosed technology represents the next generation shopping experience in shopping centers, malls, or stores and fits very well with today's business model. Such a service can be offered for free to the users and would be backed by advertising and the use of the data by the stores.

Who benefits from the disclosed technology? Everyone benefits from the trend data collected. The process enables a way to collect instant feedback from shoppers without having to bother them for information. In the old days, centers would have used researchers to survey consumers, but this information takes time to collate and response rates are very low these days, as shoppers have increasingly become reluctant to stop and share their feedback. Hence the disclosed innovation provides a very effective method in the same way that television (TV) networks know how many people watched particular programs and use that information to discern what programs to produce and how to calculate the costs advertisers must pay to promote their products during different timeslots. The system provides the equivalent for shopping center operators and their resident retailers. It is believed that introducing the proposed system and marketing tools described above can help users and merchants upgrade the real shopping experience of today with the advantage of the web like tools.

The disclosed innovation represents the next generation shopping experience in shopping centers and malls and fits very well within today's business model. Such a service can be offered for free to the users and backed by advertising and the use of the data by the stores. Such service, applications and the ability to include, the emergency functions will also ease the fear of locating a user or any privacy issue.

For the first time the shopper will experience Internet type marketing in the traditional sales and advertising venue.

Here are the benefits consumers could see from a shopping center using the disclosed technology:

Better in-mall events. The system can monitor how successful previous events were by monitoring the sheer volumes of people attending and for how long each person attends the event.

Provides shoppers with next generation sales tools, including navigation within the mall, the store, or another facility, wherein the navigation can include instructions to guide the user directly to sales or specials that the merchant want the user to go to.

A supplement or replacement to the store or mall directory as well as the in-store or mall marketing flyer.

Take the guessing away from understanding what the customer wants, and then send them directly to the location containing the products, the coupons, or the specials the customer might want.

Improves public transport links by monitoring how people traveled to a center. With the government's current emphasis on helping people to use public transport more effectively, having this kind of information can have a very positive, local environmental impact. Busy shopping centers can otherwise create large volumes of extra road traffic, also with the Search4Parking and Return2Parking applications improves traffic and reduces time and gas consumption.

Eliminates congestion within the shopping center, as the disclosed innovation can help the shopping center management understand whether opening hours need to be extended or whether the center layout needs to be improved to avoid congestion.

Improves shopping center and public facilities efficiently, as the disclosed innovation's data helps managers understand which parts of their facility are very busy. This knowledge can provide guidance so the managers know when to deploy extra employees, cleaners, security personnel, and the like to ensure proper service.

Better security, where overcrowding within a shopping facility leaves shoppers vulnerable to pickpockets and other security risks. The disclosed system can identify congested areas and ensure security personnel are deployed appropriately.

In an emergency, the disclosed system can provide instant alarms and notification, even if the cellular communication network or other system is not available.

Improved mix of stores and center layout can result from the system helping identify which stores are popular and which are not; making sure that the best possible layout and mixture of shops is provided for visiting shoppers. If some shops are unpopular they can be replaced with brands that customers actually want.

It is believed that shopping should be an enjoyable pastime. Who wants to go to shopping center that are congested, poorly laid out, have dirty toilets, are badly positioned for transport links and which pose a security threat to visitors? All together, this makes for a much better shopping experience.

How do shopping center owners and retailers benefit? The benefits for shopping center owners of using the disclosed technology are huge, as there are many possible uses for the information gathered. The disclosed applications can help shopping center owners or operators get a better understanding of how people use their center, such as the order of stores the shoppers visit and the time the shoppers spend in different areas of the shopping center.

These days, visits to shopping malls are falling with increased competition from supermarkets, retail parks, and the Internet. With a decrease in visit frequency, it is critical that the shopper's experience at the mall is exceptional and that is where the disclosed applications come in. The information can assists malls at all levels; from the very mundane to the more strategic questions that they face, such as whether or not the shopping mall has the right mix of retailers.

Similarly the disclosed technology could help museums identify their most popular exhibits and help exhibition companies plan their venues more carefully around visitor traffic flows.

The disclosed technology is able to provide a solution with quantitative feedback on whether the changes management makes in the mall are successful. One of the ways to do this is by simply looking at how long shoppers tend to stay within a mall.

Don't retailers already measure shopper numbers? Yes they have infrared cameras and counting machines, which monitor and count the numbers of visitors to their stores. This measure is known as footfall and has been used by retailers for many years. The disclosed system provides another level of data by looking at the aggregate paths that mobile telephone carrying visitors take and the length of time they spend in each location, which is commonly known as dwell time.

In the past, malls have focused solely on looking at the numbers of shoppers that they are drawing through the doors (footfall) but when combined with dwell time they can get a much more accurate predictor of their performance.

The system has no idea who the user is an individual. The system only looks at the path the user's cellular telephone or other mobile device takes. Essentially, it's like looking at a dot moving around a screen. In isolation this information isn't too interesting until you look at the wider patterns and trends and see lots of dots taking the same route or visiting the same areas of the mall.

What is the Bluetooth identification (ID) number? A Bluetooth identification (ID) is like the Internet Protocol (IP) number in a computer network or the Internet which does not contain or reveal the user's telephone number that the cellular network operator uses to identify your telephone. The disclosed system utilized the identification (ID) information as one key to find and detect the user.

The linkage between this identifier and your personal information is very critical to the business owner as it can provides a user's habits, preferences, and when available, a user's profile. The disclosed system provides a new breed of tools to the business owner or operator just by getting to know where the user is, and at the same time the system provides the user with the best VIP-like personalize shopping services.

The disclosed applications do not detect or acquire any personal information and have absolutely no idea who the user is as an individual. Although the applications include an option for users to register as mall or store customers to provide more details about the user (still no real ID), the process would be analogous to a membership card that will provide the user with incentives, coupons, or special discounts if the user participates. Moreover recent emergency events prove the need for emergency and notification to the right people at the right time, by keeping the key identification (ID) of the Bluetooth devices that are in the area or facility. For example, the disclosed NAV4emergency feature can provide instant alarming and notification and navigation to the exit route and to safety. Again, all of this can be accomplished without revealing the user's identity (ID) or breaching privacy of the users.

The business model referred to as Next Generation Marketing is analogous to web advertising and the main focus of search engine success, which is based on technology that tracks the web user's habits and provides the user with ads related to the user's interests.

Using the disclosed infrastructure of Bluetooth enabled RF tags or beacons, wherein the beacons are deployed about in a mall, a store or a shopping center environment. The disclosed invention represents a very unique ability to bring a web like shopping experience by its ability to acquire and store the user's surfing or shopping habits in the shopping center, the mall, or the store. The disclosed invention will provide a better shopping experience (coupons, specials sales, according to the user's shopping habits) and service to the shopper.

It is believed that introducing the disclosed system and the associated marketing tools above can help the users and the sellers to enhance the current shopping experience by introducing an advantage of the web like tools.

The disclosed innovation provides valuable solutions that enhance the effectiveness of advertising campaigns. The ability to optimize performance in real time has a positive effect on advertiser's satisfaction. The fact that this service is well integrated into the disclosed system is a tremendous advantage.

The disclosed innovation is a performance enhancing technology, providing great data and allowing improved customer service.

The disclosed innovation can provide an extremely effective way to optimize the performance of offline or online advertising campaigns in the mall or store environment. For excellence in client services, the idea is a clear win-win for everyone.

Helping to understand where users are going in the mall or store in real life and the shoppers' buying behavior patterns will allow the merchants to continually adjust offers, placements and creative content to improve buying through and maximize sales.

The disclosed technology will evolve mobile content into a bonfire revenue center that will benefit the shopping mall operator and merchants alike.

The user is in complete control. The user can disable their Bluetooth application at any time or just reject content. There is no spam and the user is attracted by incentives rather than generic promotions. Probably the best technical analogy would be to compare the disclosed technology with existing web-based systems that measure viewers of web sites, for example GOOGLE ANALYTICS.

For example, the Bluetooth enabled RF tag or beacon can broadcast an RF signal that includes its position coordinates, such as latitude, longitude, which can be detected by a Bluetooth enabled mobile device. The position coordinates can provide a third location accuracy for the current location of the mobile device by virtue of the mobile device adopting the position coordinates of the beacon as its own position coordinates.

The system use and costs should scale well with its ability for multi-use in an emergency and in a non-emergency to provide local navigation on malls, stores, campuses, buildings, hospitals, hotels, and the like, using the Bluetooth enabled RF tag or beacon for navigation. Some of the key applications are:

NAV4Mall, NAV4Store, NAV4Sale, or just University or Building Navigator, explore the indoor environment. These features navigate the user to the right place, the store, or the department the user is looking for. These features provide navigation using the mall map or store mapping to find the user's way around. This is accomplished by using the user's cellular telephone or other navigation system without assistance from the Global Positioning System (GPS). A new kind of service and new marketing way for the malls or store business owners, an add-on to local advertising.

With an indoor navigation based on the local map or mall layout that will provide the user with navigation to the user's desired location in the mall or store and receives content according to the user's preferences or habits. The user can be directed to a store, the product, the isle inside the store containing the desired product, and the like. The disclosed system provides a new marketing tool to the store or mall owner or operator to provide the customer with a new service. The store can have also an option to deliver more content, including advertising, sale information, coupons, promotions, and the like to the user when the user approaches the store or already is inside the store. The information would be provided by way of Bluetooth or an Internet push to the user's Bluetooth enabled cellular telephone or mobile device. In an emergency, the NAV4emergency will kick in. The NAV4store or NAV4mall module is the one that is described in more detail above.

NAV4Museum, NAV4Conference, NAV4Show explore museums, conferences, shows, or exhibits in a new unique and easy way for the user to find their way around when navigating on the floor map of the museum, the conference, or the show. The indoor navigation provides navigation to exhibits, restaurants, cafes, lavatories, and the like within the venues. Any museum, conference, or show provides mapping of the exhibits to the attending user. Some provide venues can also provide an audio device, such as a headset, to get more information on the exhibits. The disclosed innovation will provide a unique indoor tool that will allow the attending user to navigate the museum, the conference, or the show in an easy way directly to the user's Bluetooth enabled cellular telephone. When the user reaches their desired exhibit, the user will be allowed to download information about the exhibits directly to their cellular telephone and/or Bluetooth headset. The NAV4emergency feature would also be adapted for use in these venues.

For users of a mass transportation system, the disclosed innovation can allow, locate, and point the user to the exact station or location on a route, providing an easy way to navigate the user to or within the train, about the subway, and about any other underground kind of system. The disclosed system provides a new way of subway or bus mapping, including indoor and/or outdoor environments; directly to the user's navigation device or cellular telephone. Every day millions of people are using the mass transportation system, trains, subways, buses, and the like. Each of the passengers depends on the transportation map for the route information, schedules, and additional services provided by the transportation system. Most of today's passengers carry a cellular telephone with them.

The disclosed methods can be used by the management of the transportation system, train, buses, taxi and road management where the RF tags or beacons can be installed in any transportation facility or entity. The disclosed method can provide traffic and on-demand transportation requests. The disclosed method can provide online, real time traffic and transportation head count of the mobile devices existing in the local area according to an association with a proximity to the RF tags or beacons installed in the transportation entity, in association with transportation infrastructure. The disclosed method can provide information pertaining to parking, traffic conditions, signs, schedules and time to station. The disclosed method can determine how many people are at the station, the bus stop, or at any other congregating area to create an on-demand service for taxi and/or public services.

Aside from such data gathering and the importance of such statistically information to manage the flow of transportation in a local area, the RF tags or beacons serve as sensors to detect the traffic in a specific area. The status can be monitored by collecting how many mobile devices are in the specific area. In event of emergency, the disclosed system can provide emergency notification and alarming the local mobile devices.

The disclosed method can be used to manage transportation and provide automatic awareness to transportation management and/or operators as well as the user on the road. The user can automatically get information about traffic in their area generated from other associates. The user's cellular telephone identification (ID) and/or the car using the VIN broadcasting method can be employed as an RF tag or beacon. RF tags or beacons can be installed along a roadway, automatically generating traffic information by tracking the existence of users in the area and proximity to the RF tags or beacons installed along the road, within a transportation facility, at an intersection, and the like. Infrastructure of wireless RF tags or beacons benefit transportation industry managements by providing automatic crowd sourcing data from users along the road by acquiring the user's identification (ID) and determining their proximity to fixed RF tags or beacons. This collected data can be presented as a statistically view as data guttering for events like traffic on the road automatically. Adding such technology and infrastructure into the roads may take time, so the use of the driver and passenger or the pedestrian cellular telephone as a beacon and as automatic traffic notification can provide instant infrastructure, providing an immediate dynamic deployment for the benefit of the transportation network and the drivers. Mobile devices of the driver, the passenger, and/or the car can be utilized as a, RF tag or beacon and become a part of the automatic transportation system to alert for traffic and road safety conditions. The process can provide automatic car to car notification of traffic conditions and road information.

The disclosed innovation provides a passenger with the navigation inside the transportation system directly to the passenger's Bluetooth enabled cellular telephone or mobile device. The passenger will know the exact location or station along the transportation route as well as additional information, such as transportation schedules. The disclosed process provides a new add-on service to for transportation providers and passengers alike, utilizing the disclosed indoor navigation methods. In an emergency, the NAV4emergency would also be available.

The disclosed idea of implementing RF tags or beacons along the roads and within transportation facilities is designed to reduce the growing congestion on the roads. By providing tools to create an intelligent transportation system, the implementation of beacons can be part of a car, installed in red lights, along the road or within the transportation facility, such a system can be installed along a bus route, in a bus station, in a subway, or in any other transportation entity, wherein the system provides real time, online reports, including a status if the transportation systems are empty or filled with travelers. The system can provide an automatic response from the user's or car's mobile device associated with the RF tags or beacons installed in the bus station or train station. The information will allow transportation control that can replace what is currently being used, which requires installation and support of high cost camera and/or sensors. In an alternative solution used today, traffic monitoring relies upon manually collect information from users, which employ the Global Positioning System (GPS) to acquire their locations and movements. It is noted that the Global Positioning System (GPS) is not available for indoor environments or provides accurate information. In a simple explanation, the user mobile telephone automatically transmits their beacon identification (ID). More of the same beacon identification (ID) reported in the same area is understood to be a traffic condition or slow moving head count of cars, travelers, or the like in the transportation facility or the entity area. In a way, the disclosed method provides an automatic waze system. Such a system can replace exiting sensors and provides the user and/or the transportation management with the ability to know exactly where the bus, the train, the subway are at any point in time. The data can used for the schedule or on-demand public transportation, like sending a bus or taxi to an area according to the demand in the area. Such a method can provide the user traffic and transportation information where the user plays a big part of the process and the process is not dependent upon a manual transfer of information, which has been proven to be not accurate enough.

One application creates an echo system where the drivers of cars and the transportation entity are all integrated for an intelligent transportation system of tomorrow and all based on the same concept of infrastructure on RF tags or beacons used to collect information to generate statics. Alternatively or in addition to the infrastructure, the system can employ dynamic beacons where the user's mobile device or cellular telephone as well as the navigation components within the car are integrated part of such system. It is understood that a mobile device or any other Bluetooth enabled device, such as a desktop computer, a laptop computer, a portable computing tablet, cars, and the like can become a beacon providing a new echo system, where an infrastructure can include both static (fixed) and dynamic (moving) deployments of beacons which interact with each other. Again, deploying such technology and fixed infrastructure into the roads may take time, so the use of the driver, the passenger, or the pedestrian cellular telephones or mobile devices as an RF tag or beacon and as automatic traffic notification can provide instant infrastructure. This would provide an immediate dynamic deployment for the benefit of the transportation as well as the drivers.

The disclosed system provides the next cellular telephone or mobile device killer application. Emerging technology markets are always on the lookout for that elusive killer application, the precious, irrefutable application that makes adopters stand up, take notice, and open their wallets. Once it's found, and as soon as adopters realize firsthand, the value to be achieved, that killer application eventually expands into other, more advanced areas of adoption and innovation.

Hotel resort and cruise ship: A good example of use can be referred to as Nav4Hotel, Nav4Resort, or Nav4Cruise ship. The proposed system and infrastructure can include a series of installed RF tags or beacons in such places as cruise ships, hotels, resorts, and other hospitality facilities to benefit the hospitality business and the guest.

The subject invention creates infrastructure of RF tags or beacons in the facility, the hotel, the resort, and the cruise ship areas. The infrastructure of RF tags or beacons would be integrated with an existing hospitality system and provide a trigger mechanism when the existence of the traveler or guest is detected.

The association between the guest's mobile device or cellular telephone or the hospitality employee mobile device or cellular telephone and the RF tags or beacons will allow the example option below. As such, there are two parts for the system to work: (a) the infrastructure of the RF tags or beacons installed in the hotel, the resort or the cruise ship, and (b) the guest's or employee's Bluetooth and/or Wi-Fi enabled mobile device or cellular telephone in conjunction with the associated application. Again, it is noted that the system can work without Internet access and/or cellular communication and can utilize an existing Wi-Fi based system in conjunction with local servers.

Example of some of the benefits and functionality to the hospitality system are:

Automatic check-in.
Automatic or manual interface to the front office system.
Automatic or manual interaction with a billing folio.
Link to a key system or replacing a room key.
Recognize when a guest is within the room, enabling automatic actions, such as turning on an air conditioning and/or a light as well as recognizing when a guest leaves the room and automatically turns off the air conditioning and/or lights to save electricity.
Hotel resort cruise ship navigation.
Allow local messaging without Internet and/or cellular communication based on local chat. This is particularly applicable for cruise ships.
Allow push messaging to the guests using the Location Based Services (LBS) or by remote, when Internet access is available.
Replace and provide an add-on service to a guest in-room package, which can include an area guide, deals, and coupons.
Option of VIP services where the guest can be recognized automatically around the hotel, the resort, and the cruise ship using their profile preferences just by being detected as being in the area. The hospitality service organization can provide personal treatment and services based upon the detection of the user within the area.
A guest's room can be identified as being occupied or vacant, wherein housekeeping can be notified to clean the room when the room is vacant.
Housekeeping management room status attended worksheet and productivity report.
Increase security to the guest and to the hotel resort.
Allow the creation of a profile preference of the guest's group.
Provide a check-in capability to a restaurant interface, to a POS system bar system, and acquire menu selections.
Provide automatic ticketing and seat selection.
Support guest loyalty and membership program incentives.
Increase security and provide add on to the security plan of the hotel, resort, and cruise ship to be part of the emergency evacuation and emergency procedure.

It is believed that the disclosed invention will meet the desire of hospitality service providers to increase their average revenue per user.

The main object of the present invention is to provide the indoor guide navigation and a special application for indoor use without the need for any Global Positioning System (GPS) communication.

It another object of the present invention to provide a method of providing special indoor application using Bluetooth and/or Wi-Fi enabled RF tags or beacons in conjunction with Bluetooth enabled devices, especially the cellular telephone.

It is another object of the present invention to provide a method using a special application for local business, malls, departments stores, regular stores, buildings, downtown centers, or any other facility area; especially, but not limited to, indoor environments. The application triggers activities based upon the identification (ID) of detected RF tags or beacons located in the area.

It is another object of the present invention to provide a marketing method, especially, but not limited for, the Location Based Services (LBS) market.

The foregoing and other objects of the present invention are achieved by providing an infrastructure of Bluetooth enabled tags or beacons installed in known locations within the area or facility. Each RF tag or beacon is assigned its own unique identification (ID) to identify the location in the area. The RF tags or beacons broadcast the identification (ID) to be pickup by the Bluetooth enabled cellular telephone or mobile device.

An indoor mapping or mapping images of the area or facility will be part of the application and can be downloaded before arriving to the area or facility or triggered to be automatically download when the user approaches or is within the area.

The application on the cellular telephone or other Bluetooth enabled device will scan the area or facility for the beacon signal emitted from the RF tags or beacons, wherein the beacon signal includes the identification (ID) or name. When a Bluetooth enabled tag or beacon identification (ID) matches one on a list, the user's mobile device responds to the proximity detection and determines a signal strength that may be used to calculate a distance. When more than one beacon signal is received, the application can complete a simple triangulation algorithm to determine the current location of the mobile device. Other Bluetooth devices that are not on the list would be filtered out.

One the location of the mobile device is established, the location can be displayed on the map. And because the location of the other RF tags or beacons are known, navigation between the current location and a desired RF tag or beacon that represents a waypoint is easy to achieve. In reality, no communication is established between the RF tags or beacons and the cellular telephone or other mobile device.

The disclosed innovation reverses the current idea of locating the user by letting the user navigate according to the beacon signals transmitted by the Bluetooth enabled tags or beacons, wherein the beacon signals are sent by way points directly to the user's mobile device. This will enable Location Based Services (LBS) navigation, even indoors without use of the Global Positioning System (GPS) or the cellular communication network. The disclosed invention can also be adapted to enable triggering of applications and/or create a link to an existing system and software.

The RF tags or beacons can reach from long distance depending on the application and the antenna used by the RF tag or beacon. To get more accuracy, less range and more beacons may needed to achieve an accuracy of 10 meter or less, which provides a more than sufficient accuracy for navigation within a building, a room, or any other indoor environment. Getting more range to the "box" is as simple as attaching a bigger antenna or including a power buster to increase the signal.

The user can choose to be registered, which would provide membership privileges, identify the registrant as a student in a university, a school, or an employee in a business. This provides advantages, especially for receiving direct incentives, specials, coupons, and the like. Additionally, the registration would provide benefits associated with a full NAV4emergency protection.

The disclosed applications lets the user choose to participate and receive incentives, specials, sales, coupons and local content tailored towards the user's preferences, all for free. Alternatively, the user can choose not to participate and pay a small fee for the service and the software. In any case the user's privacy remains protected to the highest level compared to any normal daily use of the Internet.

There is also a great benefit to the user participating, as the user can have full emergency notification directly to the user's telephone. In an emergency the user can be directed within the area, building, mall, or store and provide navigation to the user along an exit route in accordance with the emergency procedure. This feature will be available to the user even if the cellular network fails due to power outages or the high volume of network traffic which commonly occurs during an emergency situation.

In the disclosed method, there is no detector or tracking for the user, the user themselves engages the scanning and detecting method to find the RF tags or beacons in the area using the user's mobile device with the proximity scan of local RF tags or beacons providing the triggering mechanism.

In summary, the proposed solutions provide a full suite of applications for the benefit of the user, from parking, to sales, specials, indoor navigation, general informed, and notification in an emergency condition and directed to the exit route to safety.

The disclosed method can be attractive not only for shopping malls, department stores, or downtown strips, but also to high-rise buildings, commercial buildings, universities, schools, museums, amusements parks, trains, subways, and hotels. It can also be attractive to search engines, advertising companies, cellular telephone operators, manufactures, Global Positioning System (GPS) companies, mapping, local businesses, local advertising, Location Based Services (LBS), and the like. The disclosed method can give the Location Based Services (LBS) a new meaning; a business model that's made easy.

A facet of behavioral targeting has been around for a while but mostly online but it's been gaining traction among advertising agencies retargeting program, which is now a key planning consideration for advertisers.

Why? The primary reason is because retargeting is a powerful means to bring lift to advertising campaign results, generating higher conversion rates and lowering acquisition costs. You can't be much more effective advertising than advertising that targets a person who has shown an interest in a product but didn't buy with a related advertising that then gets him to buy, right? It generally fails to tap the unique opportunities of local advertising market estimates to be over $150 Billion in US alone, although people are spending more than 90% of their time indoors, there is no clear technology to provide indoor navigation and not a clear business model. Advertisers and the business are disillusioned with the promise of Location Based Services (LBS), but are still longing for a solution that properly addresses the significant audience represented by the explosion of cellular telephones use and the availability of content.

It is understood that the disclosed innovation technology and business model can provide the next generation method for the Location Based Services (LBS) market to tap into the huge market opportunities.

The disclosed methods represent a very unique way of locating the exact location of the user (through the mobile device). In the disclosed method, the user scans the area for a known list of RF tags or beacons. The user controls the scanning of the area for the known identification (ID) types of RF tags or beacons. In reality, bi-directional communication or pairing does not need to be established between the user and the RF tags or beacons. The user's mobile device scans the area for a known RF tags or beacons and the process of determining the location of the mobile device is accomplished using the identification (ID) of the RF tag or beacon and signal strength thereof to determine a the proximity to the RF tag or beacon. This process provides an accuracy of less than 5 meter.

Added to the navigation feature is a special indoor application designed especially for indoor environments, stores, mall shoppers including features, such as finding where the user parked their car, finding or search of directory, or receiving an emergency alarming and notification.

Moreover this innovation is not dependant upon cellular communications or the Internet for the method of detecting the RF tags or beacons and there is no need for a central system or expensive infrastructure. In fact, the user's mobile device or cellular telephone as well as deployed RF tags or beacons creating the infrastructure each has at least one battery built in and can work even if the electricity in the area is out, which is very important in emergency situations.

Moreover the sale sense marketing method comprises a unique way of delivering local content, advertising, coupons, special sales etc. pin point according to the user's identity (ID) and or profile preference that can be a record of behavioral activity and will provide simple and secure method for targeting user for Location Based Services (LBS) and other services replacing like near field communication for marketing and even payments transactions.

The disclosed innovation provides a full line of indoor navigation application especially to places or areas that are either indoors or outdoors.

An indoor navigation system may include a navigation computer and an arrival detection system. The navigation computer may be configured to receive a destination to which a user of the mobile navigation system wishes to travel and to provide guidance to the user about how to navigate to the destination. The arrival detection system may be configured to automatically detect when the mobile navigation system has arrived at the destination by being in a proximity to an RF tag or beacon identification (ID) in the local area. The detection system is based on a sense or scan of the existence of RF tags or beacons installed in the local area and would be configured to wirelessly automatically transmit an arrival notice indicating when the user detects the existence of an RF tag or beacon in the proximity thereof, thus determining that the user has arrived at the destination in response to a detection of the user in the area by the detection system based upon the arrival of the mobile navigation system at the destination.

The mobile navigation system may be part of a cellular telephone or any navigation device using a Bluetooth function. Part of the detection application is a notification system configured to wirelessly transmit the RF tag or beacon identification (ID) of the RF tag or beacon in the vicinity and to associate the mobile device's identification (ID) of the user to determine the exact location of the user. This enables any of a variety of functions.

In one example, the check in process provides an arrival notice to a representative of an airline. The arrival notice may be configured to automatically check the user into a flight of the airline.

In a second example, the system may be configured to wirelessly transmit the arrival notice to a representative of a hotel. The arrival notice may be configured to automatically check the user into the hotel.

In another example, the system may be configured to wirelessly transmit the arrival notice to a representative of a food service.

In yet another example, the arrival notice may be configured to trigger payment for merchandise or a service.

In yet another example, the arrival notice may be configured to trigger the delivery of merchandise or a service to a vehicle in which the user is traveling. The arrival notice may include information about the location of the vehicle.

In yet another example, the arrival notice may be configured to trigger delivery of promotional items to the user, wherein the promotional items can be relating to an establishment at or near the destination.

In yet another example, the system may be configured to wirelessly transmit the arrival notice to a representative of a conference that has been scheduled to take place at the destination.

In yet another example, the system may be configured to wirelessly transmit the arrival notice to multiple recipients. The multiple recipients may include attendees of a conference that has been scheduled to take place at the destination.

In yet another example, the system may be configured to wirelessly transmit the arrival notice to a localized social networking site in a fashion that causes notice of the arrival of the user to be published by the localized social networking site.

To ensure privacy, the system may be configured to ask the user for permission to transmit the arrival notice.

In yet another example, the system may be configured to automatically transmit the arrival notice upon detection by the arrival detection system of the arrival of the mobile navigation system at the destination.

At the time the navigation computer receives the destination to which the user wishes to travel, the system may be configured to ask the user whether the user wants the arrival notice to be transmitted in response to detection by the arrival detection system of the arrival of the mobile navigation system at the destination.

The system may include a global user setting which a user may set to automatically transmit or not transmit arrival notices in response to detection by the arrival detection system of the arrival of the mobile navigation system at destinations.

The system may be configured to ask the user to where it should transmit the arrival notice, to receive information indicative of this requested location from the user, and to transmit the arrival notice to this location.

The system can create and utilize a network, which is referred to as dynamic deployment. The system will use the built in, Bluetooth protocol stack module that is able to simultaneously interconnect with other local devices, such as portable cellular telephones in a "piconet", over the local area. The simultaneous connectivity limit of eight (8) devices at a time is overturned by the ability of creating a plurality of piconets which operate in a close proximity. It is understood that the Bluetooth enabled devices, such as portable cellular telephones, can rapidly move from one piconet to another. In fact, the Bluetooth devices only need to remain a member of one piconet for the period of time required to complete one communication transaction. So the Bluetooth enabled devices can join and leave a local piconet frequently, effectively overcoming the eight (8) device limit. It is noted, even without the option to use a long range Bluetooth antenna; the configuration can effectively reach an unlimited distance.

The proposed invention provides an ability to form a wireless ad hoc Bluetooth network or networks based on a collection of Bluetooth enabled mobile devices that dynamically form a temporary network, as long as these device are within a sufficient range of one another, such as inside a room, inside a building, along a road, inside a store or inside mall. The flexibility of the ad hoc network is what makes it a suitable choice for emergency deployment scenarios, where multiple devices would be deployed in a proximity area that is designated as an emergency. The ad hoc network provides a new way of distributing emergency and alert information directly to those in the needed area.

Moreover, based upon normal human behavior, there is no need to inform everyone in a full room, or requiring all of the proximity devices participating in the network to be informed (for example in emergency). If only a few people within the occupied room are informed or receive the emergency information on their portable cell telephone, they will convey the information to others located in the area.

The same method and idea is mimicked by the concept of dynamic deployment. The concept can be paralleled as a new way to deliver critical emergency alarming and notification without infrastructure in the localized area.

Moreover, the limitation of Bluetooth coverage can be overcome by utilizing the capabilities of the Bluetooth protocol in the methods described above. For example, in a very large conference location, the localized Bluetooth network (piconet) can join each other and form a larger network that covers the entire facility, which is much larger than the limited coverage of a single Bluetooth device. Portable cellular telephones located at one end of the facility can communicate with a second Bluetooth enabled device located at the opposite end, where the communication traffic is relayed by one or more intermediary, bridging devices. Any Bluetooth enabled device, such as the exemplary Bluetooth enabled cellular telephones, can become the bridging device(s). The cellular telephone user does not need to know whether their device is acting as a bridging device, as the process is established and functions automatically as part of the Bluetooth protocol stack routine. In effect, the process does not change any internal behavior of the Bluetooth.

And again, there is no need to reach all the people with an emergency or other message. If the message were conveyed to only a few in a room, at least a portion of those would inform the remaining people of the emergency message.

Moreover, the present innovation will allow the user to use a local, instant emergency messaging system. The dynamic deployment configuration provides the ability for people to communicate with one another in the same local proximity using Bluetooth enabled devices, where the people can chat and exchange important messaging for free. This would be accomplished exclusive of a need for a cellular network. Just think, what can be done in an emergency or in an army deployment as other communication method.

From the old days in history, humans used messengers to deliver news and information. The disclosed invention uses applies these older concepts to a device that will make it easy to distribute and broadcast the information around, using the messengers as the mobile (emergency) notification, as referred to as dynamic deployment.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF THE PRESENT INVENTION

Figure 1:
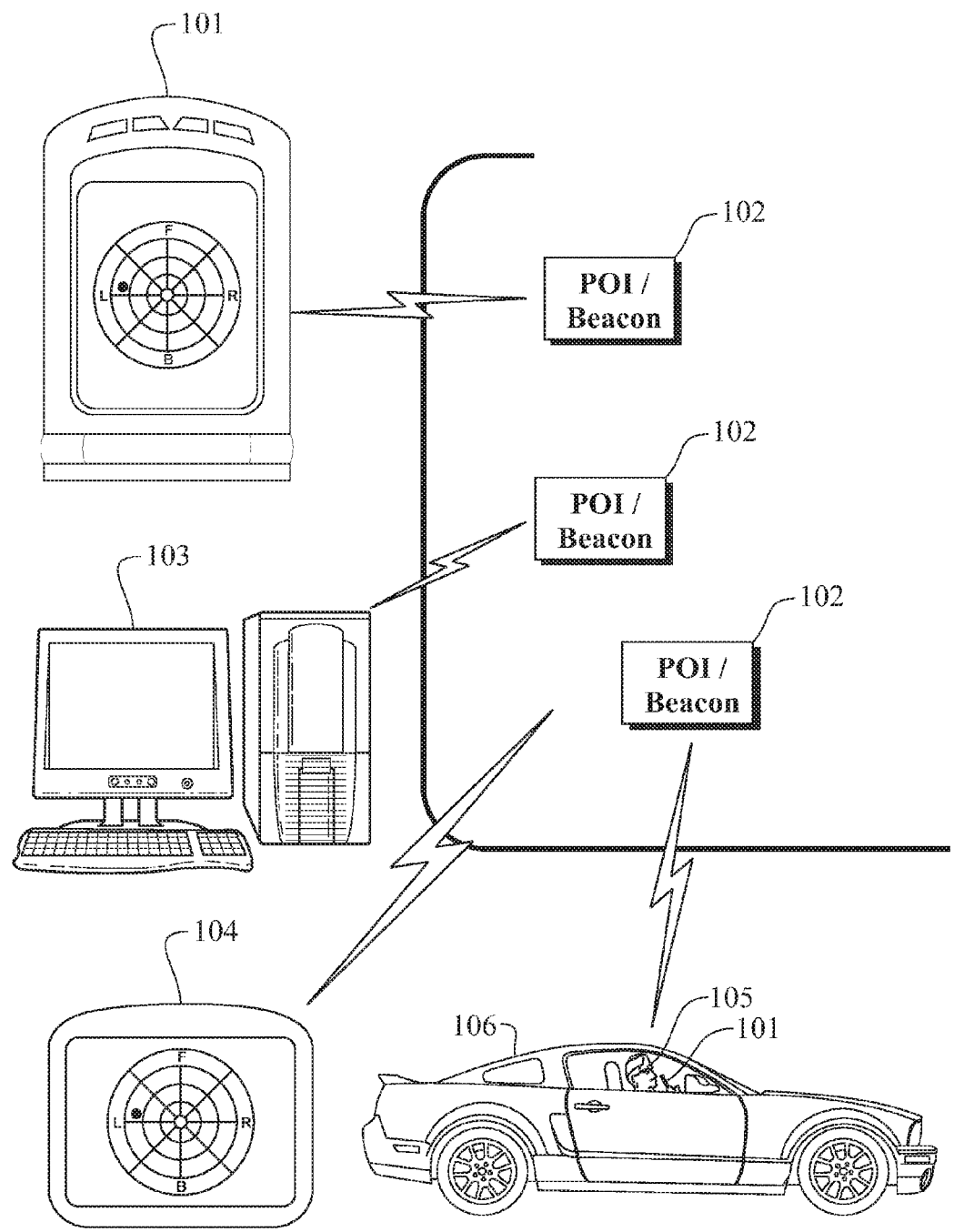
FIG. 1 presents a schematic diagram representative of an exemplary infrastructure deploying a series of Radio Frequency (RF) tags or beacons.

In all the figures of the drawings, subfeatures and integral parts that correspond to one another bear the same reference symbol.

Referring now to the drawings in detail and first particularly to FIGS. 1-13 thereof.

An exemplary flowchart illustrating a use of Radio Frequency (RF) tags or beacons 102 is presented in FIG. 1. The Radio Frequency (RF) tags or beacons 102 can utilize at least one of Bluetooth and Wi-Fi signal protocols. The exemplary system utilizes a mobile cellular telephone or other suitable mobile device 101 to scan and detect a proximity of an installed Radio Frequency (RF) tag or beacon 102 in the most part for determining a location of the user, assumed to be the same location as the user's cellular telephone 101 in an indoor environment or an outdoor environment. The location in determined by identifying the installed Radio Frequency (RF) tag or beacon 102 in the vicinity of the user's cellular telephone 101, and then using the known location of the respective Radio Frequency (RF) tag or beacon 102 thereby. The proximity of the Radio Frequency (RF) tag or beacon 102 can be used for initiating or triggering a notification of an existence to an indoor and/or outdoor navigation process as well as delivery of local content. All of this would be accomplished according to the determined location. The same method can be used by fixed computers or portable computers 103, portable devices 104, pedestrians carrying a portable device 105 (such as a cellular telephone), or a vehicle/car 106 that can be equipped with RF Bluetooth or Wi-Fi technology. It is noted that the static beacons 102 can be assisted by including other portable RF Bluetooth or Wi-Fi enabled devices within the network, thus creating a dynamic network. It is understood that a number of applications can be provided utilizing the infrastructure created by the series of deployed beacons. Additionally, the applications can utilize a precise location of the user, wherein the location is determined by information provided by beacons signals emitted from each of the deployed RF beacons 102.

Figure 2:
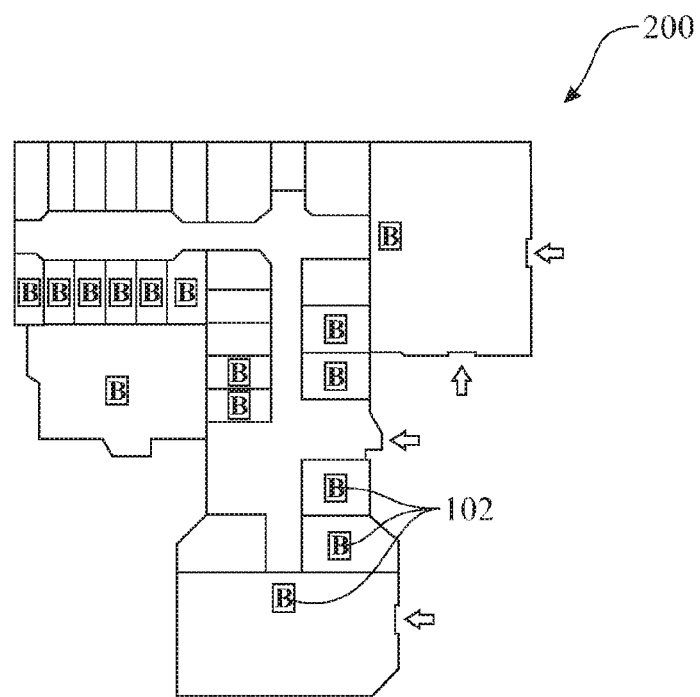
FIG. 2 presents a schematic diagram representative of an exemplary indoor mapping system utilizing the Radio Frequency (RF) tags or beacons, wherein the diagram depicts an exemplary application within a shopping mall environment.
Figure 2:
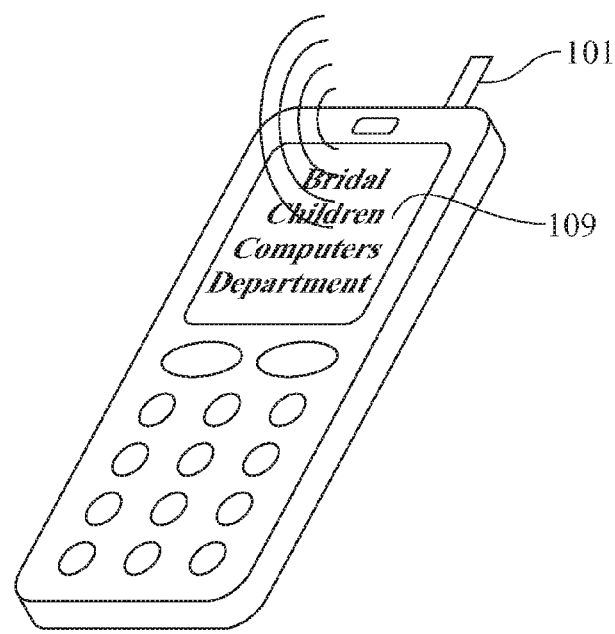
Figure 9:
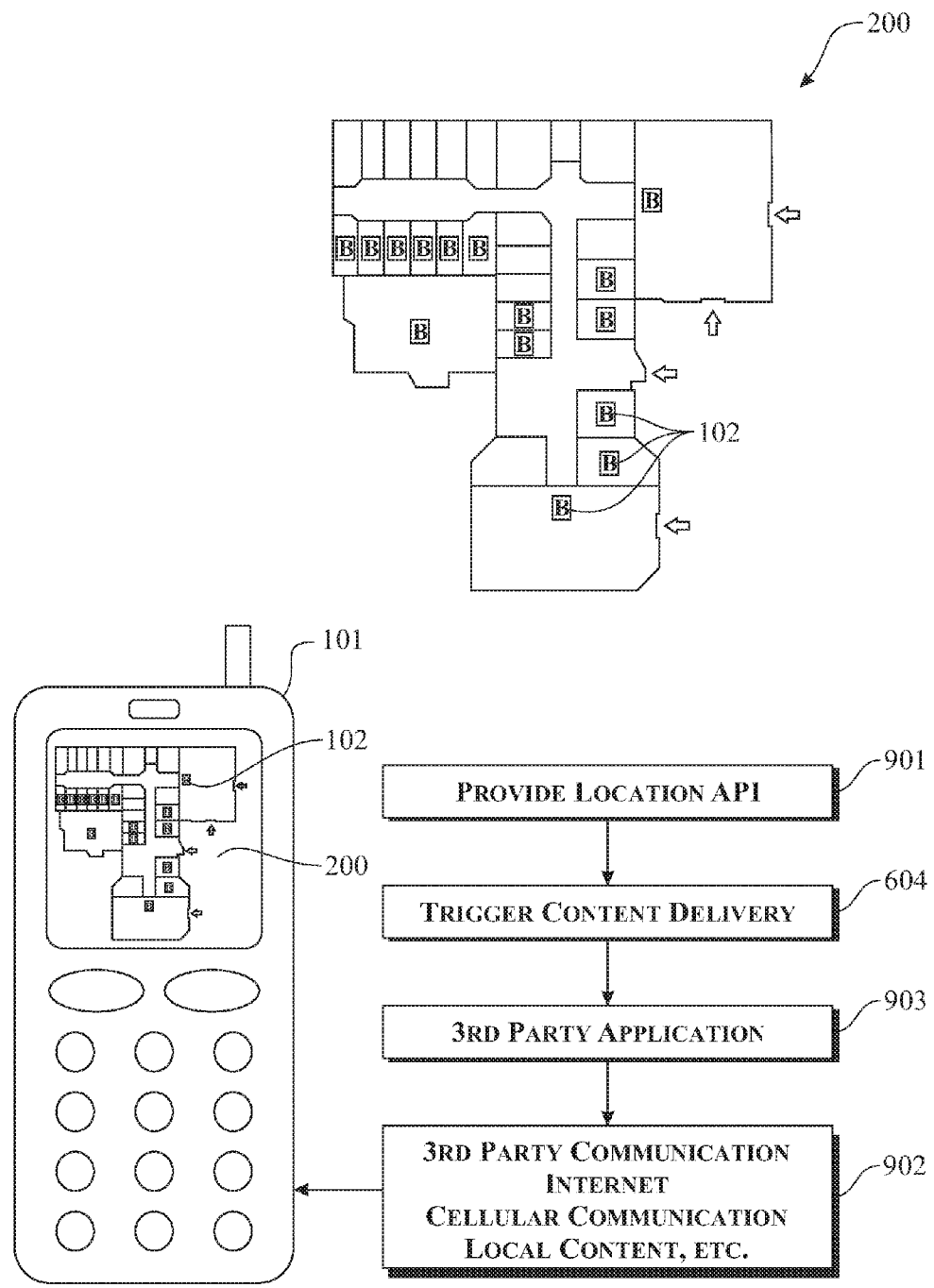
FIG. 9 presents an exemplary schematic diagram illustrating an infrastructure employing Radio Frequency (RF) tags or beacons deployed within the indoor environment.

An exemplary use of the Bluetooth and/or Wi-Fi enabled RF beacon infrastructure deployed in a mall environment is illustrated in FIG. 2. An indoor map 200 of the mall interior is downloaded and saved or installed on the cellular telephone 101. The indoor map 200 includes building structure layout, business locations and descriptions, and known RF tag or beacon 102 locations throughout the associated mall, building, or other facility. The RF tags or beacons 102 can be deployed inside stores or at any other Points of Interest (POI) located throughout or around the mall. Information associated with an RF tag or beacon 102 located proximate the cellular telephone 101 can be forwarded to the cellular telephone 101 by the beacon signal. The associated information 109 can be displayed upon the cellular telephone 101 as illustrated. A location of the beacon signal receiving device, such as a cellular telephone 101), can be determined based upon a close proximity to one or more of the RF tags or beacons 102 of the series of deployed RF tags or beacons 102, which create the beacon infrastructure. The precise location of the receiving device 101 can be determined based upon an identified beacon identification (ID) and a signal strength from the detected RF tag or beacon 102102 or RF tags or beacons 102102. The precise location can then be displayed upon an indoor map 200, as shown in FIG. 9.

Figure 3:
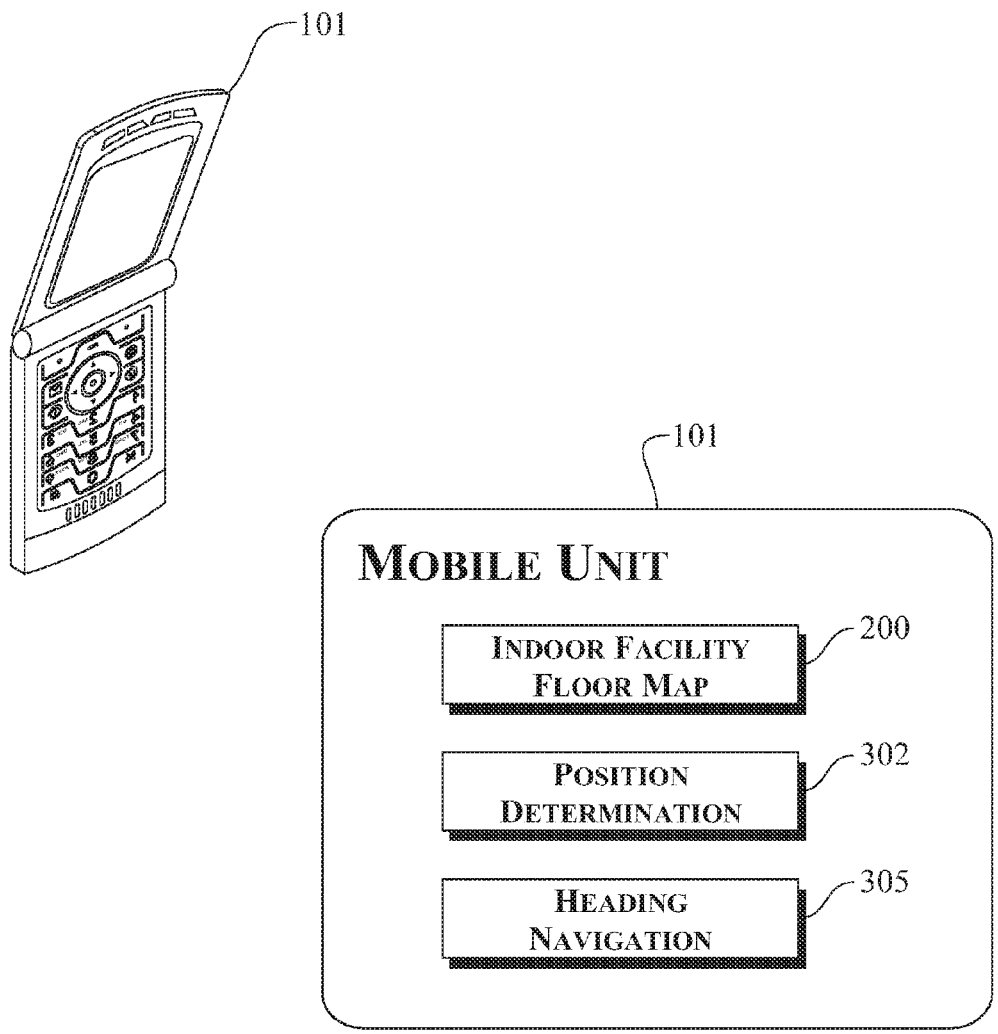
FIG. 3 presents a schematic diagram illustrating basic exemplary functions of an indoor mapping application as used on a mobile device or cellular telephone.

An exemplary operational process completed by the cellular telephone 101 is presented in FIG. 3. The mobile device 101 activates an application program for indoor mapping of the facility, building, structure, and the like 200 and scans a local area for RF tags or beacons 102 to determine the precise location 302 of the mobile telephone 101. The location of the mobile telephone 101 is determined by scanning the infrastructure of RF tags or beacons 102, wherein each RF tag or beacon 102 is installed in a known location within the structure, wherein the structure can be a mall, a building, any facility, or any other enclosed structure. The RF tags or beacons 102 102 can be installed inside stores or at any specific Point of Information (POI), around the mall. The location of the cellular telephone 101 can be determined by using information from any RF tag or beacon 102102 located in a close proximity to the cellular telephone 101. The application would recognize the identification (ID) of the RF tag or beacon 102, wherein the identification (ID) is embedded within a beacon signal emitted by the proximate RF tag or beacon 102. The application would calculate the location of the cellular telephone 101 by utilizing a signal strength of the emitted and received beacon signal. This process provides a solution for a user to determine the user's location exclusive of the Global Positioning System (GPS), access to the Internet, or any other bi-directional communication. The location of the cellular telephone 101 is then displayed upon an indoor map 200 on a display on the cellular telephone 101. Should the cellular telephone 101 be located in a suitable area and comprise the ability to establish bi-directional communication, the cellular telephone 101 can transmit a notification signal or message indicating that the cellular telephone 101 is in a region proximate the RF tag or beacon 102102, such as by transmitting an "I am here" message to a predetermined recipient. This can provide an automatic check-in process, where the user notifies others of the user's local existence to the local area business to establish his local location. In turn; the system can forward local contents to the cellular telephone 101, wherein the local content would be information associated with the current position or location of the cellular telephone or other mobile device 101. The system can be enhanced to utilize a direction of travel of the cellular telephone 101 and anticipate approaching RF tags or beacons 102. The system would then determine and transmit information associated with RF tags or beacons 102 located along the current projected path of travel of the cellular telephone 101.

Figure 4:
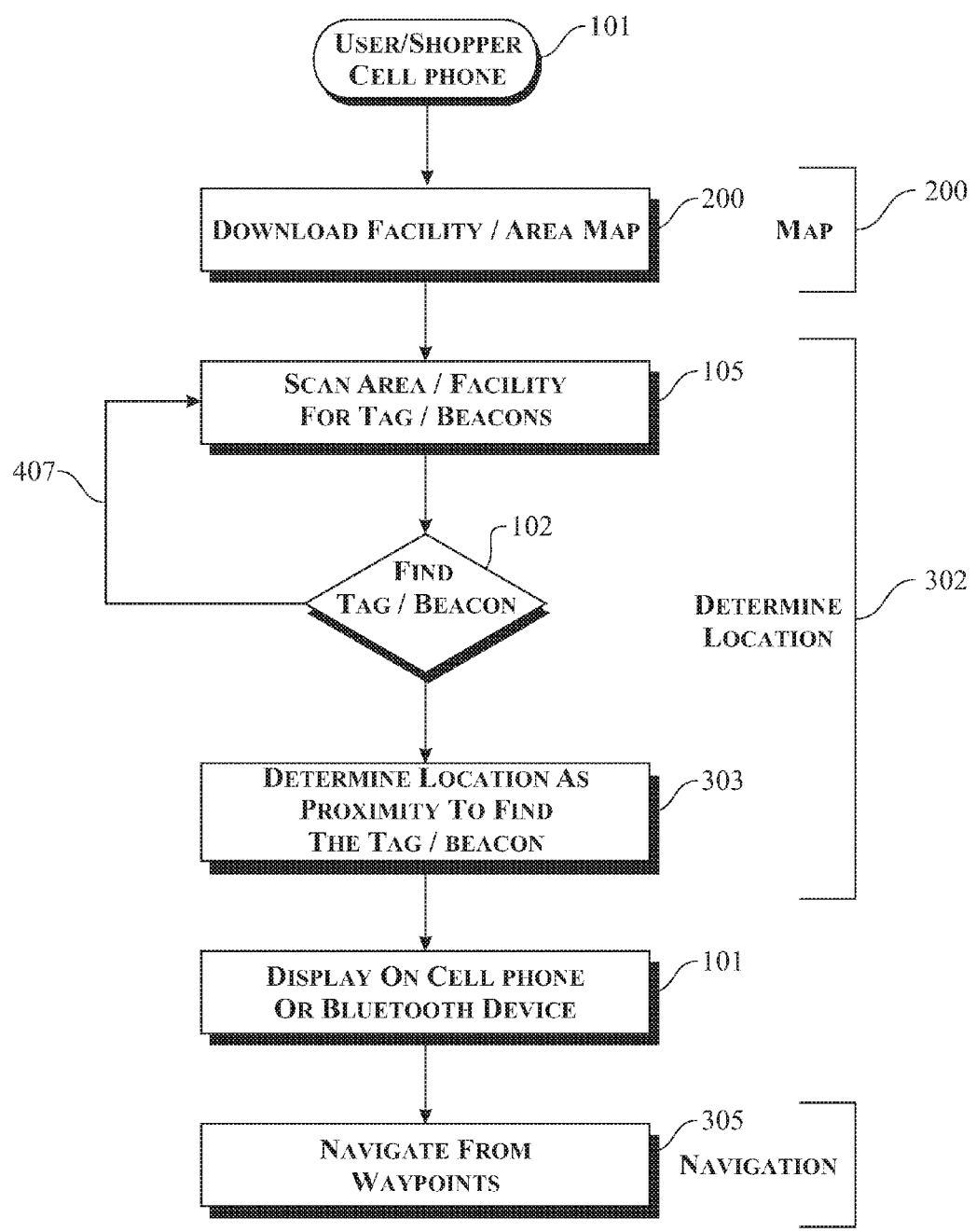
FIG. 4 presents an exemplary flow diagram representative of an indoor Radio Frequency (RF) tag or beacon detection and an associated navigation process.

An exemplary flowchart illustrating an indoor detection and navigation procedure is presented in FIG. 4. A user of the mobile cellular telephone 101 approaches a facility or area where the user can download the facility or area map 200 having a series of Bluetooth and/or Wi-Fi enabled RF tags or beacons 102 installed in known locations throughout the facility or area. The application installed on the cellular telephone 101 will scan the area or facility for broadcasted beacon signals. Upon receiving a broadcasted beacon signal, the application will determine if the received beacon signal is associated with any RF tags or beacons 102 included in a list of known RF tags or beacons 102102. If the signal is determined to be associated with any RF tags or beacons 102 included in the list of known RF tags or beacons 102102, then the application proceeds with a location determination process 303. The location of the user, assumed to be the location of the cellular telephone 101), is determined to be in a proximity of the identified RF tag or beacon 102102 transmitting the received beacon signal. The location is refined by using a signal strength of the beacon signal of the identified RF tag or beacon 102 102 enabling determination of a more precise indoor location of the cellular telephone 101. The location is then identified and displayed on an associated indoor map 200. In a condition where the cellular telephone 101 fails to receive a beacon signal, the cellular telephone 101 continues to scan the area (407). An optional feature includes a step of transmitting a notification of existence upon identification of a location; essentially having the cellular telephone 101 transmit a message stating "I am here" to the local area as a way of automatically check-in and/or a method of notifying a system that the user is within a local region. For example, the system can notify a local area business that a user is within the vicinity. In another example, the system can convey local contents to the cellular telephone 101 based upon receipt of the notification that the user is within the area. The system can provide the user with a navigation heading 305 to waypoints based upon the current location of the cellular telephone 101. In yet another example, the system can transmit Points Of Interest (POI) to the cellular telephone 101 as illustrated in FIG. 2.

Continuing to refer to FIG. 4, as the user with mobile cellular telephone 101 approaches a facility or area where the user can download the facility or area map 200 associated with the Bluetooth and/or Wi-Fi enabled RF tags or beacons 102 installed in the facility area in known locations. The application operating on the user's mobile cellular telephone 101 will scan the area or facility for RF tags or beacons 102 that are included on the list of known RF tags or beacons 102.102 If any RF tags or beacons 102 on the list were found, then a location determination process 303 is used to determine the location of the user using a proximity to the found and matched identification (ID) of the associated RF tag or beacon (102). The system uses the close proximity to the RF tag or beacon 102 and recognizes the beacon identification (ID) as well as calculating the beacon signal strength from the detect RF tags or beacons 102 to 102 allow a process for determining the precise location of the mobile device 101 in an indoor environment and includes an ability to show the location over the indoor mapping (200). The scanning continues if RF tags or beacons 102 are not found 407. When a RF tag or beacon 102 on the list is found, the location is displayed on the map loaded onto the mobile cellular telephone 101 or any other Bluetooth device (103, 104, 105, 106). Part of the detection process can include a step to notify a recipient of the existence of the user, essentially stating: "I am here" (304) to the local area as a way of automatically checking in. The automatic check in method enables the user to automatically notify others of their local existence. The automatic check in method informs the local area business of the presence of the user's local location 303. In return, the system would provide local content to the user, according to the user's location or a navigation heading 305 between Points Of Interest (POI).

Figure 5:
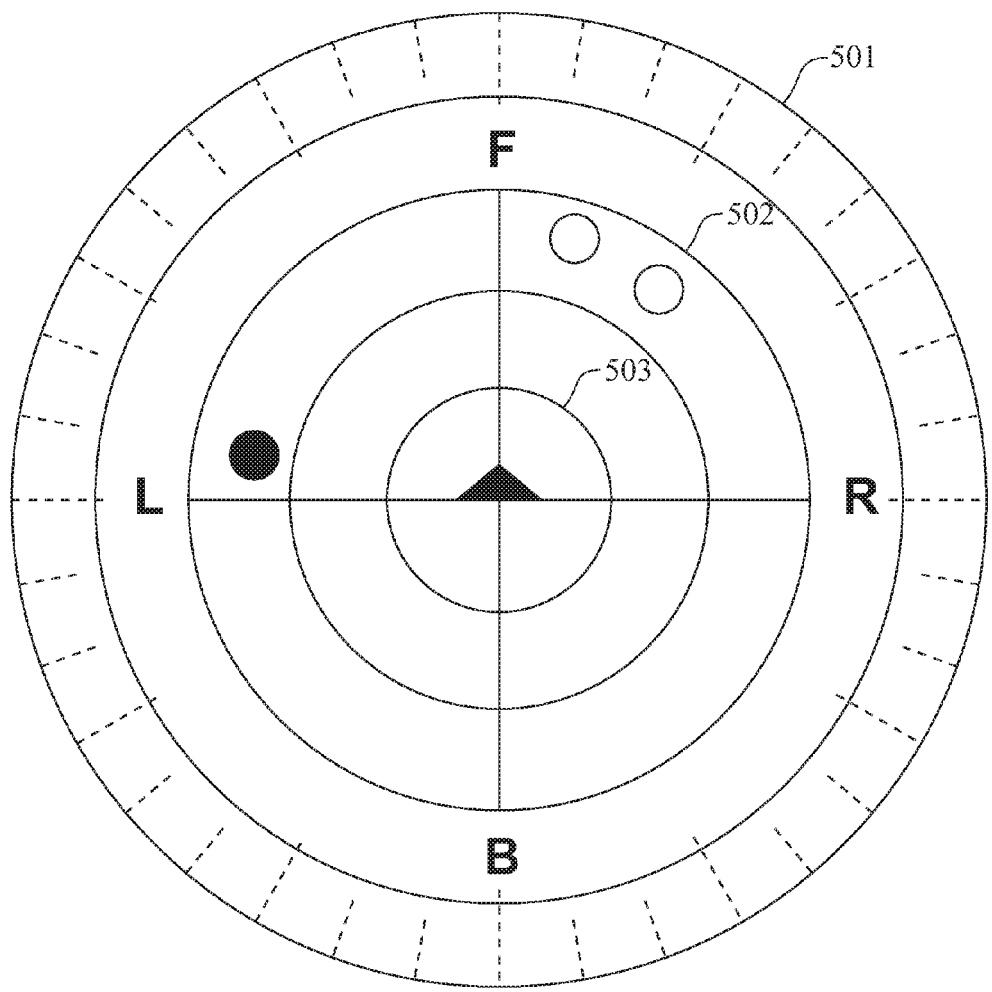
FIG. 5 presents an exemplary series a gradient concentric circles indicative of a location.

An exemplary RF beacon accuracy radius circle 501, introduced in FIG. 5, is utilized in at least two distinct manners: (a) the RF beacon accuracy radius circle 501 is used for the application, and (b) the RF beacon accuracy radius circle 501 is used to identify when the user's cellular telephone 101 enters and/or exits the area around and in a proximity to an RF tag or beacon 102 of the series of RF tags or beacons 102. A central circle 502 and an inner circle 503 illustrate different radii from the respective RF tag or beacon 102 presenting an accuracy of the location of the cellular telephone 101. The radius circle 501 would be illustrated as a circle overlaid on a portion of the local indoor map 200.

This displayed configuration would identify an accurate location of the cellular telephone 101 respective to the proximity of the beacon signal received from the Bluetooth and/or Wi-Fi RF beacon 102 located in the vicinity of the cellular telephone 101.

Figure 6:
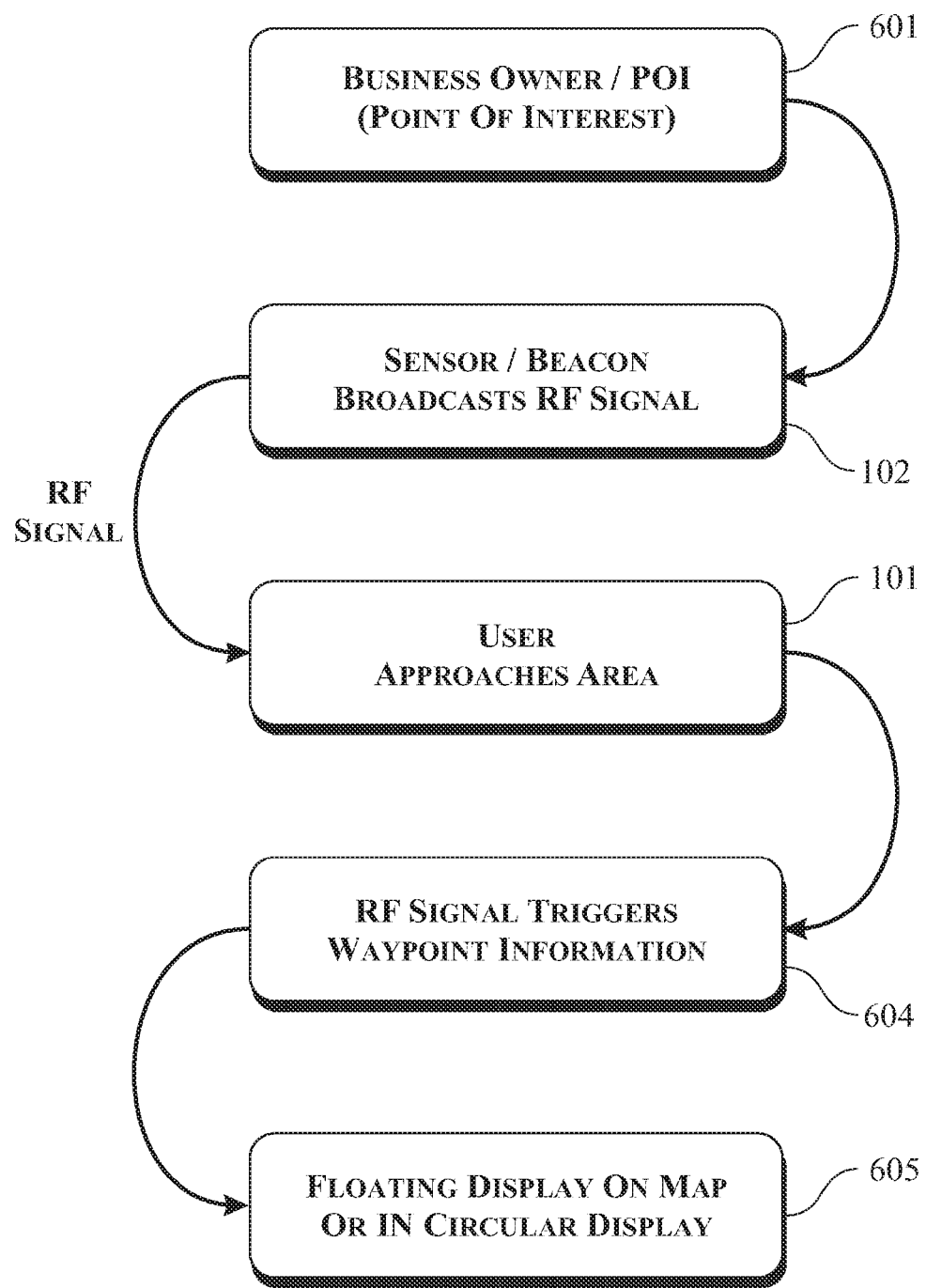
FIG. 6 presents an exemplary flow diagram representative of a business based application utilizing a series of deployed Radio Frequency (RF) tags or beacons.

Ann exemplary flow diagram of a business application utilizing the series of RF beacons 102 deployed throughout a facility, one or more buildings, a mall, a store, and the like is presented in FIG. 6. Each RF tag or beacon 102 can be installed by the facility owner, a business owner or operator 601, an advertising company, and the like. In one application, a business owner or operator 601 would install an RF tag or beacon 102 in their business. When the user of the cellular telephone 101 approaches the RF tag or beacon 102, the cellular telephone 101 detects a beacon signal transmitted by RF tag or beacon 102 in the proximity thereof. The cellular telephone 101 receives the beacon signal and determines the identification of the RF tag or beacon 102 associated with the received signal. Once the location and/or identity of the RF tag or beacon 102 is known, the application initiates a procedure to obtain local content delivery 604 from the business and/or business owner. In one option, the system can provide business or location content 604 to the cellular telephone 101. In a second option, the cellular telephone 101 can transmit a signal that will directly or indirectly notify the business owner that the cellular telephone 101 is located proximate a specific beacon 102, wherein the specific beacon 102 is associated with the business owner's store, located either proximate to or within the business owners store, and the like. In turn, the business owner can provide local content 604 to the cellular telephone 101. The application can display the location in any suitable format, such as the floating circle 501, upon the map 605.

Figure 7:
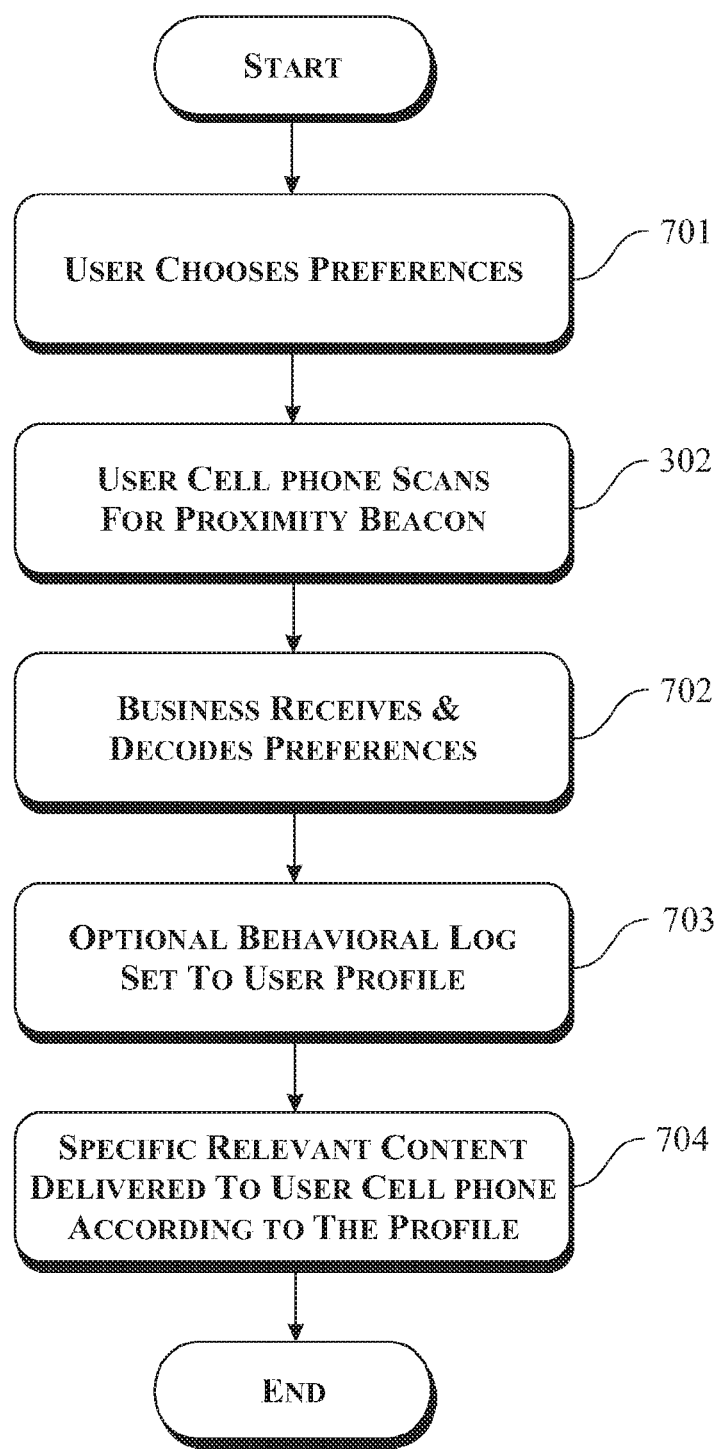
FIG. 7 presents an exemplary flow diagram representative of a marketing based application utilizing a series of deployed Radio Frequency (RF) tags or beacons, wherein the marketing based application utilizes a profile, preferences, and other information for sales and marketing purposes.

A flow diagram illustrating an exemplary target marketing feature is presented in FIG. 7. The application uses a profile preference provided by the user's cellular telephone 101 wherein the mobile device or the user's cellular telephone 101 scans the local area and determines the location of the cellular telephone 101 using information obtain from a beacon signal broadcasted by the RF tag or beacon 102 in the vicinity of the mobile device 101, such as a beacon identifier 302. The profile preference is associated with the user of the cellular telephone 101. The profile preference is provided to the local business in conjunction with a notification 702 that the cellular telephone 101 is located in the proximity to the specific RF tag or beacon 102. The process can filter information to determine Location Based Services (LBS) content 704, wherein the Location Based Services (LBS) content 704 is based upon the profile preferences of the Location Based Services (LBS), and the user's behavior 703. The system can determine Location Based Services (LBS) content 704 such as deals, offers, coupons and specials, and the like, as well as store or business information, and provide the information accordingly to the user through the user's cellular telephone 101.

Figure 8:
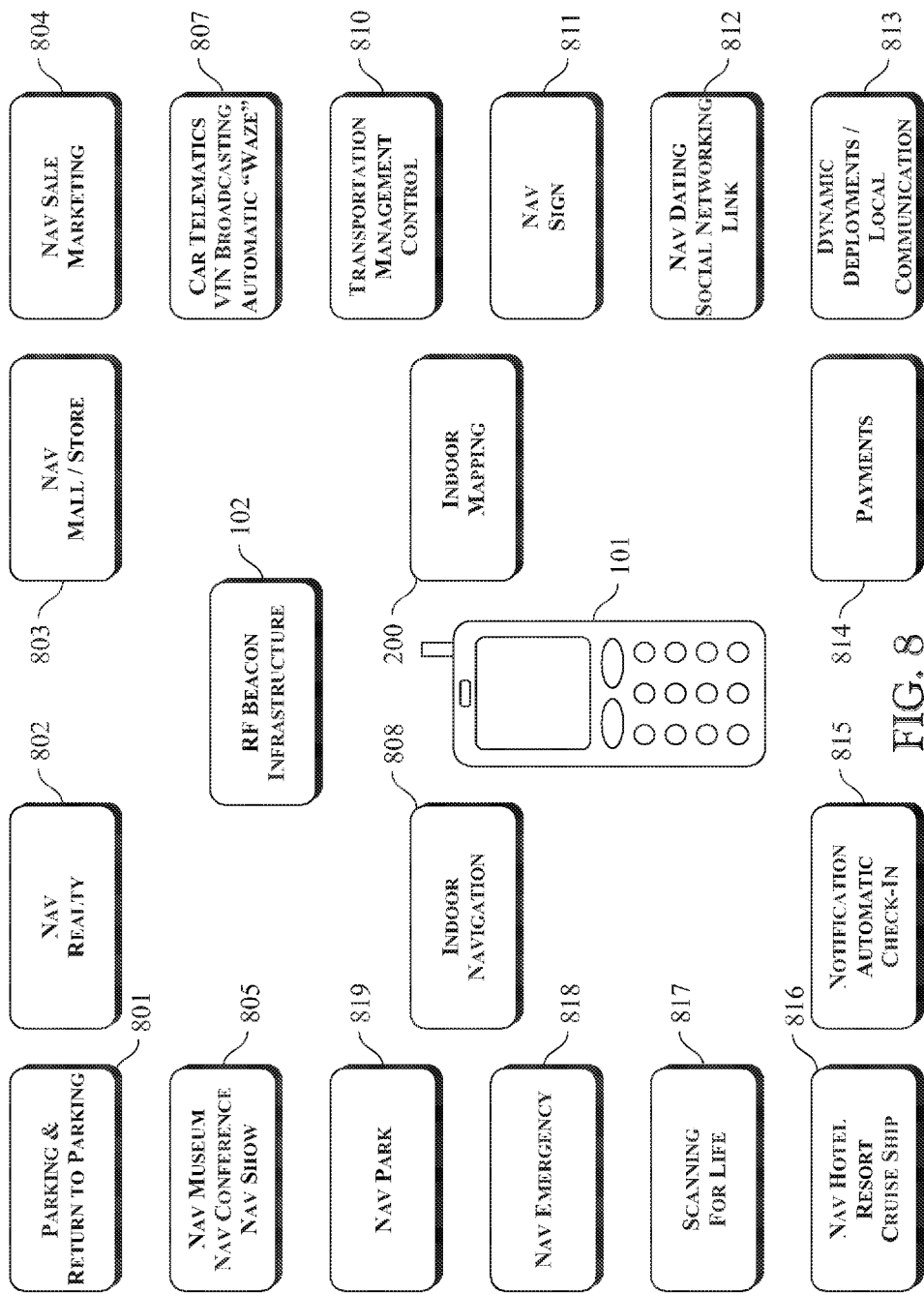
FIG. 8 presents an exemplary schematic diagram representative of a series of functions or applications associated with a series of deployed Radio Frequency (RF) tags or beacons, wherein the series of functions or applications are generally directed for use with an Radio Frequency (RF) tag or beacon infrastructure deployed within an indoor environment.

A series of Local Based Service (LBS) applications that can be utilized in conjunction with infrastructure provided by the series of deployed RF beacons 102 and the methods describes according to various embodiments of the present invention is illustrated in FIG. 8. One application, referred to as Parking and Return to Parking 801, provides a method for searching for available parking spaces and/or a process for assisting a user to return to the parking location of the user's car. The Parking and Return to Parking 801 application can provide parking information within a parking garage, in a mall parking area, for street parking, and the like, wherein the Parking and Return to Parking 801 provides the user with direct navigation to empty parking spots and/or to provide the user guidance to return to the location where the car was previously parked.

In another application, Nav realty 802, information associated with real estate is provided to a user using RF tags or beacons 102 installed at each real estate property. Each RF tag or beacon 102 would provide local information about the associated real estate property and can include navigation information respective to real estate located within the local area directly to the user's cellular telephone 101.

In yet another application Navmall or store 803, information can be provided to business operators and subsequently, business related information can be provided to the application user.

In yet another application, Navsale marketing 804, sales, specials, coupons, and the like can be transmitted to the cellular telephone 101. This feature can provide directions or navigation to the user to guide the user to areas displaying items associated with the sales, specials, coupons and the like.

In yet another series of applications, Nav museum, Nav conference, Nav show 805, the RF tags or beacons 102 would be installed in known locations within a museum, a conference center, a show (respectively) and any other related location, whereby the RF tags or beacons 102 directly or indirectly provide information and/or navigation associated with the location to the user of the associated application.

In yet another application, Car Telematics, VIN broadcasting, Automatic "waze" 807, mobile communication devices, such as the cellular telephone 101, the vehicle communication system, and the like, can be employed to create an ad hoc network, enable vehicle to vehicle communications, and the like. The RF tags or beacons 102 can be deployed along a side of a road, a cellular telephone 101 residing within a vehicle, integrated into a vehicle, and the like. When the cellular telephone 101 is mobile, the cellular telephone 101 can provide wireless vehicle-to-vehicle communication. One optional feature of this application would be an inclusion of automatic traffic notifications, what can be referred to as automatic "waze", whereby the cellular telephone 101 can provide automatic traffic and road notifications. In an alternate embodiment, a Bluetooth enabled device can be located within a vehicle 106 (as either a fixed or a portable device), on a driver 105, on a pedestrian, and the like. The cellular telephone 101 can be included as an integral element in gathering traffic information. The system can monitor movement of the same mobile device to determine traffic flows. Vehicle telematics can be collected and conveyed to receiving parties.

In yet another application, Indoor Navigation 808, the RF tags or beacons 102 can be employed to provide an infrastructure enabling the application to determine a precise location of the receiving device. The application would additionally include a capability of providing navigation between various deployed RF tags or beacons 102. This application provides a solution in areas where the Global Positioning System (GPS) is ineffective, such as indoors. The system also eliminates a need for bidirectional communication.

In yet another application, Transportation 810, the RF tags or beacons 102 would be deployed in a subway, on a train, on a bus, and/or in any other mass transit system. This infrastructure would provide the user with information directly to their cellular telephone 101 from the deployed RF tags or beacons 102 installed at stations and/or along the routes. This gives the user a complete navigation on a map of the train or subway mass transit directly to the user's cellular telephone 101.

In an alternative mode of the Transportation Application 810, the RF tags or beacons 102 can be deployed along a side of a road, a cellular telephone 101 residing within a vehicle, integrated into a vehicle, and the like. When the cellular telephone 101 is mobile, the cellular telephone 101 can provide wireless vehicle-to-vehicle communication. One optional feature of this application would be an inclusion of automatic traffic notifications, what can be referred to as automatic "waze", whereby the cellular telephone 101 can provide automatic traffic and road notifications. In an alternate embodiment, a Bluetooth enabled device can be located within a vehicle 106 (as either a fixed or a portable device), on a driver 105, on a pedestrian, and the like. The cellular telephone 101 can be included as an integral element in gathering traffic information.

In yet another application, Navsign 811, the RF tags or beacons 102 can be installed along a roadway at locations either proximate traffic signs or at locations exclusive of traffic signs, but would be appropriate for conveying traffic related information to a driver. Each RF beacon 102 would be installed at a location enabling passing vehicles to receive beacon signals from the deployed series of RF tags or beacons 102. The related infrastructure would provide a telematics system to the driver's cellular telephone 101, a system integrated into a vehicle, and the like.

In yet another application, NAV Dating/Social Networking Link 812, a precise location of the cellular telephone 101 is determined using information associated with the beacon signal from the RF tag or beacon 102 that is located in a proximity of the cellular telephone or mobile device 101. The location information is then utilized to assist the user in regards to social networking as well as indoor navigation.

In yet another application, Dynamic Deployment/Local Communication 813, the application establishes an ad hoc network between a series of mobile Bluetooth enabled RF beacons, such as Bluetooth transceivers of cellular telephones 101 to provide local messaging between a message transmitting user and a message receiving user, wherein the message is conveyed through at least one intermediary Bluetooth enabled RF beacon.

In yet another application, Payments 814, a payment transaction method can utilize a location determined by the proximity of the cellular telephone 101 to an RF tag or beacon 102 of the series of RF tags or beacons 102. The location, the identification of the RF beacon 102 and/or the user profile can be associated with the payment.

In yet another application, Notification or Automatic Check-In 815, the cellular telephone 101 is directed to automatically transmit an arrival message, which notifies a recipient that the cellular telephone 101 has received a beacon signal from an RF tag or beacon 102 included within the infrastructure of beacons and that the cellular telephone 101 is in proximity of the RF tag or beacon 102. The application can additionally consider elements of the user's profile when determining whether to send the arrival message and/or what is included in the arrival message.

In yet another application, Nav Hotel, Nav Resort, Nav Cruise Ship 816, the RF tags or beacons 102 can be deployed within a hospitality environment to provide an infrastructure enabling the application to determine a precise location of the receiving device within the hospitality environment or venue. Since most of the environments of the hospitality venues are located indoors, this application provides a solution in areas where the Global Positioning System (GPS) is ineffective. Additionally, the Nav Hotel, Nav Resort, Nav Cruise Ship 816 application can automatically initiate Location Based Services (LBS) associated with the hospitality environment. The Nav Hotel, Nav Resort, Nav Cruise Ship 816 application can also automatically initiate a link to services associated with the hospitality environment. The Location Based Services (LBS) and the links can be automated based upon the determined location of the receiving device, such as a mobile device or a cellular telephone 101. The location of the receiving device can be determined by the identification (ID) of the beacon signal from the RF tag or beacon 102 located proximate the receiving device.

In yet another application, Scanning For Life 817, the cellular telephone 101 converts into a beacon in a condition where two direction communication networks are unavailable by either lack of installation or an outage. The cellular telephone 101, acting as a beacon, repetitiously transmits a beacon signal using at least one of a cellular transmission, a Bluetooth transmission, and a Wi-Fi transmission. Search and rescue parties would utilize a portable receiver to scan for and locate the Scanning for Life beacon signal. The Scanning For Life 817 application can include location based functions, wherein the location is determined from beacon signals received from RF tags or beacons 102 deployed in the area. The beacon signal would include a beacon identification (ID), which includes information pertaining to the known location of the respective RF tag or beacon 102. The beacon signal can optionally include embedded information associated with the cellular telephone 101, which can include specific information associated with the user of the cellular telephone 101, location information, and the like.

In yet another application, Nav emergency 818, the RF tags or beacons 102 provide critical information and/or navigation to the user during an emergency event including instructions pertaining to an emergency procedure, an emergency evacuation map and directions for evacuating the facility to a safe location.

Additionally, the Nav Emergency 818 application utilizes the RF tags or beacons 102 to provide navigation to the cellular telephone 101 from the current location of the cellular telephone 101 to an exit location in accordance with a predetermined, optimal emergency exit route. The location and routing would be based upon the initial location, which is determined by a proximity to an RF tag or beacon 102 of the localized RF beacon infrastructure. The application can additionally provide an emergency procedure and any other necessary notifications to the user through the user's cellular telephone 101.

In yet another application, Nav amusement or Nav park 819, the RF tags or beacons 102 would be installed in known locations about any amusement park, theme park, or other entertainment venue, whereby the RF tags or beacons 102 directly or indirectly provide information and/or navigation associated with the respective venue to the user of the application. The application can be enhanced by including an optional feature to assist a user in reducing wait times, such as a virtual queuing process, for access to rides, events, shows, and the like.

It is noted that the RF beacon infrastructure enables execution of the above-described application exclusive of cellular communications and/or access to the Internet.

An exemplary indoor infrastructure of RF beacons 102, wherein the RF tags or beacons 102 are installed in known locations throughout a local area, as presented in FIG. 9. Each RF tag or beacon 102 broadcasts at least one of a Bluetooth signal and a Wi-Fi signal. The RF tags or beacons 102 enable an application to determine a precise location of the cellular telephone 101 on a local map 200. Once the application determines the location of the cellular telephone 101 respective to a proximate RF tag or beacon 102, the application can utilize a user's profile or profile preferences to obtain marketing information. The user's profile or profile preferences can be used to filter information provided to the cellular telephone 101. The application can provide information to a remote recipient using Application Programming Interface (API) 901 which would trigger or initiate content delivery 604. When triggering content delivery 604, a 3rd party application 903 would respond to the transmission directed by the application by conveying or pushing local content or other associated information 902 to the cellular telephone 101. The bi-directional communication can be accomplished using cellular communication, an ad hoc network, an Internet based communication, and the like. In another embodiment, the remote recipient can include a local business owner or operator, thus notifying the business owner or operator that the specific cellular telephone 101 is in a vicinity of the business.

Figure 10:
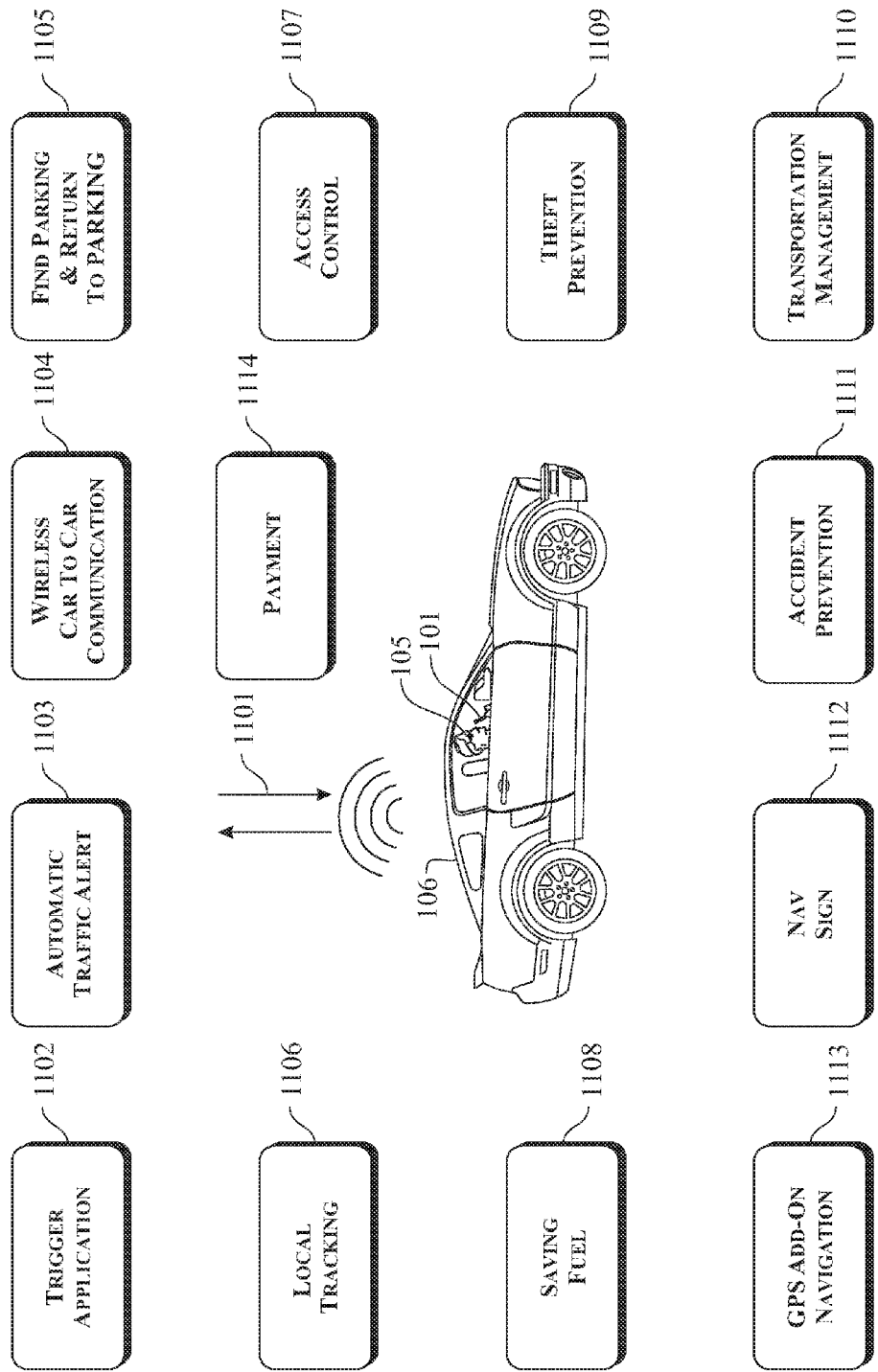
FIG. 10 presents an exemplary schematic diagram representative of a series of functions or applications associated with transportation and/or telematics applications, wherein the series of functions or applications are generally directed for use with a static and/or dynamic Radio Frequency (RF) tag or beacon infrastructure.

A series of transportation based applications, introduced in FIG. 10, can be utilized in conjunction with infrastructure provided by the series of fixed or dynamically deployed RF beacons 102 and the methods describes according to various embodiments of the present invention. A portion of the applications introduce telematics therewith.

In one application, referred to as a Trigger Application 1102, the system identifies an RF tag or beacon 102, which subsequently triggers or initiates an application. The triggering can be based upon the location of the cellular telephone 101. The location can be determined by the identification (ID) of the RF tag or beacon 102 located proximate the cellular telephone 101. Additional accuracy can be provided by using the signal strength of the beacon signal from the RF tag or beacon 102 located proximate the cellular telephone 101 or using triangulation when receiving two or more beacon signals from the RF tags or beacons 102 located proximate the cellular telephone 101.

A second application, referred to as Automatic Traffic Alert 1103, provides beacon signals comprising telematics including traffic alerts. The traffic alerts can be included in the naming portion of the beacon signal. Using this application, a driver 105 can employ their cellular telephone 101 to deliver automatic traffic information 1103 into the system. The system can employ mobile devices 101 that are traveling in vehicles to determine traffic flow. The traffic flow can then be disseminated to other users by way of their mobile devices 101.

In another application, referred to as Dynamic Deployment 1104, an ad hoc network is created between vehicles providing vehicle to vehicle communication using an intermediary communication link. The vehicle to vehicle communication is preferably accomplished using a Bluetooth protocol.

In yet another application, referred to as Find Parking and Return to Parking 1105, the RF beacon infrastructure is used to inform a user of vacant and available parking locations and/or provide navigation guiding the user to the location where the user parked their vehicle.

In yet another application, referred to as Local Tracking 1106, the system utilizes a Bluetooth beacon that can recognize the car and/or driver identification (ID) and subsequently track the car and/or driver. The car identification can be the vehicle identification number or VIN.

In yet another application, referred to as Access Control 1107, recognition of either a proximate RF tag or beacon 102 or an approaching cellular telephone 101 causes activation of a device. This can be accomplished using any of many suitable processes. For example, when a vehicle is approaching a gate, the vehicle would receive a beacon signal from a local RF tag or beacon 102. The signal would be deciphered to determine the identity of the RF tag or beacon 102. Once known, the system would act according a directive that is associated with the identity of the proximate RF tag or beacon 102. In one example, the system would transmit a signal to open the gate when the vehicle approaches the gate.

In yet another application, referred to as Saving Fuel 1108, the application or series of applications can reduce fuel consumption by optimize navigation, reducing time finding parking spaces, provide telematics associated with traffic, provide management support of transportation systems, and the like.

In yet another application, referred to as Theft Prevention 1109, the RF tag or beacon 102 would recognize the vehicle and prevent theft.

In yet another application, referred to as Transportation Management 1110, the RF tags or beacons 102 provide assistance for management of transportation systems.

In yet another application, referred to as Accident Prevention 1111, the cellular telephones are employed as mobile RF beacons 101 provide assistance for prevention of accidents. In one example, the beacons can be used to notify a user when two mobile RF beacons 101 become too close to one another.

In yet another application, referred to as Nav Sign 1112, the RF tags or beacons 102 can convey information associated with road signs. The RF tags or beacons 102 would be deployed along a roadway, located proximate to signs. The RF tags or beacons 102 would transmit beacon signals containing sign information within the naming portion of the beacon signal. The naming portion can be decoded when received by a mobile receiving device, such as a vehicle system or a cellular telephone 101 and conveyed to the user.

In yet another application, provided as a Global Positioning System (GPS) add-on, referred to as Navigation 1113, the series of RF tags or beacons 102 can be used to determine a location of a receiving device, such as the cellular telephone 101 or another mobile device, and can additionally be used to obtain and provide navigation. This is particularly beneficial in areas where the Global Positioning System (GPS) is ineffective, such as within an indoor environment. The navigation can utilize a location recognition process wherein the location of the mobile device 101 is determined using the identification (ID) of the RF tags or beacons 102. The identification (ID) of the RF tags or beacons 102 are embedded into the naming portion of the beacon signal. The receiving device 101 decodes the beacon signal to determine the identification (ID) of the signal received from the RF tag or beacon 102 located proximate to the receiving device 101. The identification (ID) of the RF tag or beacon 102 includes the known location. The decoded identification (ID) is used to determine the location of the receiving device 101. Additionally, signal strength of the beacon signal and/o triangulation can be employed to further refine the accuracy of the location.

Figure 11:
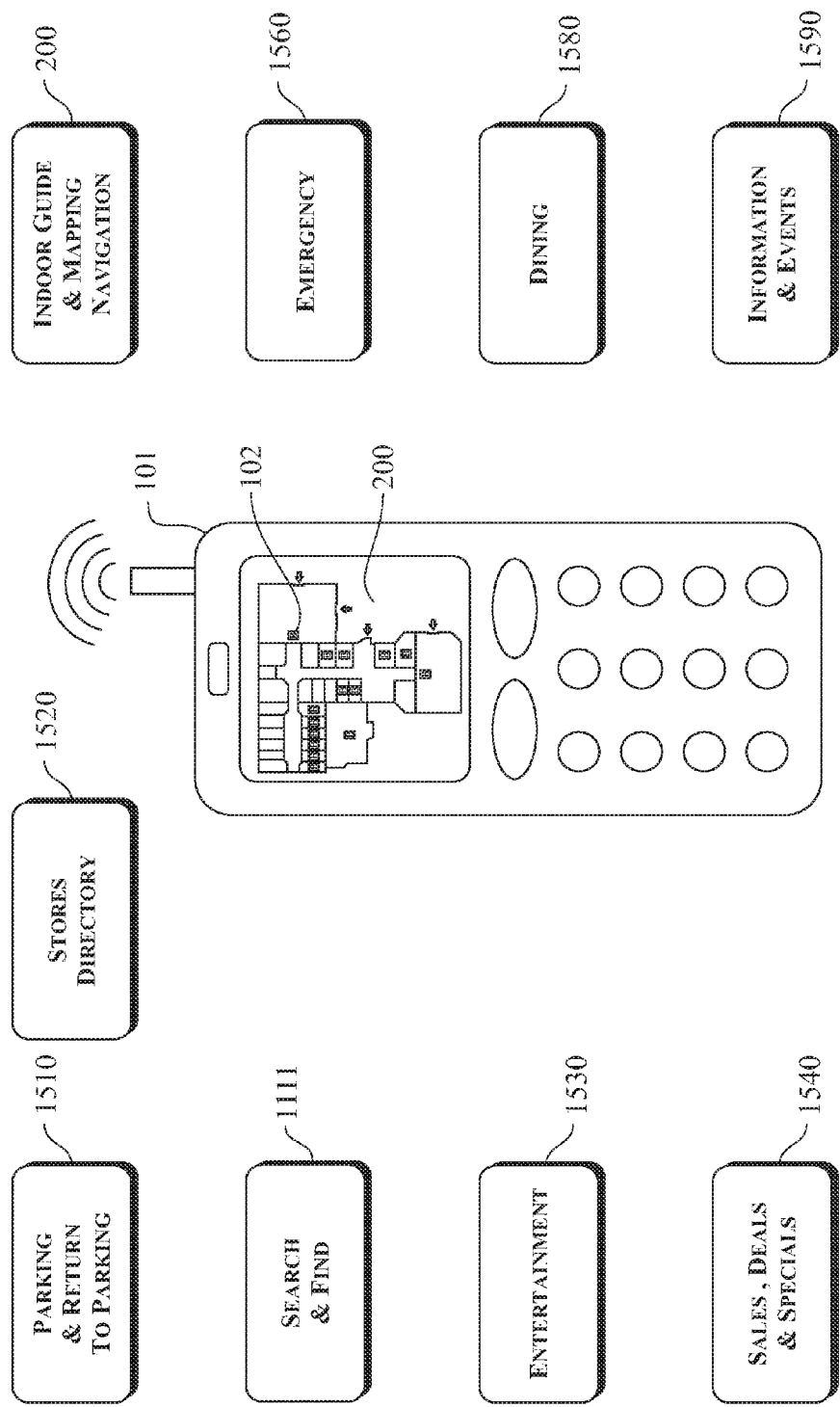
FIG. 11 presents an exemplary schematic diagram representative of a series of functions or applications associated with hospitality based applications, wherein the series of functions or applications are generally directed for use with hospitality related businesses and environments.

A series of navigation based applications that can be utilized in conjunction with infrastructure provided by the series of deployed RF beacons 102 and the methods described according to various embodiments of the present invention are illustrated in schematic form shown in FIG. 11. Each RF tag or beacon 102 contains and broadcasts a beacon signal comprising a beacon identifier (ID) to enable a receiving device 101 to determine a precise location of the device within a facility, a mall, a show, a store, and the like. The RF tags or beacons 102 would broadcast a beacon signal using at least one of Bluetooth and Wi-Fi protocol. At least a portion of the RF tags or beacons 102 can be associated with a waypoint.

Each of the series of exemplary applications provides a location determining solution and navigation in an environment that is not conducive for the Global Positioning System (GPS), such as within a mall, a store, a parking garage, and any other indoor location.

One application, referred to as Parking and Return to Parking 1510, the RF tags or beacons 102 are deployed in a parking area. Each RF tag or beacon 102 includes at least one sensor to determine a presence or absence of a vehicle in the associated parking spot. The RF tags or beacons 102 identify vacant parking spots and provide navigation to each vacant parking space to a user. The application can additionally or alternatively provide navigation directing the user to the parking space containing their vehicle.

In a second application, referred to as Stores Directory 1520, a directory of merchants is provided to the cellular telephone 101. The directory can include displaying locations of the merchants on a local map 200.

In another application, referred to as Search and Find 1111, the RF beacon infrastructure is used to provide directions or navigation between known waypoints within an indoor facility, such as a mall. The known waypoints would be displayed upon the indoor map 200.

In yet another application, referred to as Entertainment 1530, the network provides information pertaining to entertainment to the receiving device 101. The entertainment can be associated with a location of the receiving device 101, wherein the location would be determined by a proximity to an RF tag or beacon 102. The application can additionally provide navigation to a location associated with the entertainment.

In yet another application, referred to as Sales, Deals, and Specials 1540, the network provides information pertaining to sales, deals, specials, and the like to the receiving device 101. The sales, deals, specials, and the like can be associated with a location of the receiving device, wherein the location would be determined by a proximity to an RF tag or beacon 102.

In yet another application, referred to as Emergency 1560, the network provides a notification of an emergency situation, emergency procedural information, and navigation from the current location, through the structure, and to a predetermined exit location. The information would be respective to the proximate RF tag or beacon 102.

In yet another application, referred to as Dining 1580, the network provides information pertaining to dining in the local area to the receiving device. The dining information can be associated with a location of the receiving device 101, wherein the location would be determined by a proximity to an RF tag or beacon 102. The application can additionally provide navigation to a dining location. This can include restaurant types, menus, and the like.

In yet another application, referred to as Information and Events 1590, the network provides information pertaining to events to the receiving device. The events can be associated with a location of the receiving device, wherein the location would be determined by a proximity to an RF tag or beacon 102. The application can additionally provide navigation to a location associated with each event.

Figure 12:
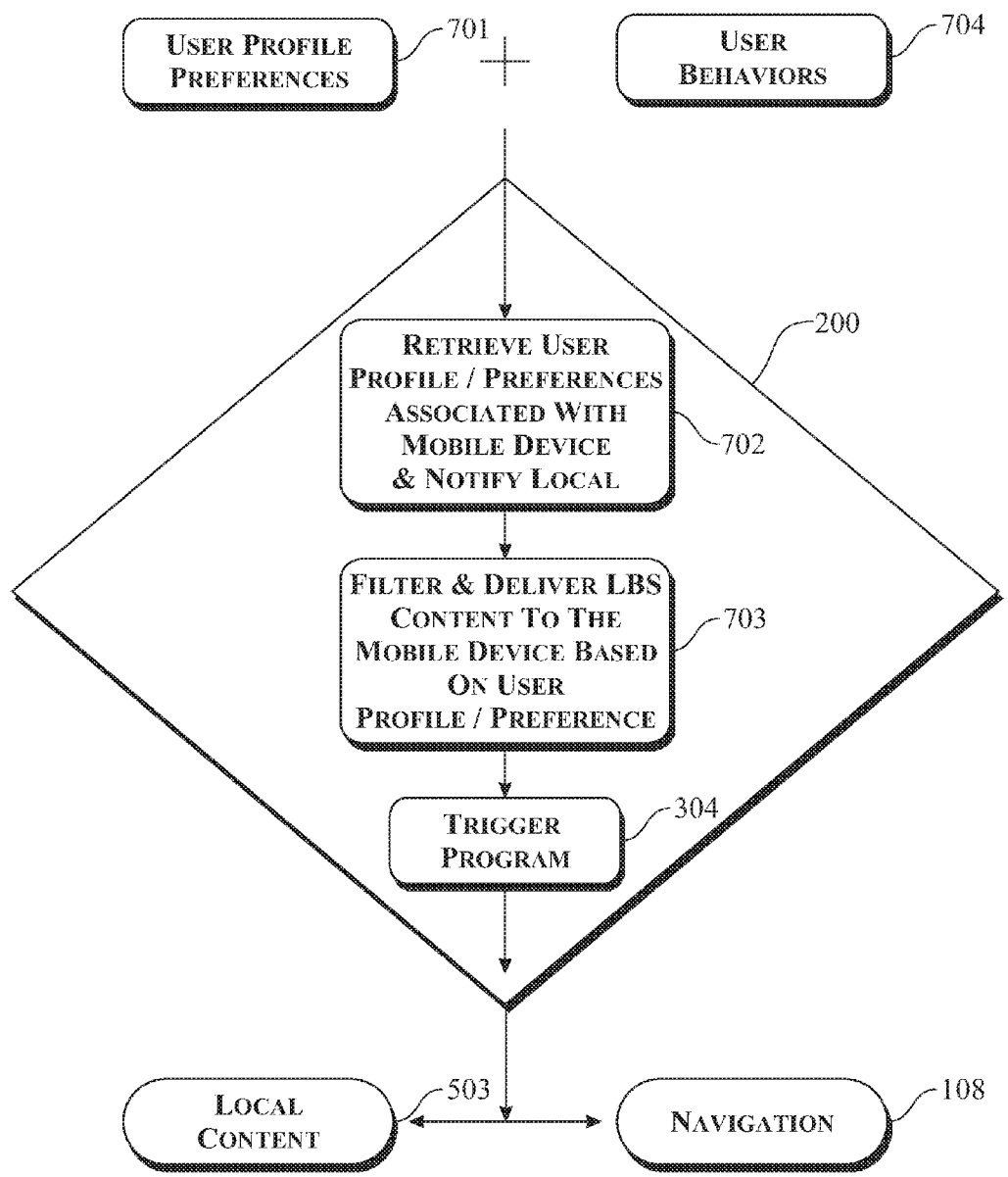
FIG. 12 presents an exemplary flow diagram representative of a next generation marketing tools employing Radio Frequency (RF) tag or beacon technology.

An exemplary flow diagram illustrating a next generation of marketing tools utilizing the RF beacon 102 infrastructure deployed in a local area is presented in FIG. 12. The network obtains a user's profile or preferences 701 as well as a user's behavioral pattern 704 associated with the user's cellular telephone 101. The information is conveyed to a business owner 702 for marketing purposes. The user's profile and/or preferences are filtered to determine applicable Location Based Services (LBS) 703. The information can trigger or initiate an application 304, establish a link to an existing system and software, and the like, to provide at least one of local content 503 and indoor navigation 108 to the cellular telephone 101 or similar receiving device.

Figure 13:
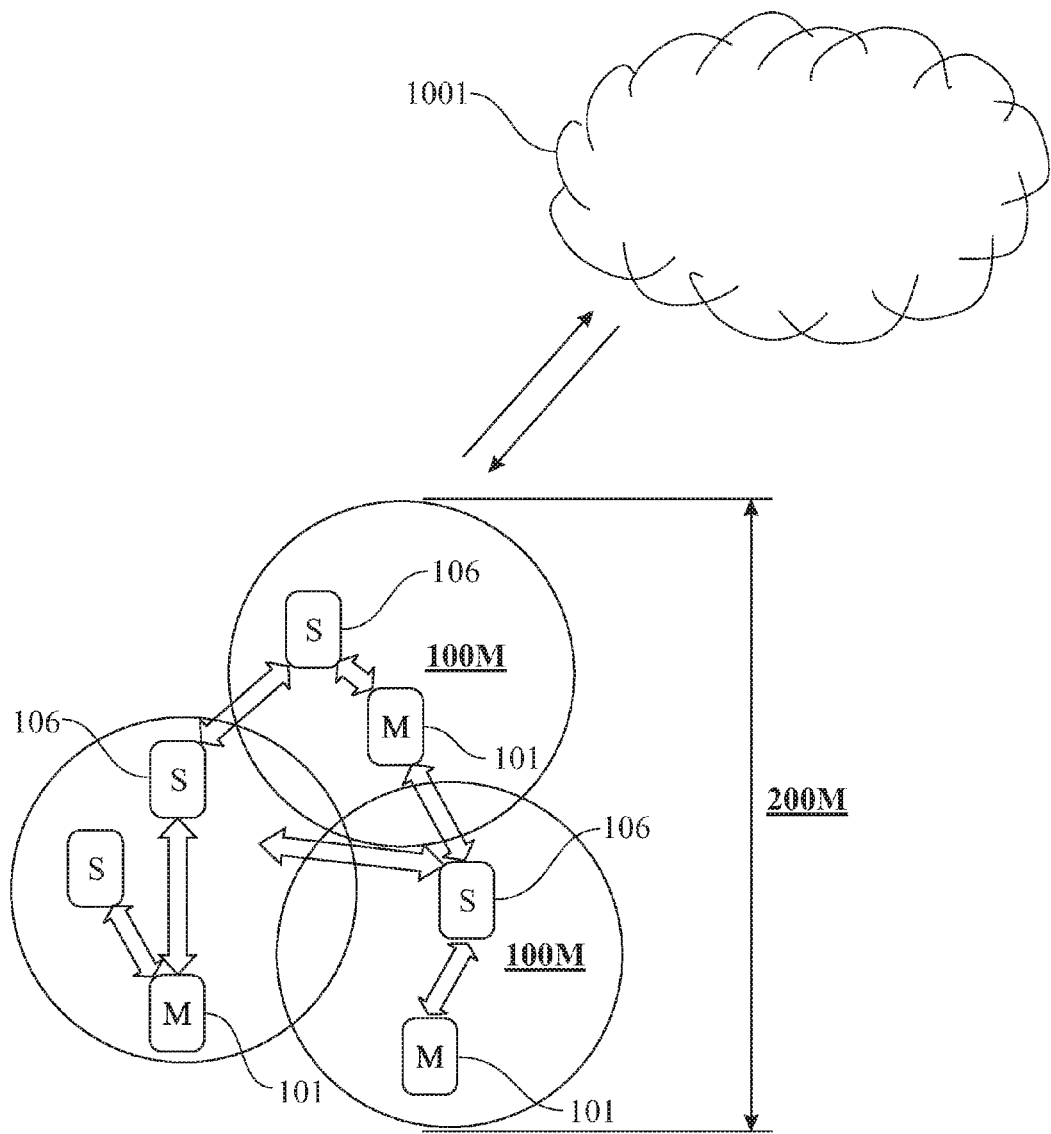
FIG. 13 presents a schematic diagram illustrating an exemplary dynamic deployment of an RF based network for use in a variety of applications, including mobile to mobile communications, car to car communications, and emergency or local communications.

An exemplary schematic diagram illustrating a method of utilizing dynamic deployment to create an ad hoc network is presented in FIG. 13. Exemplary applications include vehicle-to-vehicle communication, emergency communications, local communications, and the like. The method establishes communication between a series of Bluetooth devices located proximate one another. One exemplary implementation employs cellular telephones 101, utilizing the Bluetooth transceivers integrated therewith. The dynamic network is created by placing proximally located Bluetooth devices into an ad hoc or mesh network. The network is based upon overlapping signal transmission radii, as shown. The network can include installed or stationary Bluetooth devices 106 and/or mobile Bluetooth devices 101, exclusive of cellular or other higher powered and costly communication interfaces. The method can be utilized in transportation creating a road size networking of vehicles and/or drivers for telematics or traffic information, a push alert providing road information, and creating a vehicle-to-vehicle communication capability. In another option, the network can be utilized in an emergency situation; more specifically, when and where the cellular network is unavailable, interrupted, down, or fail. The ad hoc network creates a longer range communication capability utilizing local low power Bluetooth and/or Wi-Fi enabled devices to convey information to local emergency responders or other parties. Another optional feature of the dynamic deployment enables creation of an ad hoc network within a structure, a mall, a store, a building, an office, an entertainment complex, and the like, exclusive of cellular communication. The ad hoc network provides capability for local messaging between users in a proximity area. The network can be utilized to deliver local content to the cellular telephone 101 exclusive of any broader and higher powered communication networks, such as cellular, and the like. The network would be applicable between cellular telephones 101 vehicles comprising the appropriate transceiver technology 106, within a facility, a building, an area, and the like. Additional information can be provided through the Internet or any other resource 1001.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:
1. A method of utilizing at least one beacon for conveying information, the method comprising steps of:
deploying at least one beacon about a localized geographic area, wherein each of the at least one beacon is deployed at an associated known geographic location;

encoding an address into an identification segment of a beacon signal, wherein the encoded address identifies the associated known geographic location of the respective beacon, each geographic location reference being unique;

broadcasting each respective beacon signal from each at least one beacon deployed in the localized geographic area containing the at least one beacon;

scanning to detect any beacon signal, wherein the scanning is accomplished using a mobile device containing a receiver circuit that is compatible with the beacon signal, wherein the detected beacon signal would be a beacon signal transmitted from any of the at least one beacon located proximate the mobile device;

receiving the any beacon signal, wherein the receiving is accomplished using the mobile device containing the receiver circuit compatible with the beacon signal, wherein the received beacon signal would be the beacon signal transmitted from any of the at least one beacon located proximate the mobile device;

decoding the geographic location reference from the received beacon signal to determine the known geographic location of the respective beacon of the at least one beacon located proximate the mobile device;

determining a geographic location of the mobile device using the geographic location reference to determine the known geographic location of the respective beacon of the at least one beacon decoded from the geographic location reference from the received beacon signal; and activating at least one Location Based Service (LBS) associated with the geographic location of the mobile device.

2. The method as recited in claim 1, further comprising a step of:
transmitting the beacon signal using a short range radio protocol, wherein the short range radio protocol is at least one of a Bluetooth signal, a Wi-Fi signal, and a radio frequency identification (RFID) signal.

3. The method as recited in claim 1, further comprising a step of determining a location of the mobile device at a location where use of a global positioning satellite (GPS) receiver is ineffective for determining the location of the mobile device.

4. The method as recited in claim 1, where the step of determining a geographic location of the mobile device is accomplished using a signal strength of the beacon signal in conjunction with the decoded address acquired from the beacons signal of the respective beacon of the at least one beacon located proximate the mobile device.

5. The method as recited in claim 1, further comprising a step of deploying the at least one beacon within at least one of the following:
outdoors,
indoors,
a structure,
a residence,
a building,
a hi-rise building,
a tenant apartment,
a real estate property,
a room,
a hospital, a school,
a classroom within the school,
a university,
a classroom within the university,
a hotel,
a resort,
a hospitality facility,
a municipal facility,
an arena,
a stadium,
a museum,
a theme park,
an office,
part of an urban living environment,
a vehicle,
a bus,
a bus station,
a train,
a train station,
a ship,
a cruise ship,
with a light, and
within a light fixture.

6. The method as recited in claim 1, wherein one or more of the at least one beacon is integrated into a light.

7. The method as recited in claim 1, wherein one or more of the at least one beacon is in signal communication with a sensor, further comprising a step of:
triggering an operation associated with the sensor.

8. The method as recited in claim 1, further comprising a step of:
powering each of the at least one beacon using a battery or a power outlet.

9. The method as recited in claim 1, further comprising a step of:
initiating a link upon receipt of the beacon signal.

10. The method as recited in claim 1, further comprising a step of:
initiating a link upon receipt of the beacon signal, wherein the link is associated with the decoded address.

11. The method as recited in claim 1, wherein at least one Location Based Service (LBS) provides a function of at least one of:
determining a location of a user by locating the location of the mobile device,
assisting E-911,
an emergency notification, and
an emergency alarm.

12. The method as recited in claim 1, further comprising a step of providing local mapping to the mobile device, wherein the local mapping is based upon the address decoded from the received beacon signal.

13. The method as recited in claim 1, further comprising a step of providing navigation to the mobile device when the mobile device is located within an indoor environment, wherein the navigation is based upon the address decoded from the received beacon signal.

14. The method as recited in claim 1, wherein the Location Based Services (LBS) includes at least one of:
a service of determining an address proximate the mobile device based upon the address decoded from the beacon signal,
an enhancement to E-911,
an enhancement to E-911, wherein the service determines and provides E-911 with a location of the mobile device,
an enhancement to E-911, wherein the service determines and provides E-911 with an address proximate the mobile device,
navigation instructions to an emergency exit determined by the location of the mobile device, providing information associated with an emergency in the location of the mobile device to a user by way of the mobile device, emitting an emergency signal from the mobile device under an emergency condition, assisting in locating the mobile device in at least one of an emergency condition and a disaster condition even when a Global Positioning System (GPS) is unable to sufficiently identify the location of the mobile device, providing location information of the mobile device to emergency personnel, providing location information of the mobile device to emergency personnel, the process being independent of any operation by the user, initiating an automated action of a function accomplished by a separate device, initiating an automated action of a function accomplished by the mobile device, provide information related to real estate, notification of an event located proximate the location of the mobile device, provide social media connections, provide security, provide automation, provide access to secured area, provide an ability to unlock a locked door, conveying a message to Police, wherein the message would be associated with an emergency condition, provide support for security of a structure, and provide access for passage of a vehicle.

15. The method as recited in claim 1, wherein the Location Based Service (LBS) uses the at least one beacon to locate the user by way of the mobile device in at least one of:

a) an emergency situation, or b) during an E-911 call, wherein the location of the mobile device is determined using the address decoded from the received beacon signal.

16. The method as recited in claim 1, further comprising a step of:

encoding a remote control input into the identifier portion of the beacon signal, utilizing the remote control input of portion of the beacon identifier as part of a trigger mechanism to actuate an event.

17. The method as recited in claim 1, further comprising a step of:

interacting with a social networking environment.

18. The method as recited in claim 1, further comprising at least one of:

a step of creating a social networking environment based upon a location of each mobile device within a proximity of other mobile devices and a nearest beacon of the at least one beacon, a step of sustaining a social networking environment based upon the location of each mobile device within the proximity of other mobile devices and a nearest beacon of the at least one beacon.

19. The method as recited in claim 1, wherein the at least one Location Based Service (LBS) includes a step of emitting an emergency locating signal from the mobile device in at least one of an emergency condition and a disaster condition, wherein the emergency locating signal includes an emergency geographic location reference identifying the physical location of the mobile device, wherein the physical location address of the mobile device is determined using the decoded geographic location reference of the received beacon signal from the beacon located proximate the mobile device.

20. The method as recited in claim 1, further comprising a step of:

informing a second party of a presence of the mobile device and a second mobile device within a proximity of one another.

21. The method as recited in claim 1, further comprising a step of:

modifying the encoded information within the identification portion of the beacon signal of one or more of the at least one beacon of the series of beacons to include a Location Based Service (LBS) triggering instruction.

22. The method as recited in claim 1, further comprising steps of:

modifying the encoded information within the identification portion of the beacon signal of one or more of the at least one beacon of the series of beacons to include a Location Based Service (LBS) triggering instruction; and automatically initiating the Location Based Service (LBS) associated with the triggering instruction.

23. The method as recited in claim 1, further comprising a step of:

modifying the encoded information within the identification portion of the beacon signal of one or more of the at least one beacon of the series of beacons to include a Location Based Service (LBS) triggering instruction, wherein the encoded information further comprises a security feature.

24. The method as recited in claim 1, further comprising a step of:

modifying the encoded information within the identification portion of the beacon signal of one or more of the at least one beacon of the series of beacons to include a Location Based Service (LBS) triggering instruction; and automatically initiating the Location Based Service (LBS), wherein the LBS is associated with at least one of the address and the triggering instruction.

25. The method as recited in claim 1, wherein at beacon can operate in accordance with at least one of:

one or more of the at least beacon is configured to operated independently, and one or more of the at least beacon is configured to operated within a network.

26. The method in claim 1, further comprising a step of:

automatically initiating a link between the mobile device and at least one of:

a. an Internet, b. a webpage, c. a website, and d. a network server, wherein the initiation of the link is triggered by information provided within the identifier segment of the beacon signal.

27. The method as recited in claim 1, further comprising a step of:

linking the mobile device to at least one of:

a an existing network, b. an existing system, and c. an application associated with the at least one beacon.

28. The method as recited in claim 1, wherein the Location Based Service (LBS) is associated with the localized geographic area and provides at least one service associated with the localized geographic area, the at least one service being selected from a service group comprising:
  linking to a third party application,
  linking to existing software,
  linking to a website,
  initiating an automated action of a function accomplished by a separate device located within the localized geographic area,
  communicating with a server accessible through an Internet,
  presenting location information,
  presenting real estate property information,
  presenting property sales information,
  presenting specials notification information,
  providing the location of the mobile device to a third party, and
  providing the location of the mobile device to an emergency service provider, the mobile device being representative of a location of a user, the location being provided during an emergency condition.

29. The method as recited in claim 1, further comprising steps of:
  conveying information obtained from one or more beacon of the at least one beacon to a provider; and
  receiving Location Based Service (LBS) related content, wherein the Location Based Service (LBS) related content is associated with the known geographic location of the respective beacon of the at least one beacon located proximate the mobile device.

30. The method as recited in claim 1, further comprising steps of:
  conveying information obtained from one or more beacons of the at least one beacon to a provider over the Internet; and
  receiving content associated with the information obtained from the one or more beacons of the at least one beacon from the provider over the Internet.

31. The method as recited in claim 1, further comprising a step of:
  transmitting the geographic location of the mobile device from the mobile device.

32. The method as recited in claim 1, further comprising steps of:
  transmitting a plurality of addresses obtained from beacon signals and decoded by the mobile device over a period of time as the mobile device moves to track the movement of the mobile device.

33. The method as recited in claim 1, further comprising steps of:
  obtaining a location of the mobile device to
  tracking a location of the mobile device using the address information obtained from the beacons signal for at least one of an emergency and a disaster situation.

34. The method as recited in claim 1, further comprising a step of:
  utilizing the mobile device to aid in locating a user in at least one of an emergency and a disaster situation.

35. The method as recited in claim 1, further comprising a step of:
  use the deployment of the beacon located within a residence as a source to provide application deployment around the residence.

36. The method as recited in claim 1, further comprising a step of:
  deploying a plurality of beacons within a plurality of structures,
  adapting the deployed plurality of beacons to collectively support a broader area, wherein the broader area is at least one of a city, an urban environment, an urban municipal living, and a commercial environment.

37. The method as recited in claim 1, further comprising a step of:
  including a longitude and a latitude in the geographic location reference.

38. The method as recited in claim 1, further comprising a step of:
  including a floor of a structure identifier in the geographic location reference.

39. The method as recited in claim 1, further comprising a step of:
  emulating a Global Positioning System (GPS) by using the decoding the geographic location reference from the received beacon signal to determine a Global Positioning System (GPS) location.

40. The method as recited in claim 1, further comprising at least one of:
  a step of supplementing an existing Global Positioning System (GPS), and
  a step of interfacing with an existing Global Positioning System (GPS).

41. The method as recited in claim 1, further comprising a step of obtaining the geographic location of the mobile device, wherein the geographic location of the mobile device is more accurate than a location of the mobile device as determined by a comparably available Global Positioning System (GPS).

42. The method as recited in claim 1, further comprising a step of:
  reprogramming one or more beacon of the at least one beacon to maintain an accurate geographic location reference associated with the current known location of the respective beacon.

43. The method as recited in claim 1, further comprising a step of:
  adapting the at least one Location Based Service (LBS) to improve management and control at least one of:
  facility support,
  building maintenance,
  tenant management,
  high rise building maintenance,
  apartment house maintenance,
  hospitality functions,
  hospital access,
  hospital management,
  school access,
  school management, and
  office management.

44. The method as recited in claim 1, further comprising a step of:
  utilizing human behavior to enhance urban living.

45. The method as recited in claim 1, further comprising a step of:
  adapting the at least one Location Based Service (LBS) to a gaming industry.

46. The method as recited in claim 1, further providing steps of:
  providing plurality of beacons for installation in at least one structure, wherein the plurality of beacons are provided by a service provider, and managing each of the plurality of beacons, wherein the step of managing each of the plurality of beacons is accomplished by the service provider.

47. The method as recited in claim 1, further providing steps of:
providing plurality of beacons for installation in at least one structure, wherein the plurality of beacons are provided by a service provider at no charge, and
managing each of the plurality of beacons, wherein the step of managing each of the plurality of beacons is accomplished by the service provider,
obtaining revenue from at least one of:
advertising using the plurality of beacons, and
Location Based Services (LBS).

48. A method of utilizing at least one beacon for conveying information, the method comprising steps of:
adapting at least one existing non-beacon wireless communication device to include a beacon feature, the at least one existing wireless communication device including at least one of Wi-Fi and Bluetooth wireless transceiver circuitry, wherein the adapting is accomplished by introducing a beacon instructions set into the at least one existing wireless communication device;
encoding desired beacon information into an identification segment of a beacon signal, wherein the encoded beacon information presents information to a receiving mobile device using one way transmission;
broadcasting each respective beacon signal from each at least one beacon adapted wireless communication device;
scanning to detect any beacon signal, wherein the scanning is accomplished using a mobile device containing a receiver circuit that is compatible with the beacon signal, wherein the detected beacon signal would be a beacon signal transmitted from any of the at least one beacon adapted wireless communication device located within signal range of the mobile device;
receiving any beacon signal, wherein the receiving is accomplished using the mobile device containing the receiver circuit compatible with the beacon signal, wherein the received beacon signal would be the beacon signal transmitted from any of the at least one beacon adapted wireless communication device located within signal range of the mobile device;
decoding the beacon information from the received beacon signal;
acting upon the decoded beacon information in accordance with at least one of:
a) conveying the decoded beacon information to a user, and
b) initiating at least one Location Based Service (LBS) associated with the information obtained from the decoded beacon information.

49. The method as recited in claim 48, wherein the step of adapted the at least one existing non-beacon wireless communication device to include a beacon feature is accomplished by at least one of:
introducing software for operation as a beacon into the at least one existing non-beacon wireless communication device; and
embedding the beacon into the at least one existing non-beacon wireless communication device.

50. The method as recited in claim 48, the method further comprising a step of communicating the beacon information exclusive of bi-directional communication.

51. The method as recited in claim 48, the method further comprising a step of revising the beacon information automatically based upon a sensor status.

52. A method of utilizing at least one beacon for conveying information, the method comprising steps of:
deploying at least one beacon, the beacon adapted to transmit a beacon signal using at least one of a unidirectional Bluetooth protocol signal and a unidirectional Wi-Fi protocol signal;
encoding desired beacon information into an identification segment of a beacon signal, wherein the encoded beacon information presents information to a receiving mobile device using the unidirectional transmission;
broadcasting each respective beacon signal from each at least one beacon;
scanning to detect any beacon signal, wherein the scanning is accomplished using the mobile device containing a receiver circuit that is compatible with the beacon signal, wherein the detected beacon signal would be a beacon signal transmitted from any of the at least one beacon located within signal range of the mobile;
receiving any beacon signal, wherein the receiving is accomplished using the mobile device containing the receiver circuit compatible with the beacon signal, wherein the received beacon signal would be the beacon signal transmitted from any of the at least one beacon located within signal range of the mobile device;
decoding the beacon information from the received beacon signal;
acting upon the decoded beacon information in accordance with at least one of:
a) conveying the decoded beacon information to a user, and
b) initiating at least one Location Based Service (LBS) associated with the information obtained from the decoded beacon information.

53. The method as recited in claim 52, wherein the step of deploying the at least one beacon deploys the beacon in at least one of:
outdoors,
indoors,
a residence,
a building,
a hi-rise building,
a tenant apartment,
a real estate property,
a room,
a hospital,
a school,
a classroom within the school,
a university,
a classroom within the university,
a hotel,
a hospitality facility,
a municipal facility,
an office,
part of an urban living environment,
a cruise ship,
a transportation facility,
a vehicle,
a road traveling vehicle,
a bus,
a bus station,
a train,
a subway station,
an arena, a museum,
a light,
a light fixture, and
a light fixture within a structure.

\* \* \* \* \*